US012003579B2

(12) United States Patent
Pascual

(10) Patent No.: US 12,003,579 B2
(45) Date of Patent: Jun. 4, 2024

(54) VIRTUAL STORAGE SYSTEM CLIENT USER INTERFACE

(71) Applicant: David Pascual, New York, NY (US)

(72) Inventor: David Pascual, New York, NY (US)

( * ) Notice: Subject to any disclaimer, the term of this patent is extended or adjusted under 35 U.S.C. 154(b) by 0 days.

(21) Appl. No.: 14/768,685

(22) PCT Filed: Feb. 20, 2014

(86) PCT No.: PCT/US2014/017517
§ 371 (c)(1),
(2) Date: Aug. 18, 2015

(87) PCT Pub. No.: WO2014/130742
PCT Pub. Date: Aug. 28, 2014

(65) Prior Publication Data
US 2015/0381735 A1 Dec. 31, 2015

Related U.S. Application Data

(60) Provisional application No. 61/792,076, filed on Mar. 15, 2013, provisional application No. 61/766,917, filed on Feb. 20, 2013.

(51) Int. Cl.
*H04L 67/1097* (2022.01)
*G06F 3/0484* (2022.01)
(Continued)

(52) U.S. Cl.
CPC ........ *H04L 67/1097* (2013.01); *G06F 3/0484* (2013.01); *G06F 16/188* (2019.01); *H04L 65/403* (2013.01)

(58) Field of Classification Search
CPC ............. G06F 17/30233; G06F 15/167; G06F 17/30221
See application file for complete search history.

(56) References Cited

U.S. PATENT DOCUMENTS 8,307,299 B2 * 11/2012 Conner ................. G06Q 10/10
715/778
9,069,607 B1 * 6/2015 Gopalakrishna Alevoor ..............
G06F 9/45558
(Continued)

OTHER PUBLICATIONS

Google Drive: Access and Organize your Files, Nov. 29, 2012, Wheeling Jesuit University, pp. 1-15 (Year: 2012).*

*Primary Examiner* — Justin S Lee

(57) ABSTRACT

Systems and methods of providing virtual storage spaces ("VSS") are presented. A VSS is a virtual representation of a storage space in a database or other data structure with which user(s) who have access to are allowed to interact—in real-time or not—via a VSS Client U1. A VSS Client U1 is a cloud-based U1 with the following components: (a) Cloud Communicator (CC) U1, which allows user(s) to communicate through any communication application; (b) VSS U1, which allows exchange and/or execution of virtual files and virtual applications, and (c) User Cloud Storage (UCS) U1, which allows user(s) to share, copy, delete, export and import any virtual file (in a storage space such as cloud storage, dedicated or shared storage server, remote storage hardware, etc.) and/or virtual application in the cloud, dedicated or shared server, etc. Disclosed herein are various interactive online experiences between users in various engagement scenarios (e.g., any business and/or personal relationship such as B2C, C2C or B2B)—where users have access to a common virtual system storage (VSS) through a VSS Client U1.

20 Claims, 61 Drawing Sheets

(51) Int. Cl.
*G06F 16/188* (2019.01)
*H04L 65/403* (2022.01)

(56) References Cited

U.S. PATENT DOCUMENTS

| | | | |
|---|---|---|---|
| 2013/0047084 A1* | 2/2013 | Sanders | G06F 16/4387 715/716 |
| 2013/0047095 A1* | 2/2013 | Divorra Escoda | H04L 67/38 715/753 |
| 2013/0218978 A1* | 8/2013 | Weinstein | H04L 65/4007 709/205 |
| 2013/0219456 A1* | 8/2013 | Sharma | H04L 63/0815 726/1 |
| 2013/0232191 A1* | 9/2013 | Cheng | G06F 9/5072 709/203 |
| 2013/0290464 A1* | 10/2013 | Barrall | G06F 15/167 709/213 |

* cited by examiner

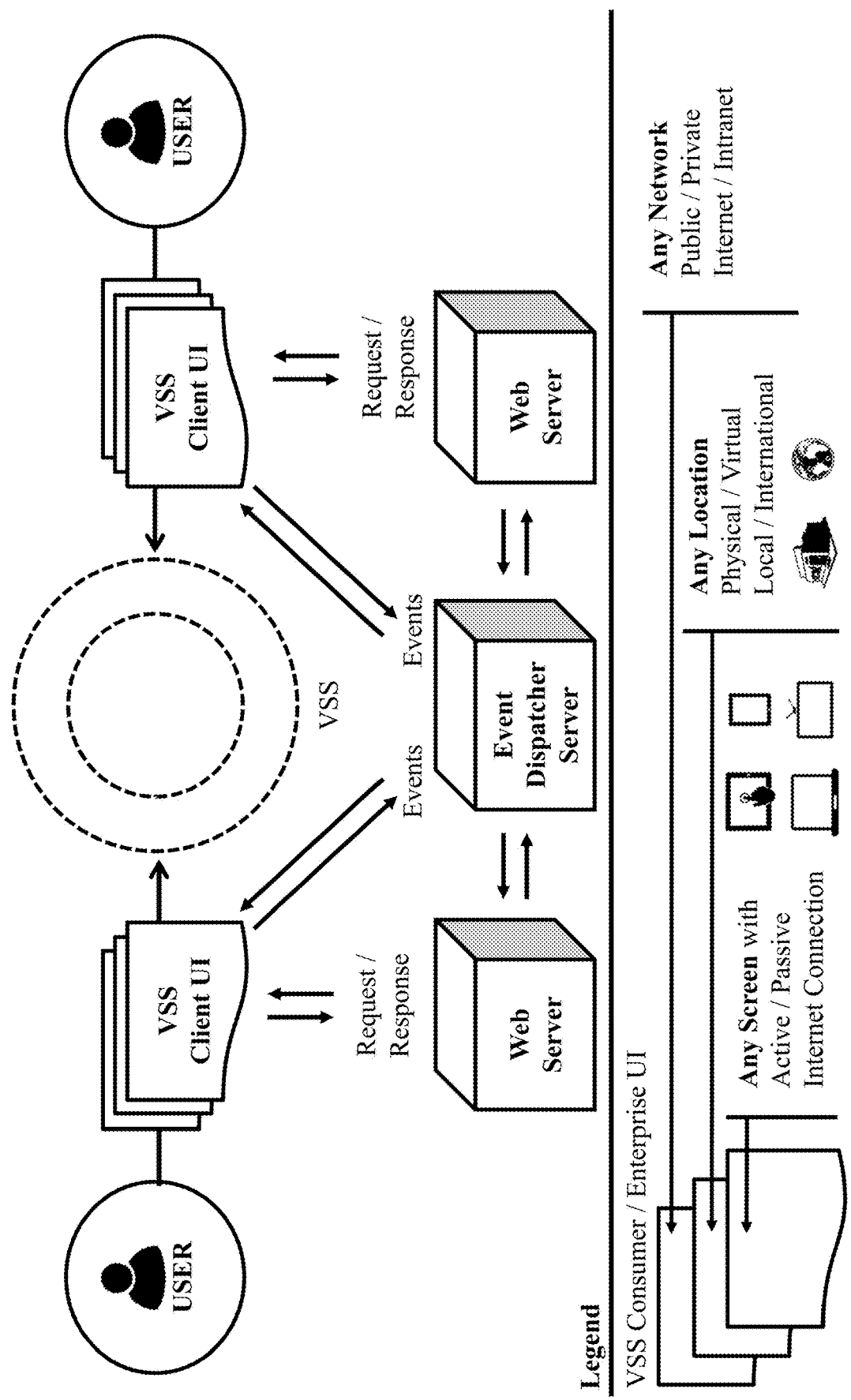

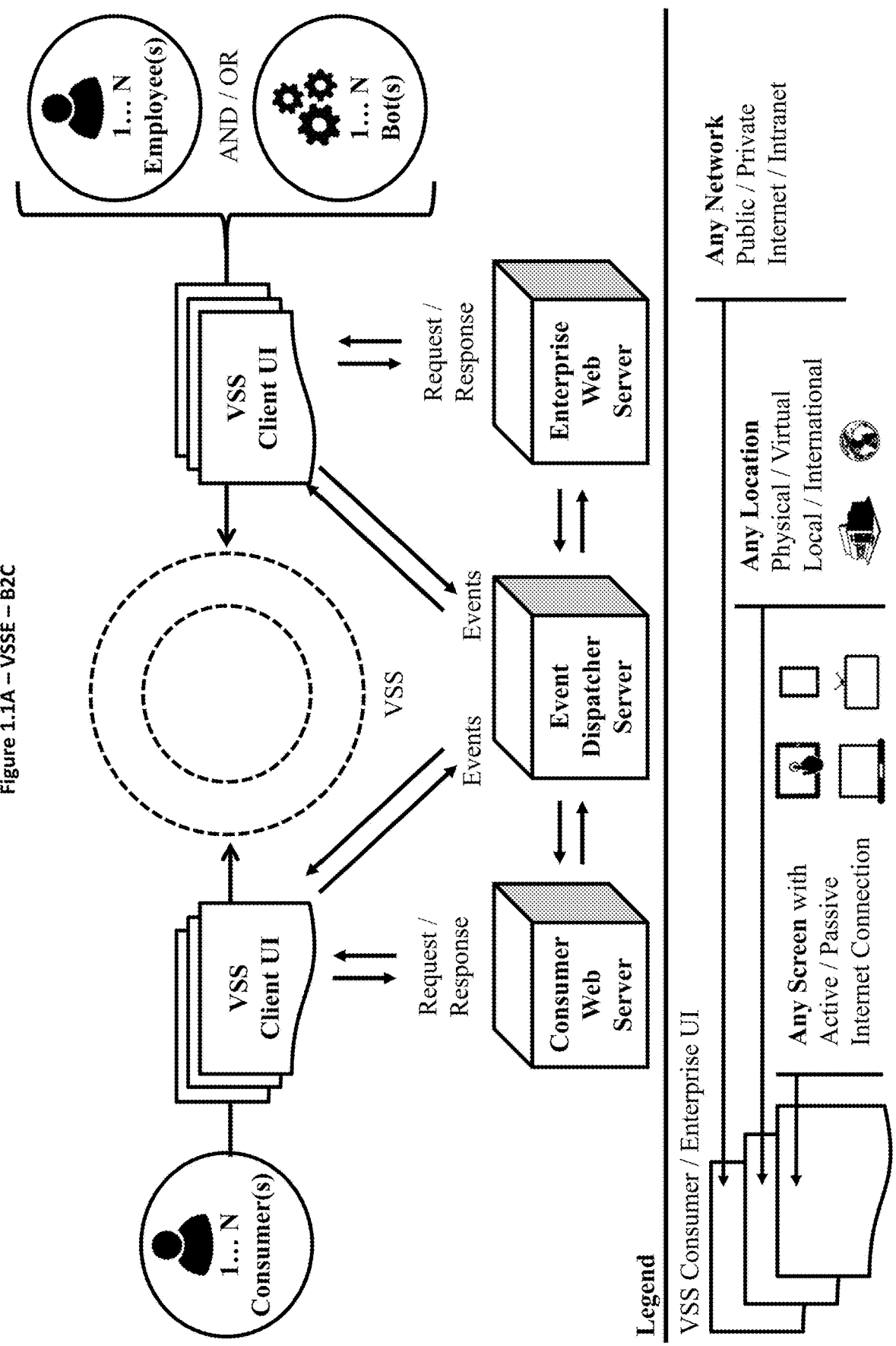

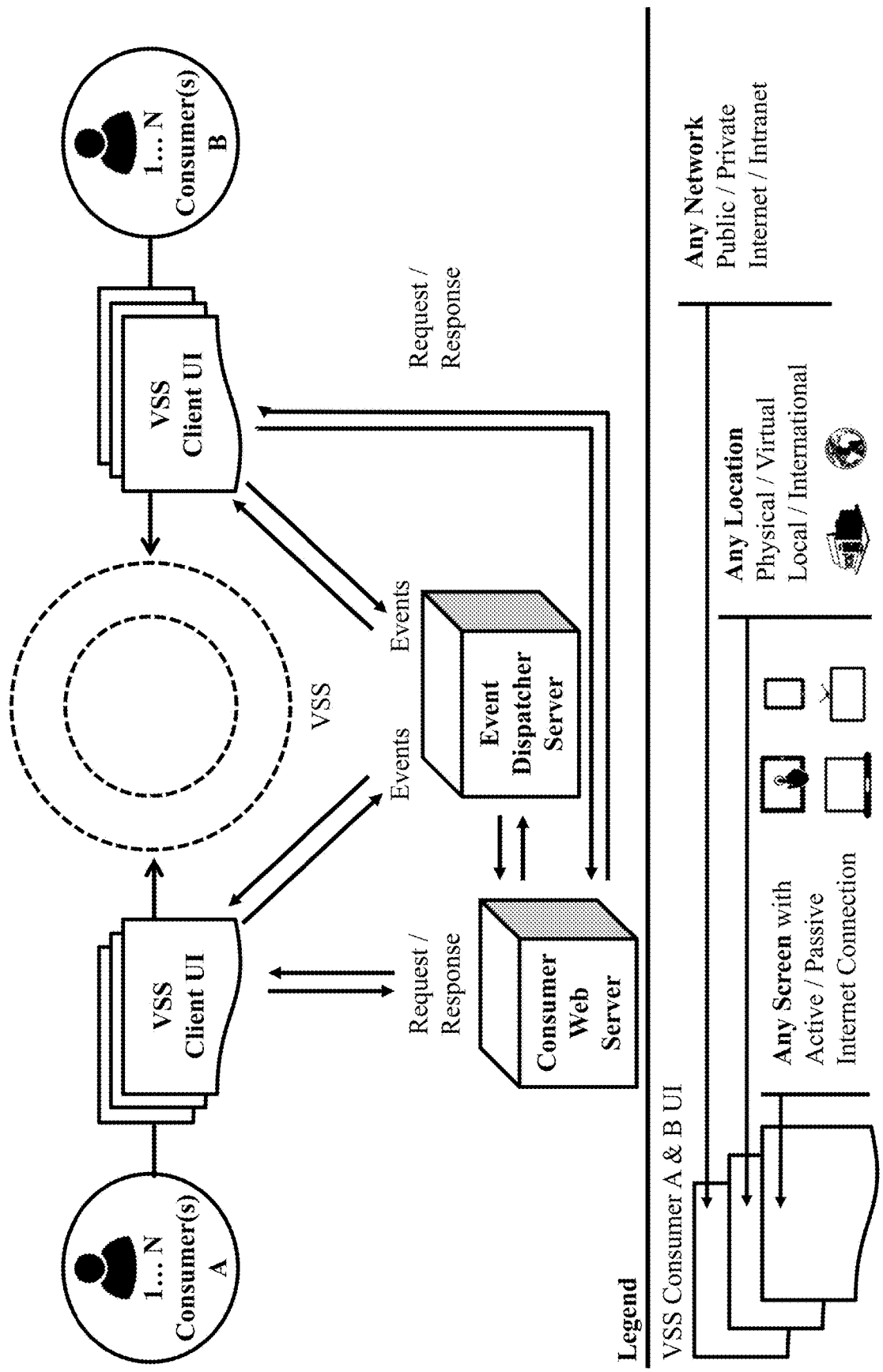

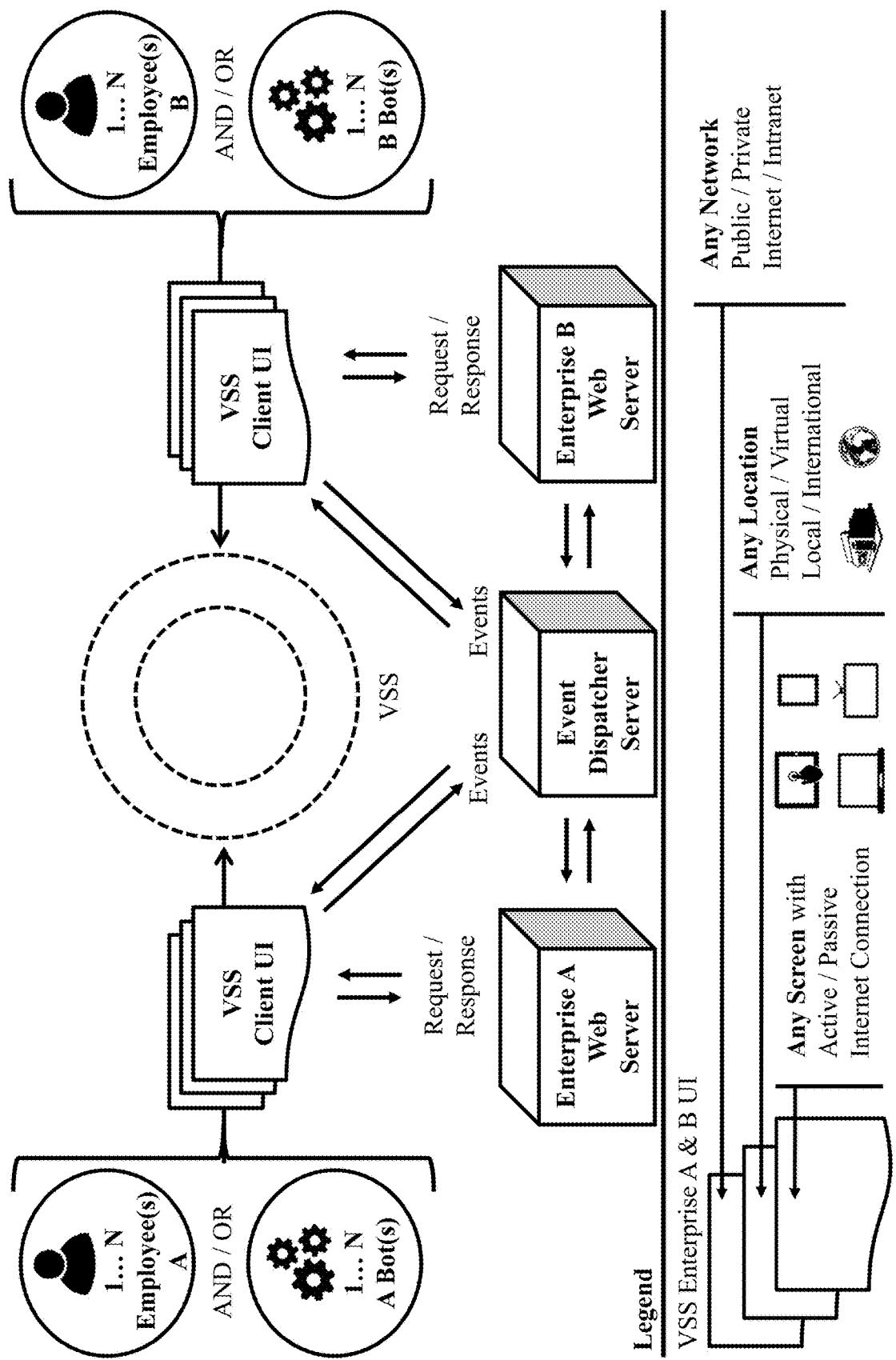

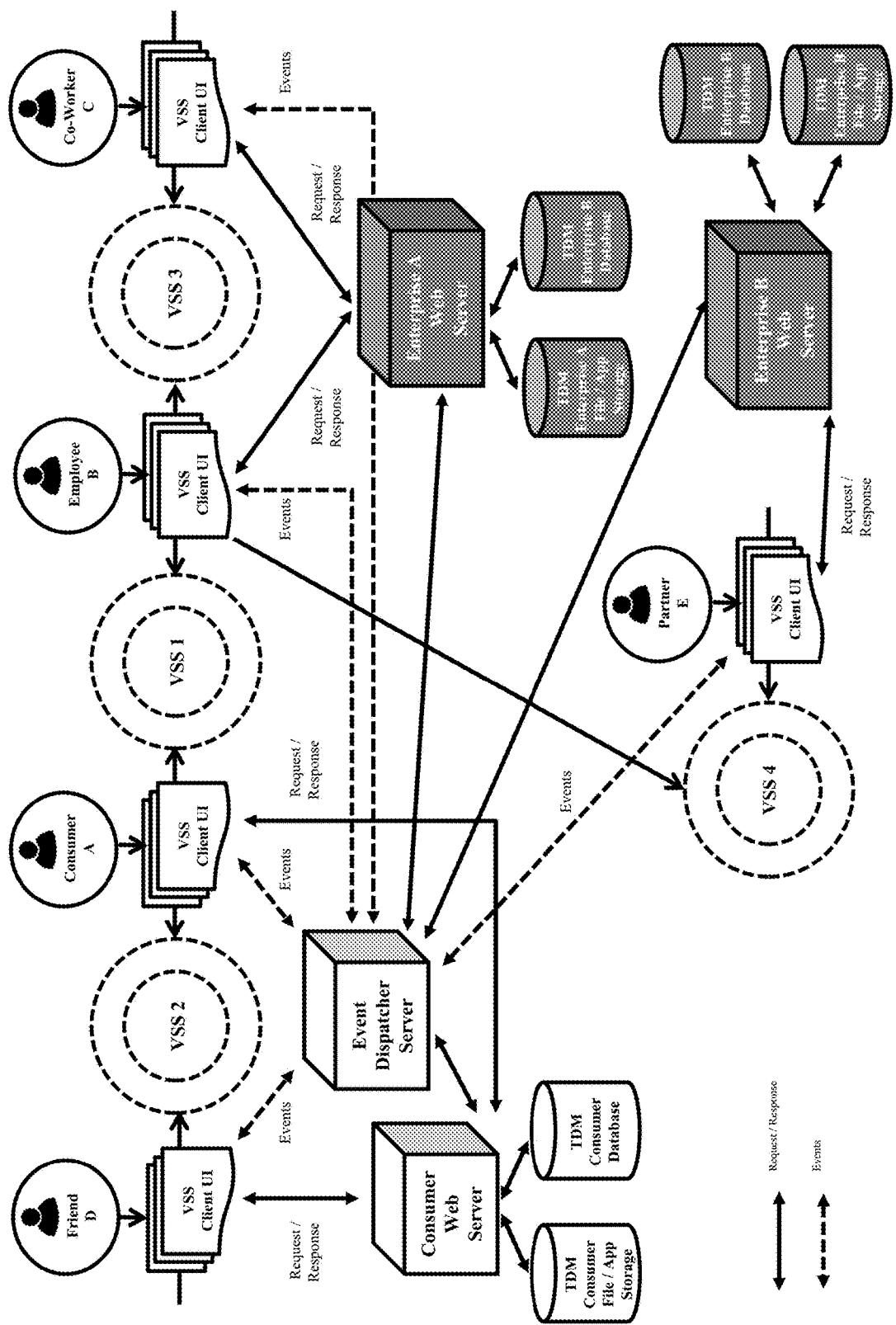
Figure 1.1D – VSS Extended Environment

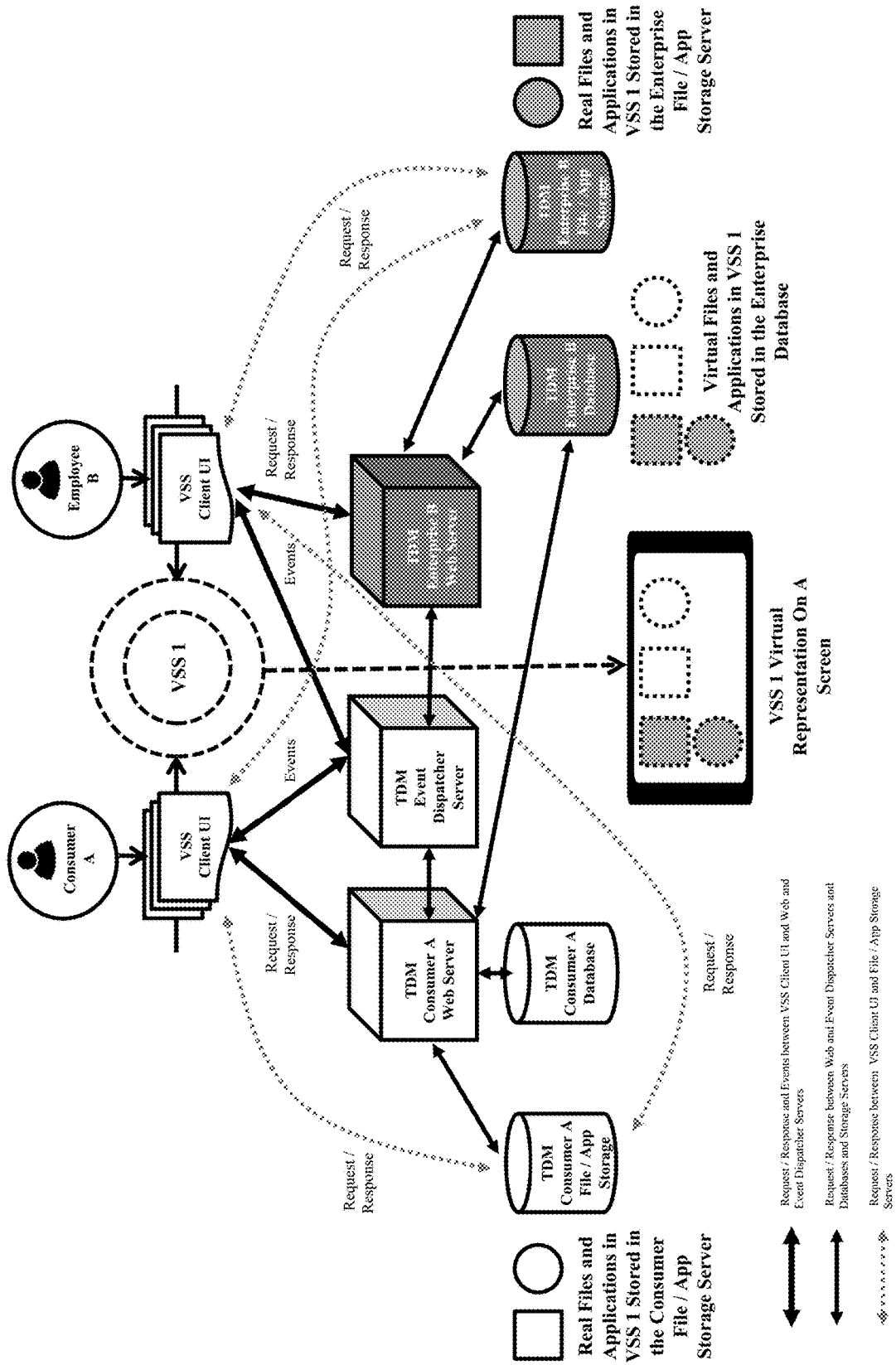
Figure 1.1E – VSSE – Files & Apps

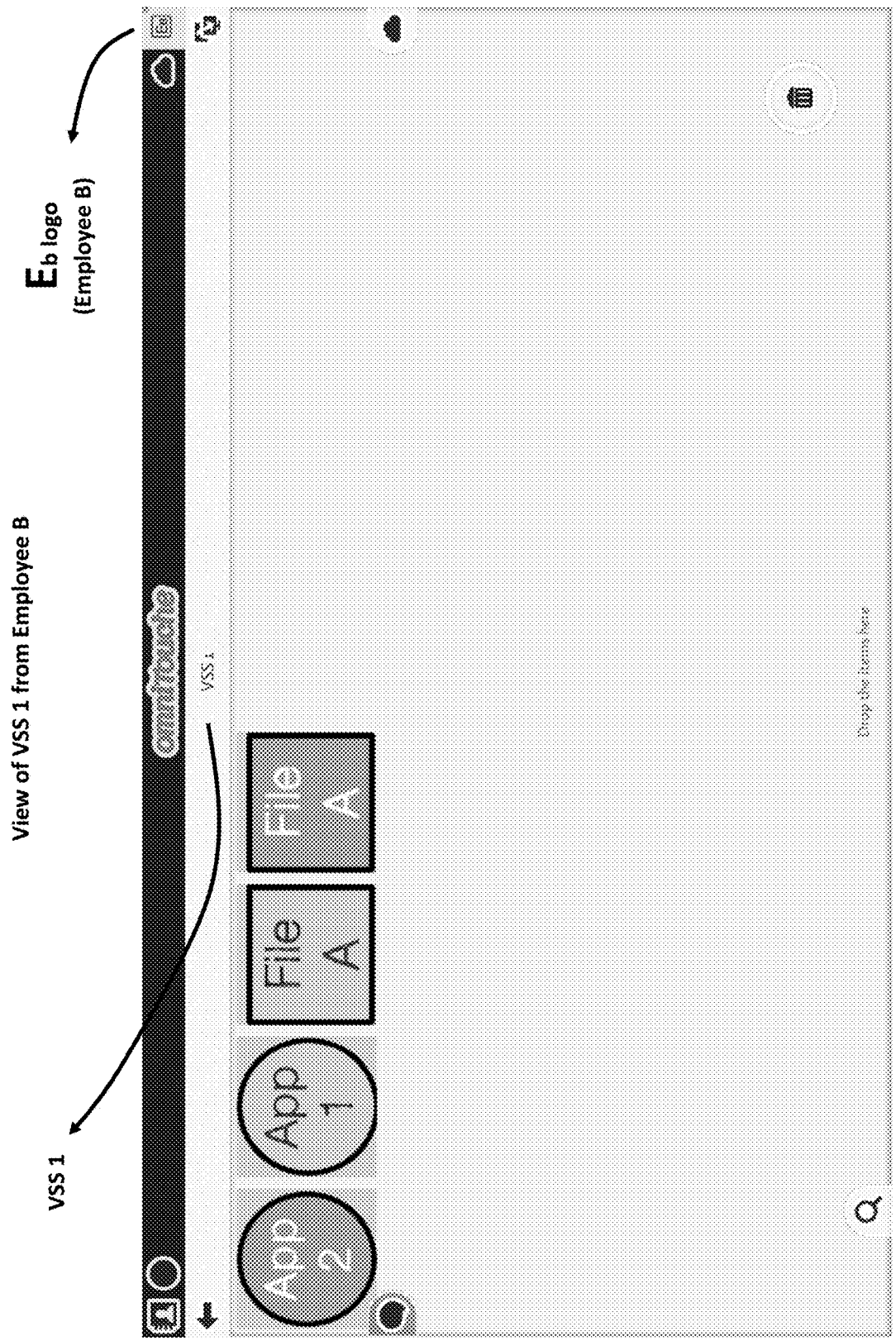

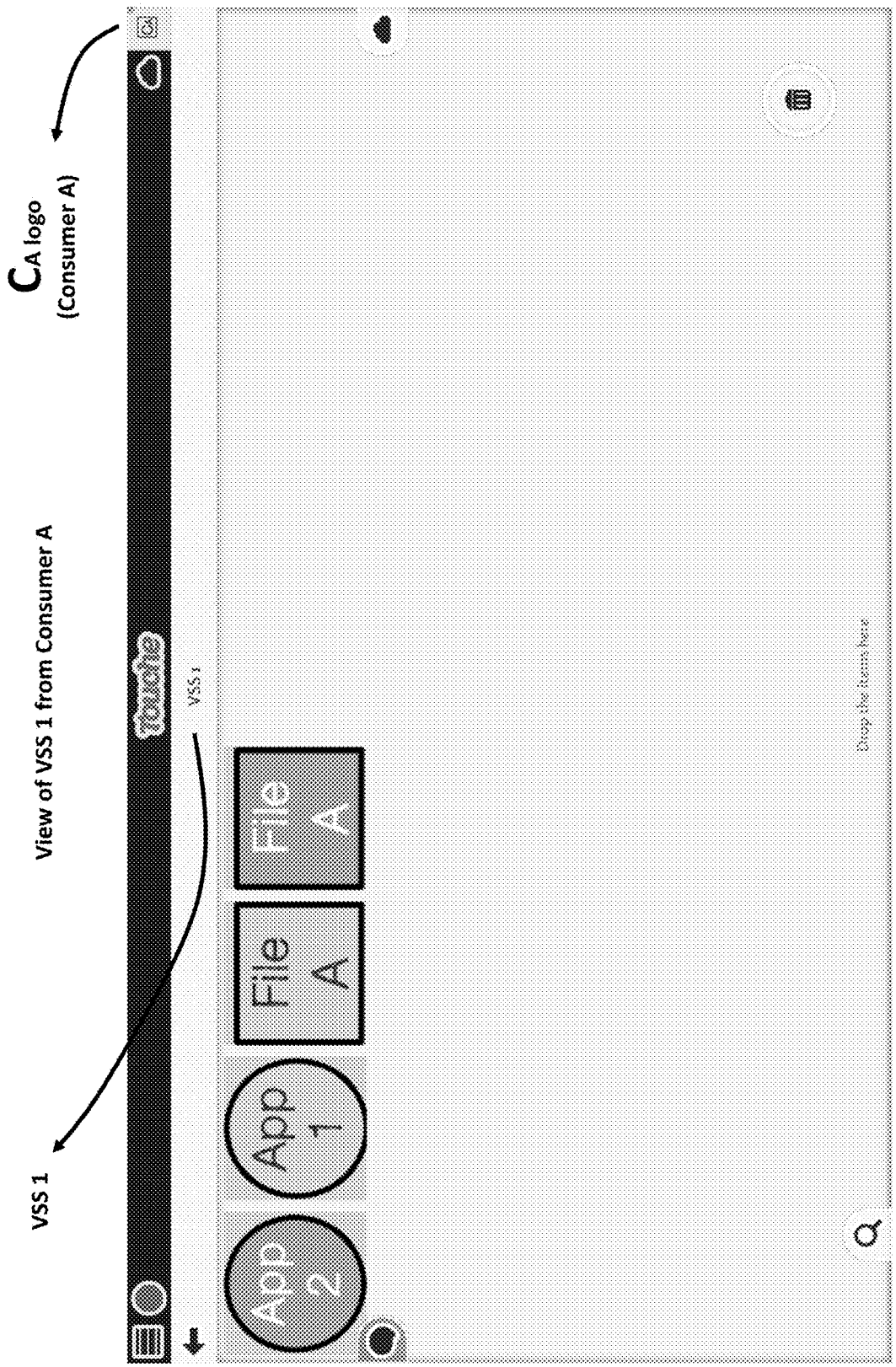
Figure 1.1E2 – VSSE – Files & Apps (SCREENSHOT II)
View of VSS 1 from Consumer A

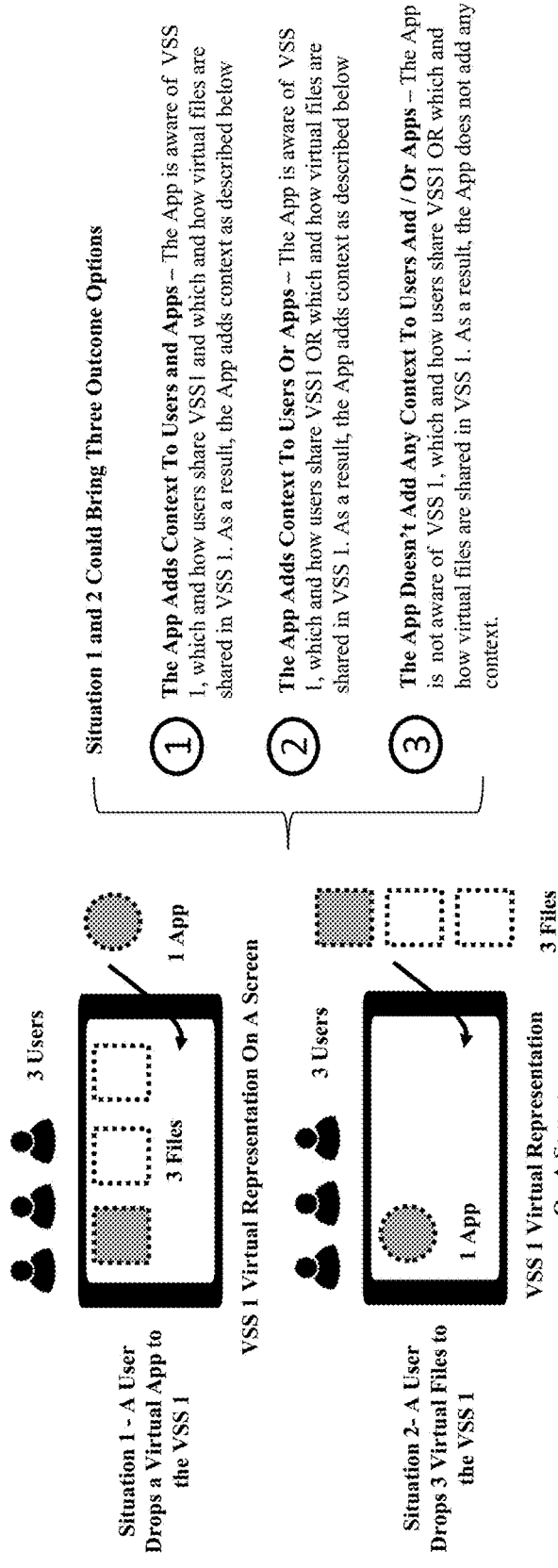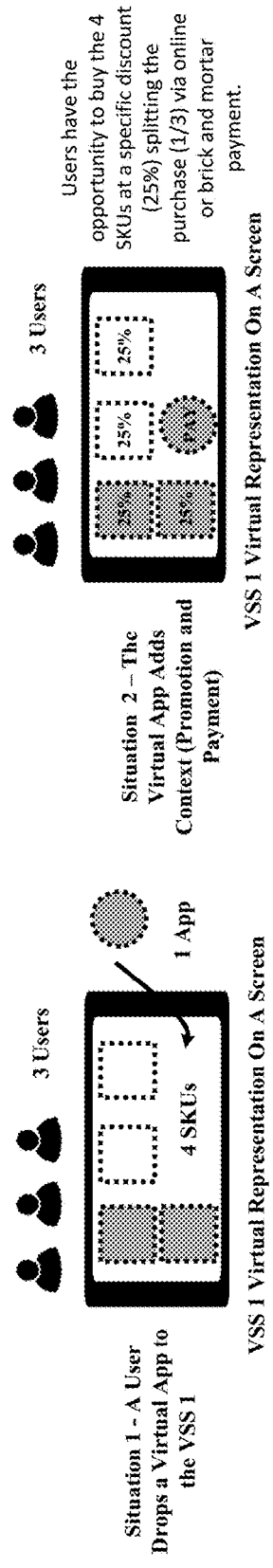

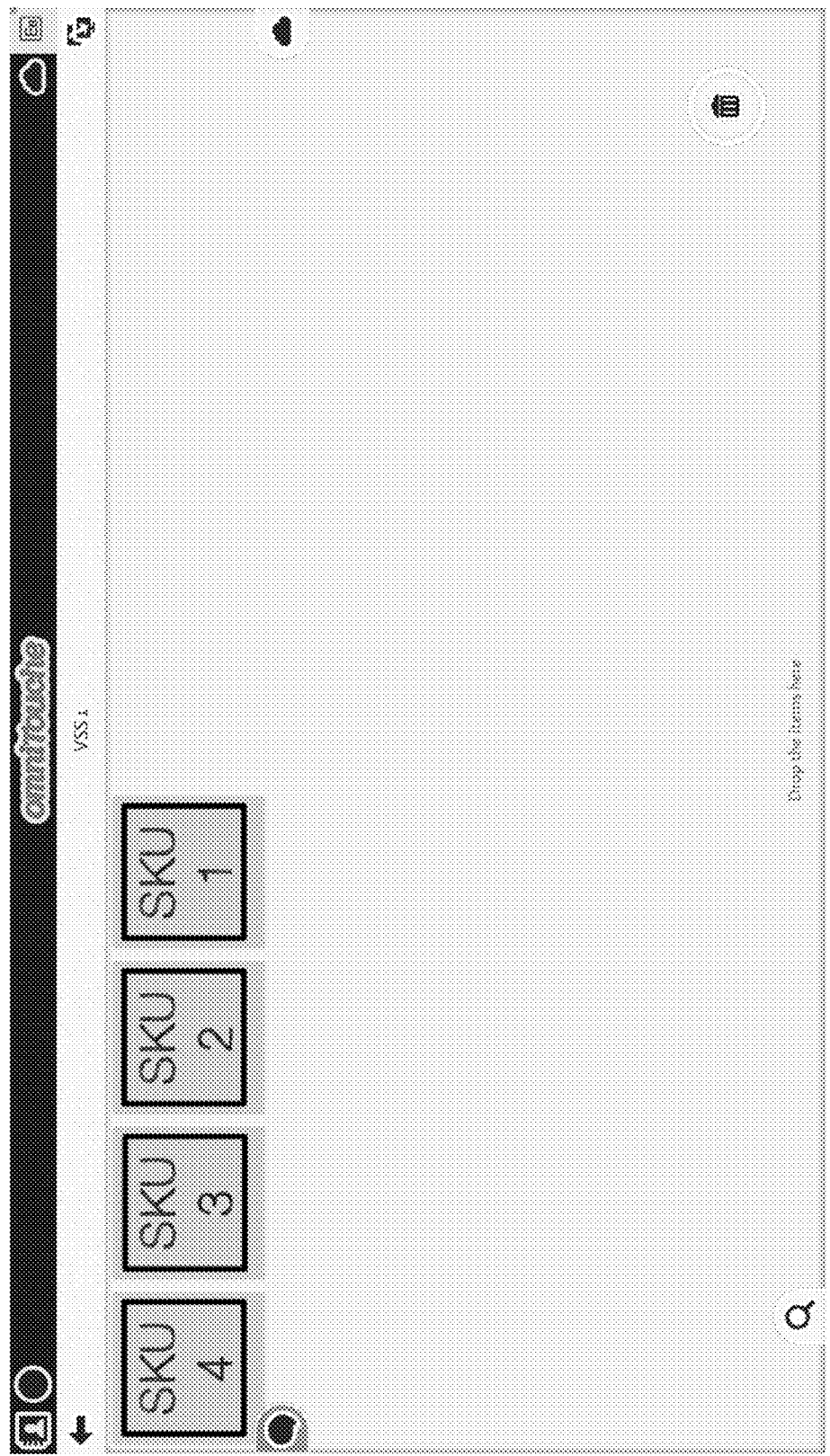

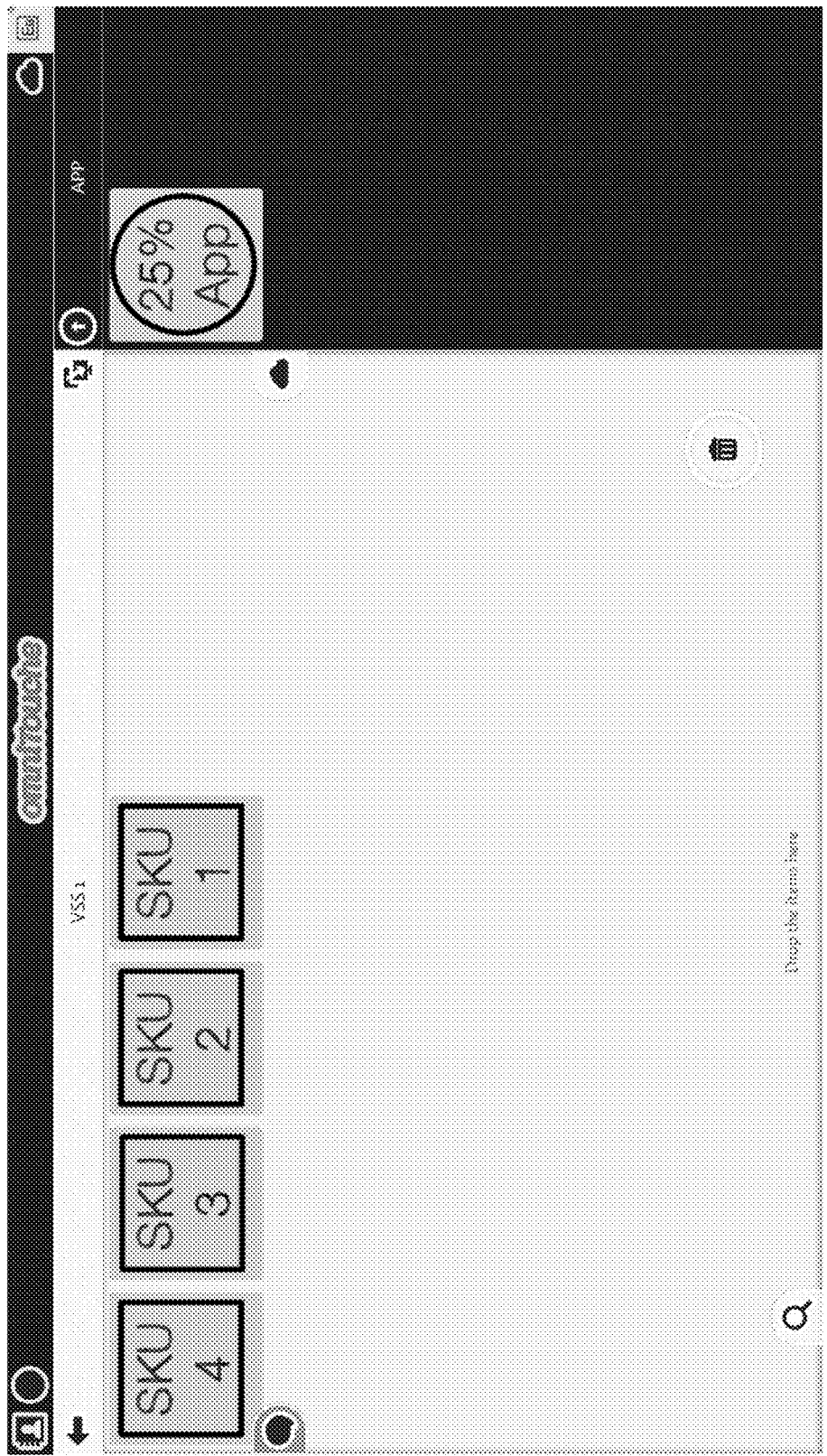
Figure 1.1F2 – VSSE – Files & Apps Interaction I
(SCREENSHOT II - 4 SKUs + 25% App)
View of VSS 1 from User 1 (Employee B)

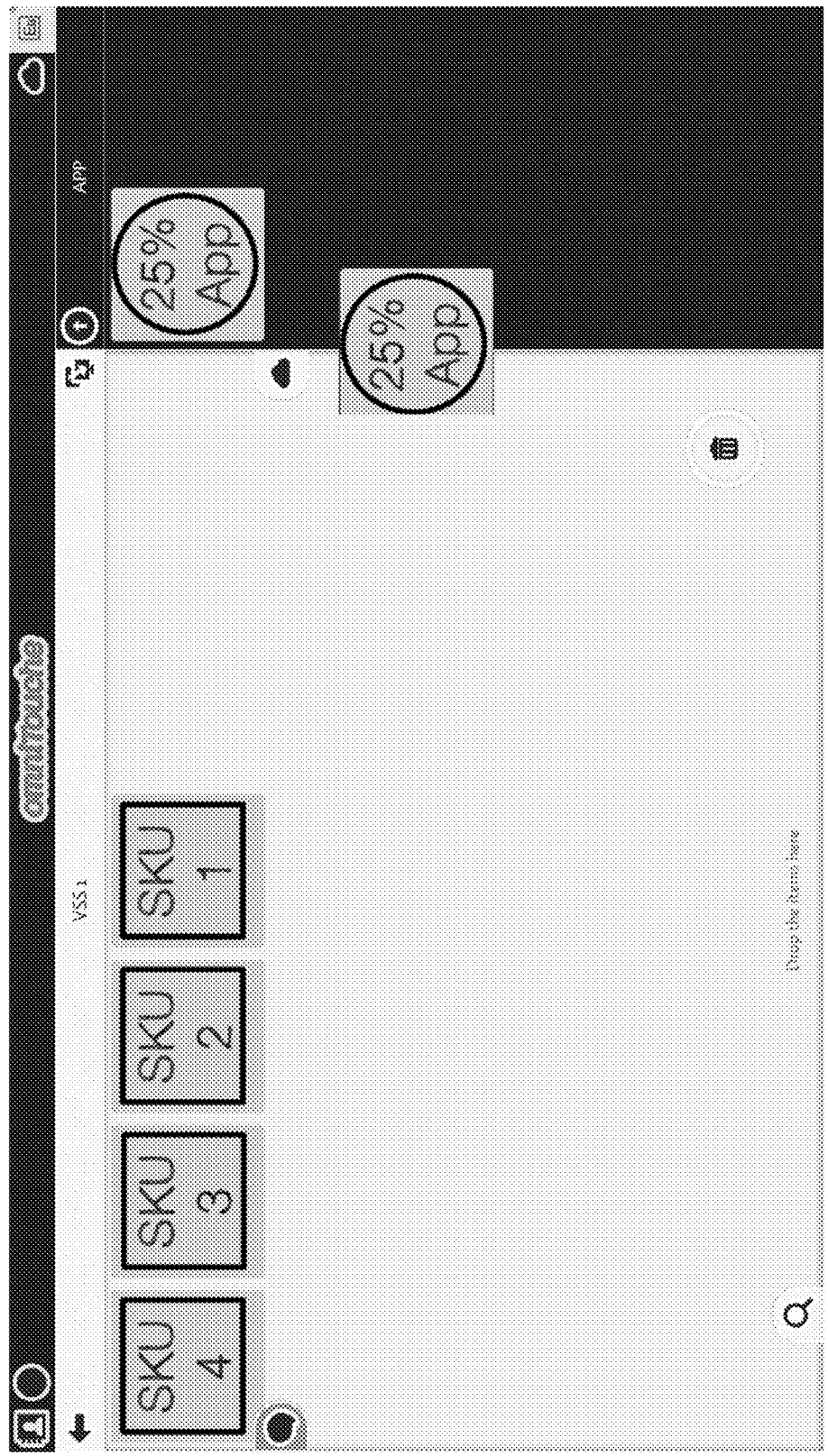
Figure 1.1F3 – VSSE – Files & Apps Interaction I
(SCREENSHOT III - 4 SKUs + 25% App DRAG AND DROP from UCS into VSS 1)
View of VSS 1 from User 1 (Employee B)

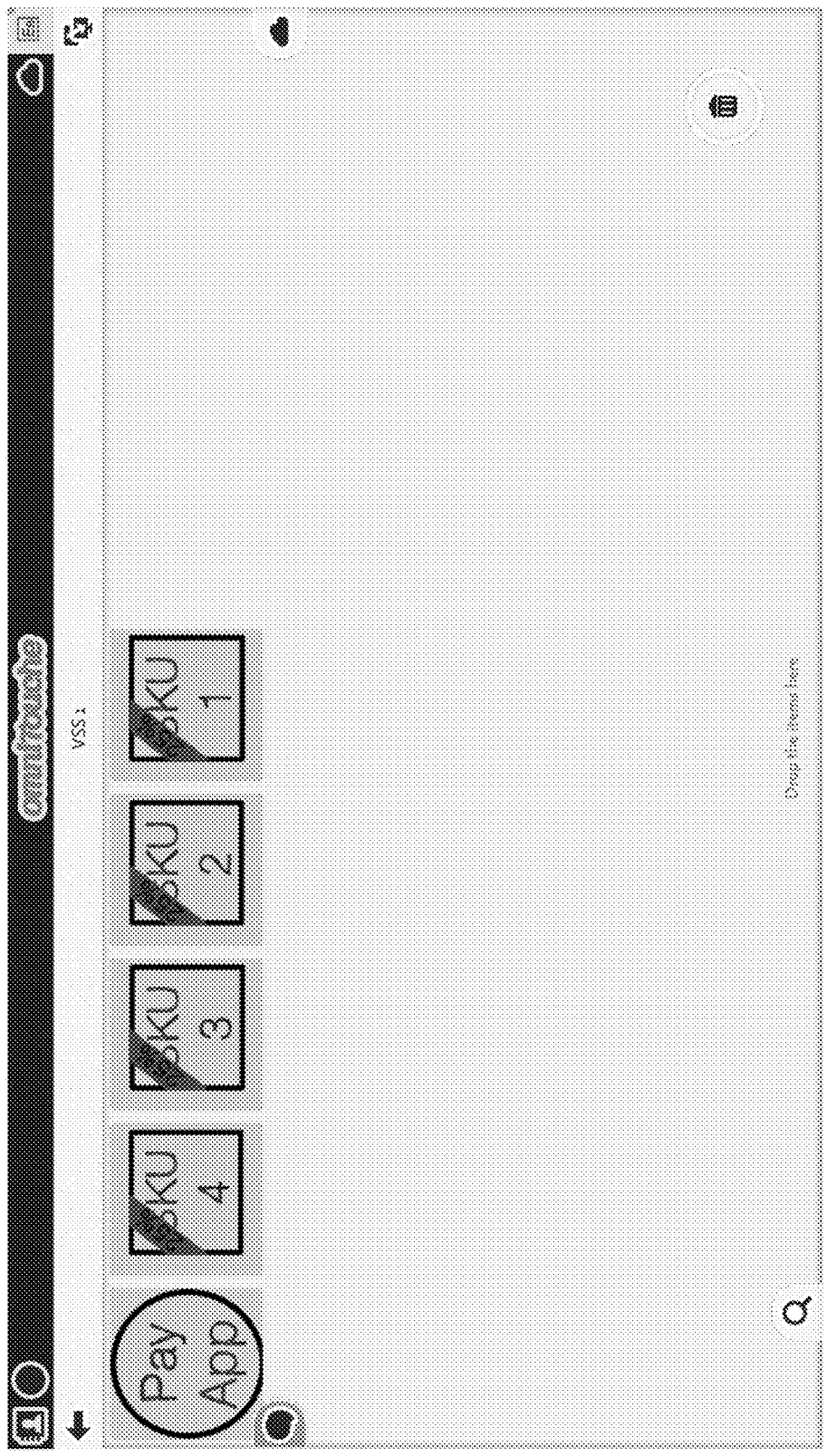
Figure 1.1F4 – VSSE – Files & Apps Interaction I
(SCREENSHOT IV - The Virtual App Adds Context (Promotion and Payment) - Users have the opportunity to buy the 4 SKUs at a specific discount (25%) splitting the purchase (1/3) via online or brick and mortar payment)
View of VSS 1 from User 1 (Employee B)

Fig. 1.1.G.1 through Fig. 1.1.G.4 – VSSE – Files & Apps Interaction II
Figure 1.1.G.1 and Figure 1.1.G.2 - VSSE – Files & Apps Interaction II – Context Example Amongst Apps and Users
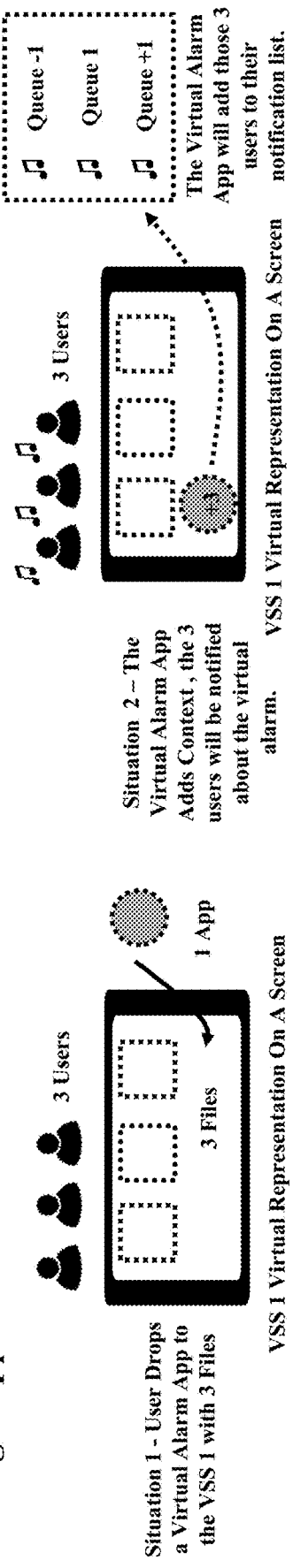
Figure 1.1.G.3 and Figure 1.1.G.4 - VSSE – Files & Apps Interaction II – Context Example Amongst Apps and Files
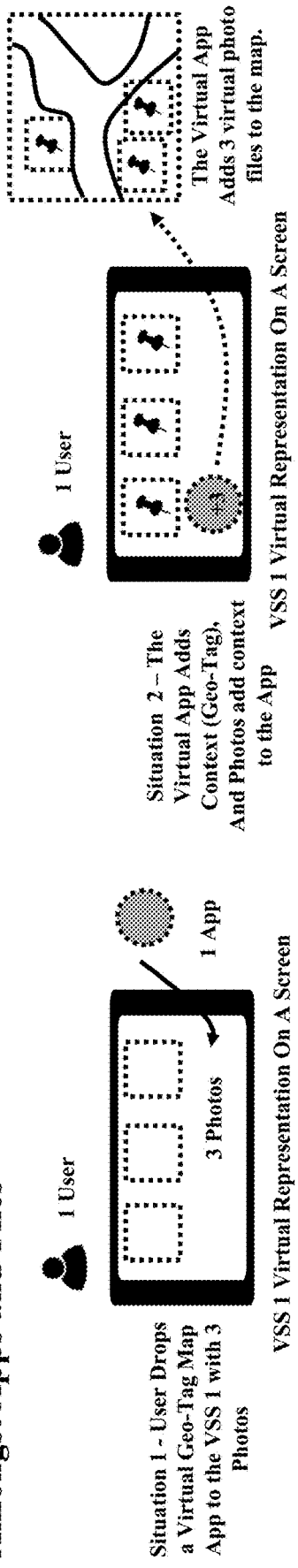

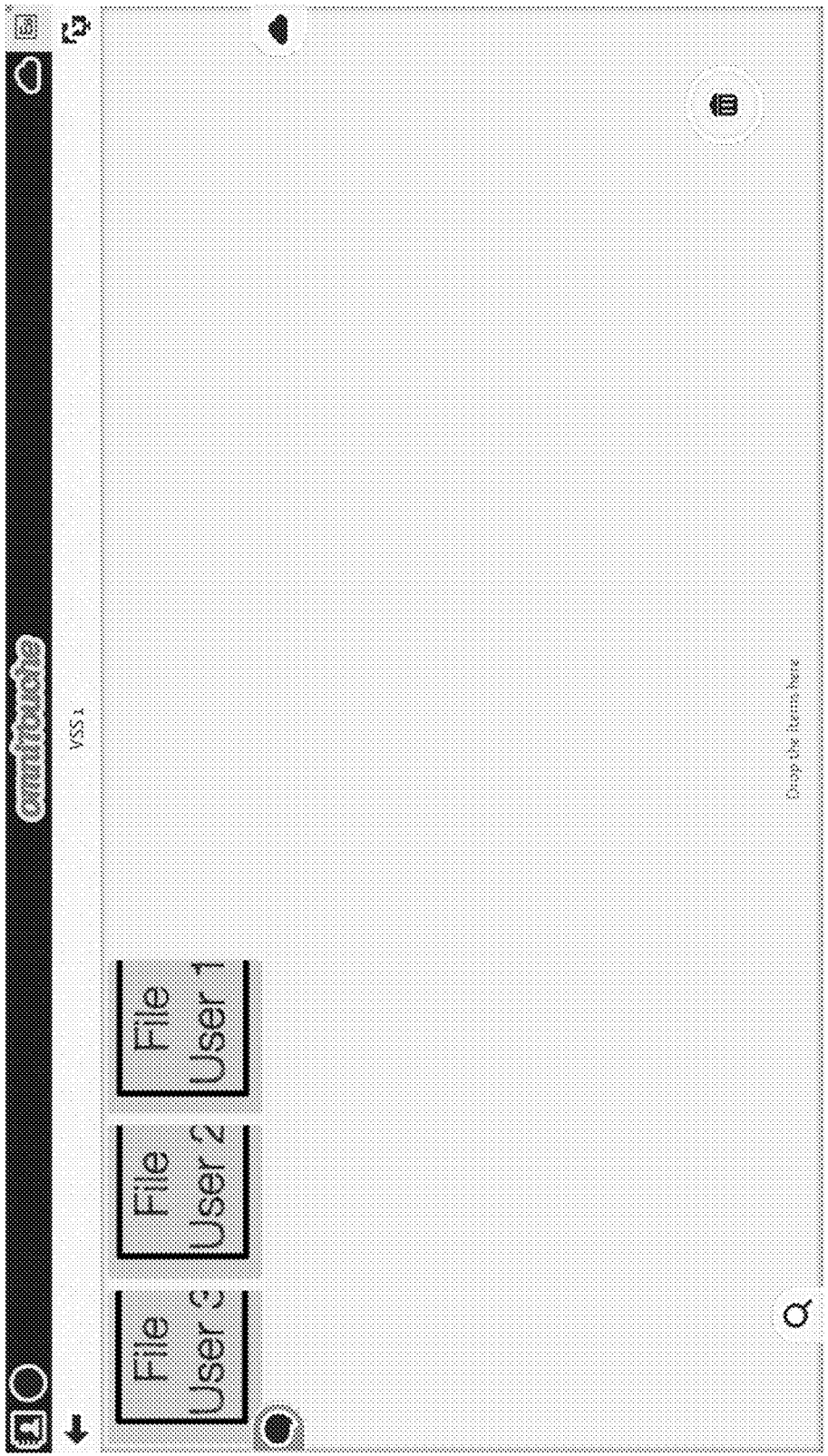

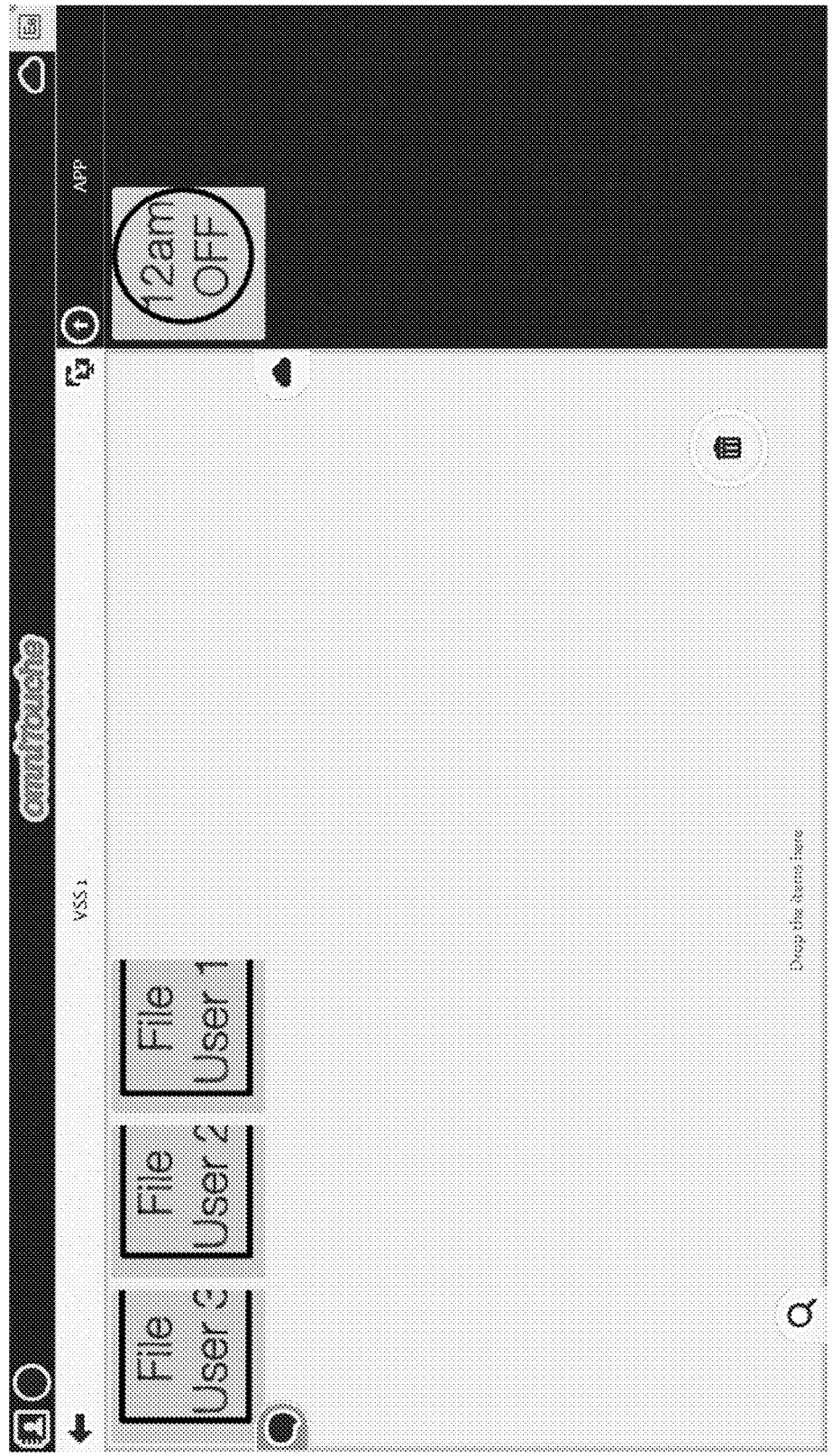
Figure 1.1.G.6 – VSSE – Files & Apps Interaction II
Figure 1.1.G.1 and Figure 1.1.G.2 - VSSE – Files & Apps Interaction II – Context Example Amongst Apps and Users (SCREENSHOT II - 3 FILES + ALARM APP)
View of VSS 1 from User 1 (Employee B)

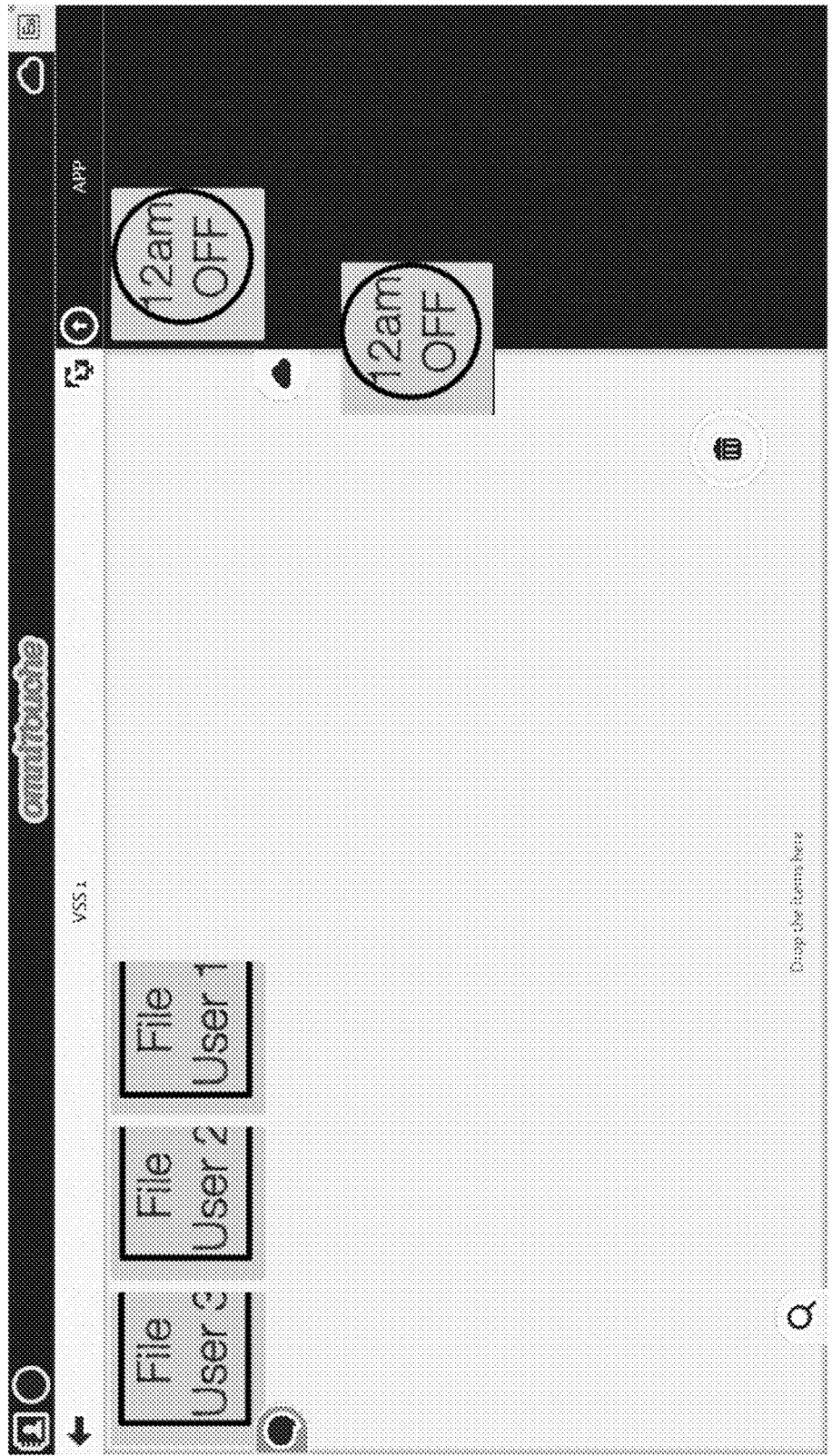
Figure 1.1.G.7 – VSSE – Files & Apps Interaction II
Figure 1.1.G.1 and Figure 1.1.G.2 - VSSE – Files & Apps Interaction II – Context Example Amongst Apps and Users
(SCREENSHOT III - 3 FILES + DRAG AND DROP ALARM APP)
View of VSS 1 from User 1 (Employee B)

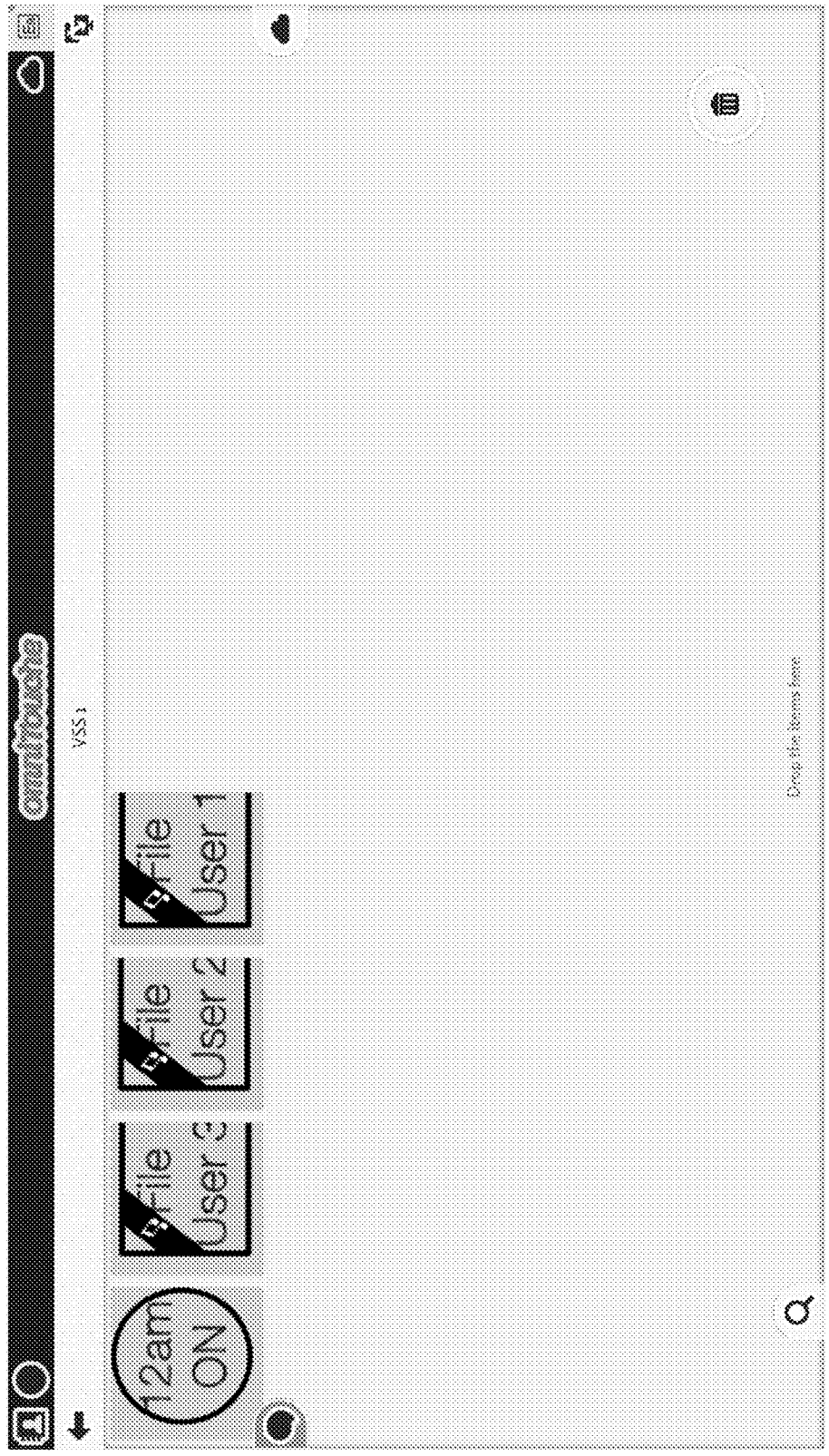
Figure 1.1.G.8 – VSSE – Files & Apps Interaction II
Figure 1.1.G.1 and Figure 1.1.G.2 - VSSE – Files & Apps Interaction II – Context Example Amongst Apps and Users (SCREENSHOT IV - The Virtual Alarm App Adds Context , the 3 users will be notified about the virtual alarm + The Virtual Alarm App will add those 3 users to their notification list)
View of VSS 1 from User 1 (Employee B)

Figure 1.1.G.9— VSSE – Files & Apps Interaction II
Figure 1.1.G.3 and Figure 1.1.G.4 - VSSE – Files & Apps Interaction II – Context Example Amongst Apps and Files
(SCREENSHOT I - 3 PHOTOS)
View of VSS 1 from User 1 (Employee B)

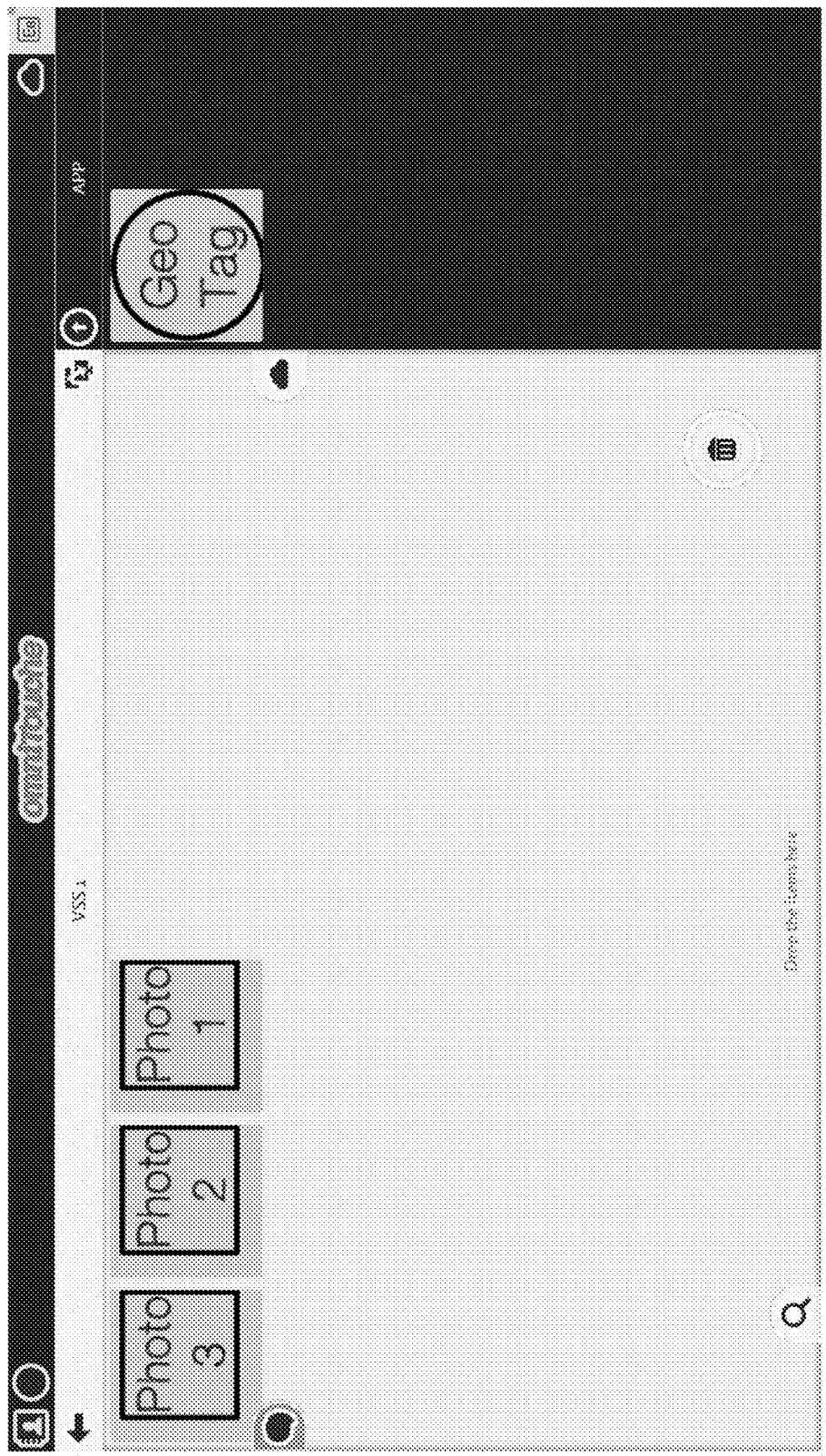
Figure 1.1.G.10– VSSE – Files & Apps Interaction II
Figure 1.1.G.3 and Figure 1.1.G.4 - VSSE – Files & Apps Interaction II – Context Example Amongst Apps and Files
(SCREENSHOT II - 3 PHOTOS + GEO-TAG APP)
View of VSS 1 from User 1 (Employee B)

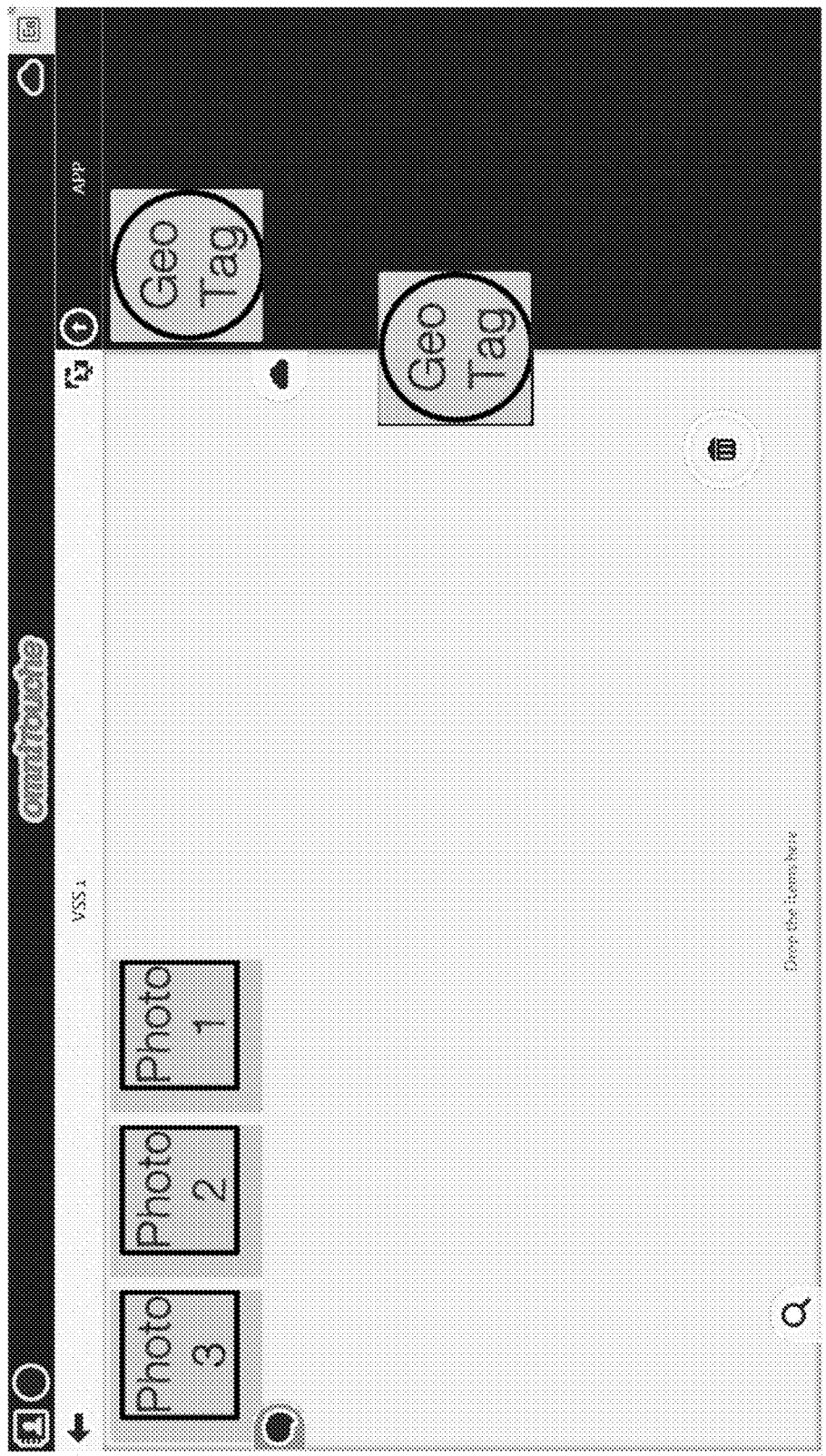
Figure 1.1.G.11 – VSSE – Files & Apps Interaction II
Figure 1.1.G.3 and Figure 1.1.G.4 - VSSE – Files & Apps Interaction II – Context Example Amongst Apps and Files (SCREENSHOT III - 3 PHOTOS + GEO-TAG DRAG AND DROP from UCS to VSS 1)
View of VSS 1 from User 1 (Employee B)

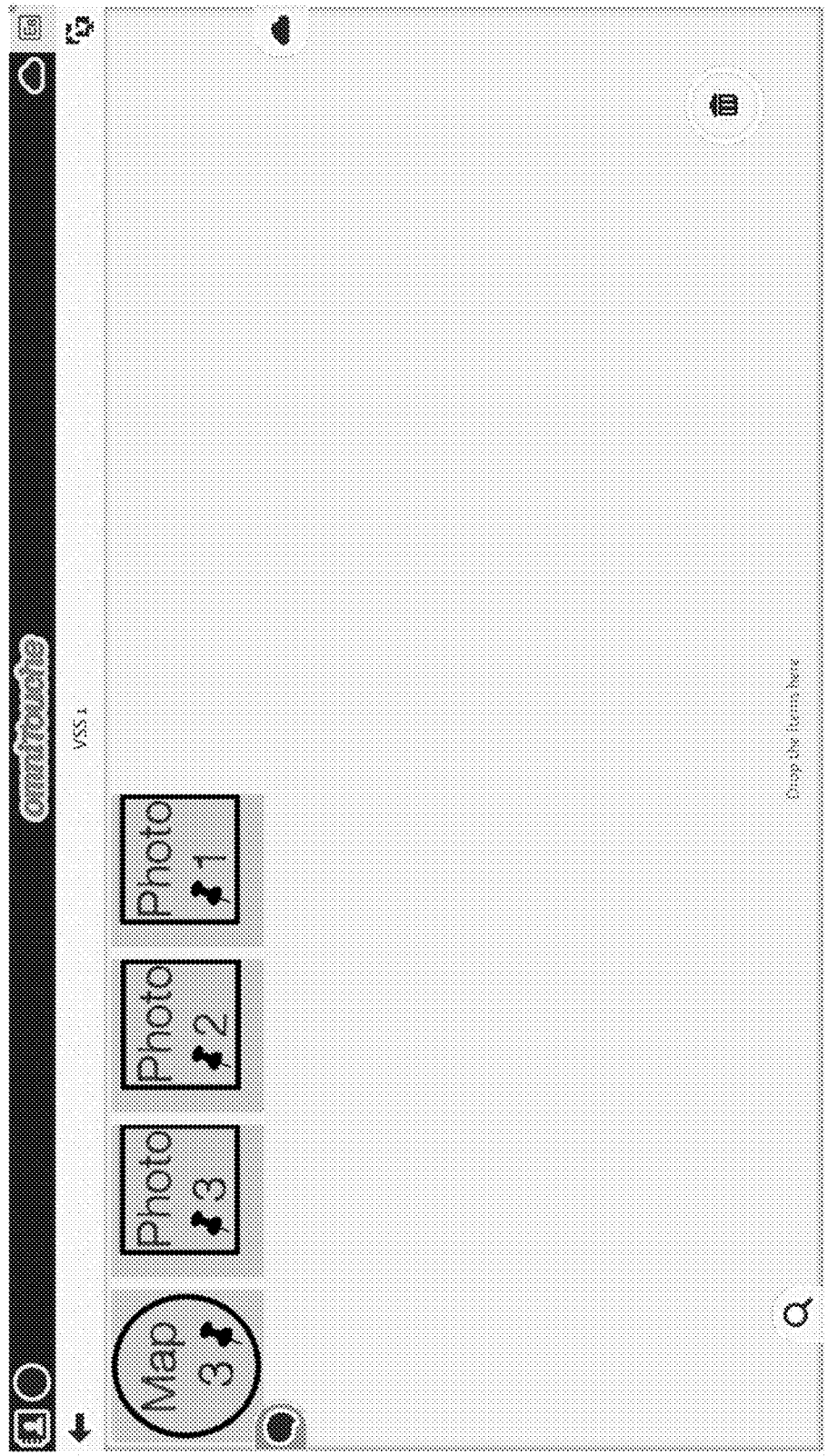

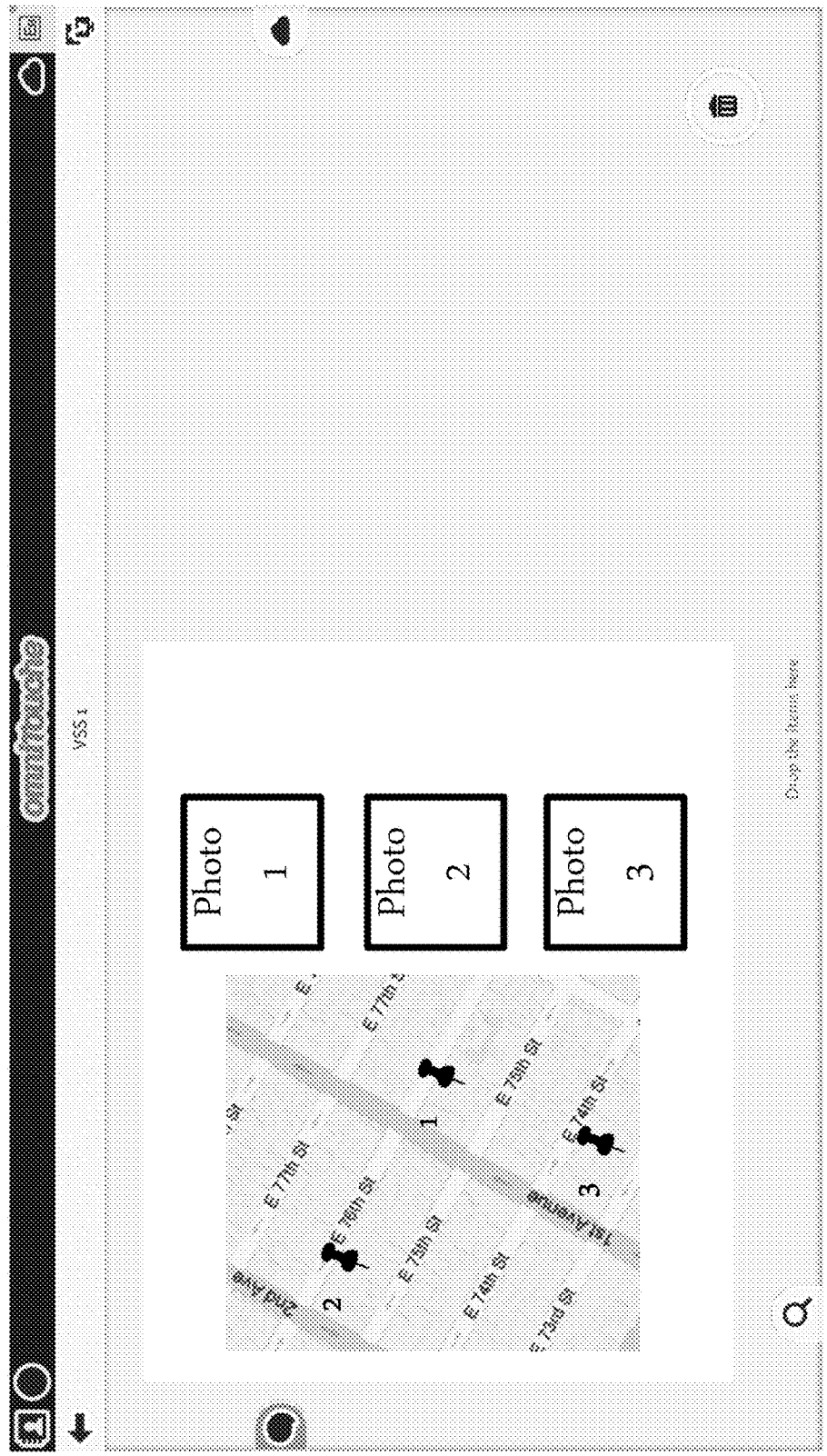
Figure 1.1.G.13 – VSSE – Files & Apps Interaction II
Figure 1.1.G.4 - VSSE – Files & Apps Interaction II – Context Example Amongst Apps and Files
(SCREENSHOT V - The Virtual App Adds 3 virtual photo files to the map)
View of VSS 1 from User 1 (Employee B)

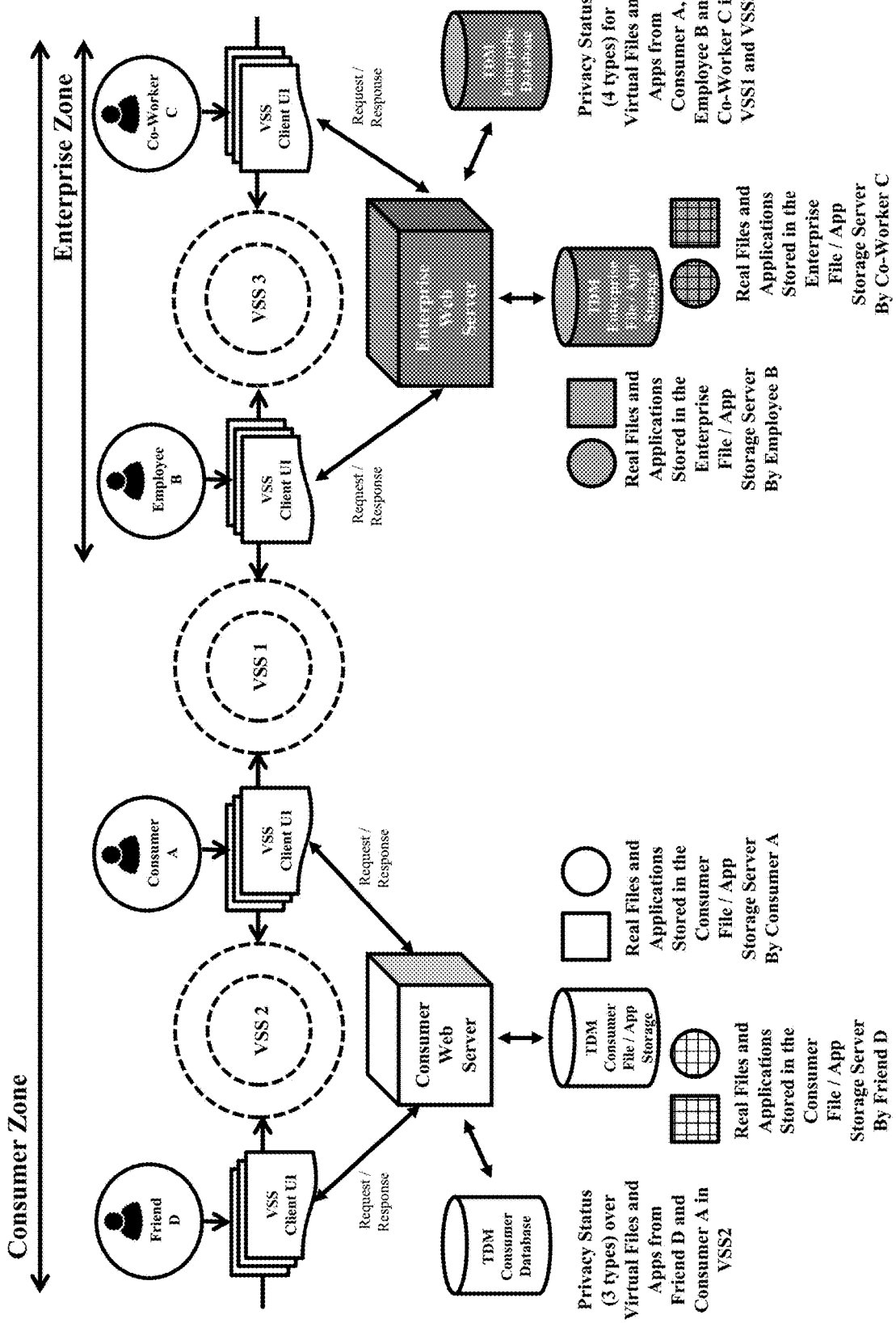
Figure 1.1H – VSSE – Privacy & Zones I

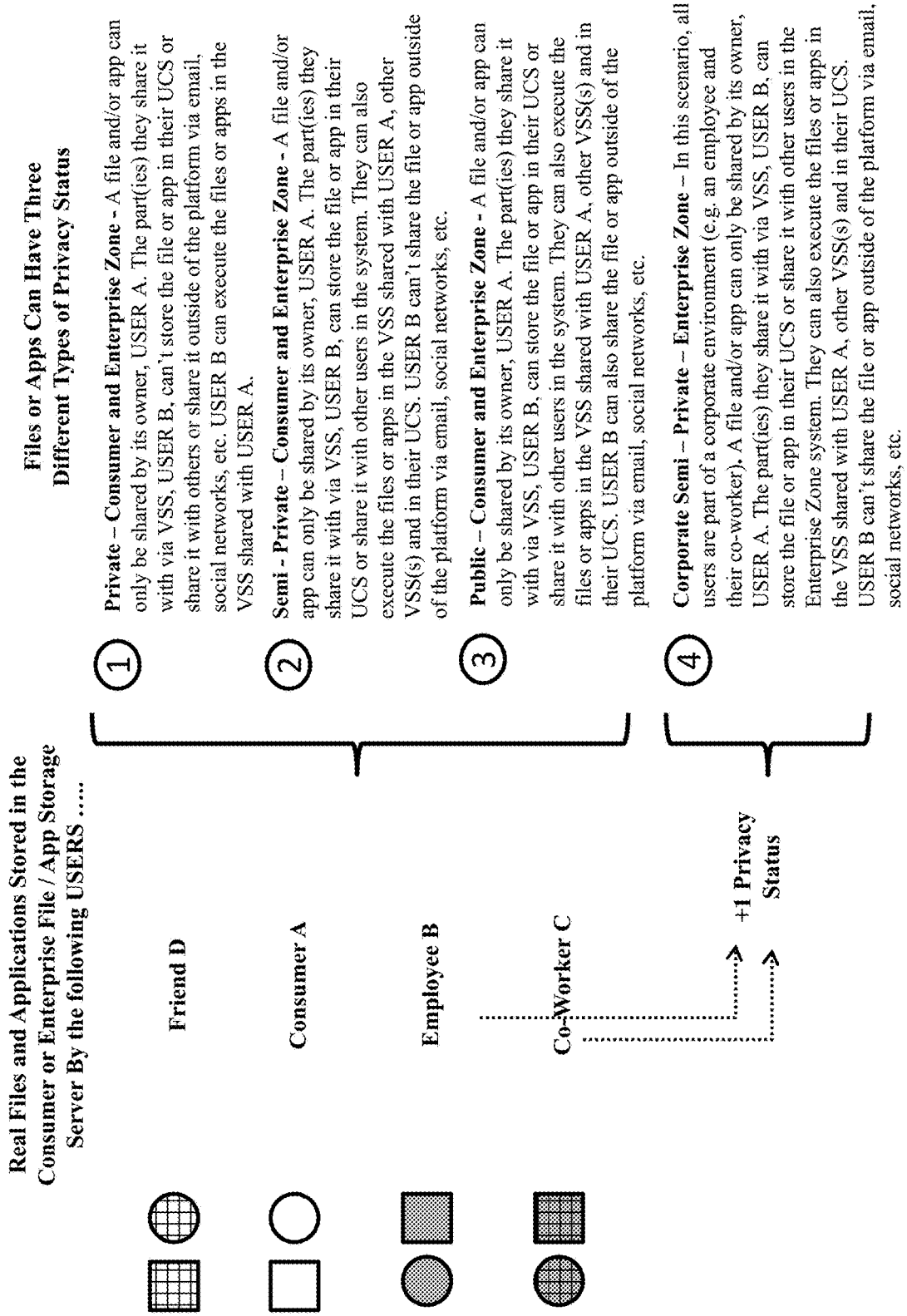
Figure 1.1l – VSSE– Privacy & Zones II

Figure 1.1.J – VSS Client UI - Schematically

Figure 1.1.J.1 VSS Client UI – Properties

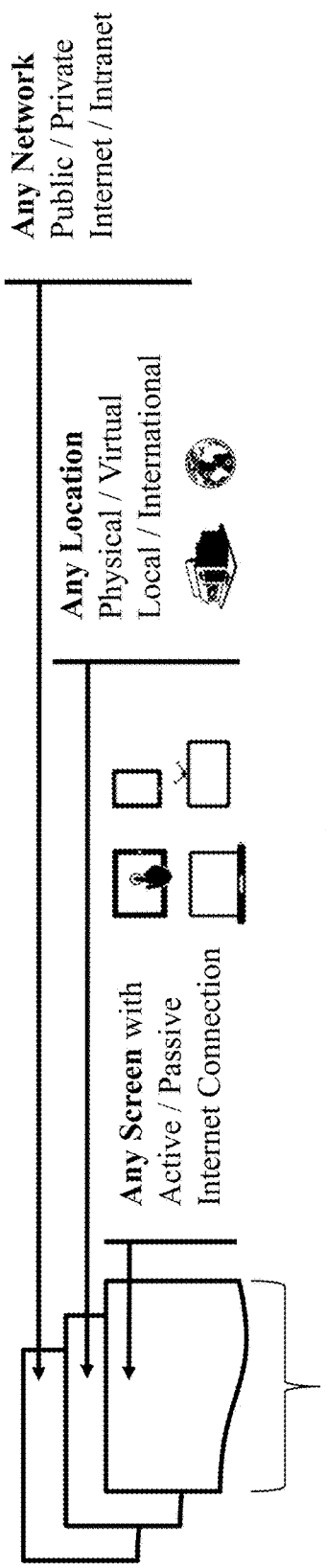

Any Screen with Active / Passive Internet Connection

Any Location Physical / Virtual Local / International

Any Network Public / Private Internet / Intranet

Cloud Based UI – Hardware and Operating System Independent
- Hardware Independent
- Operating System Independent
- Personalized User Interface - Configurability by User and/or Network Administrator

Figure 1.1.J.2 – Hardware Independent

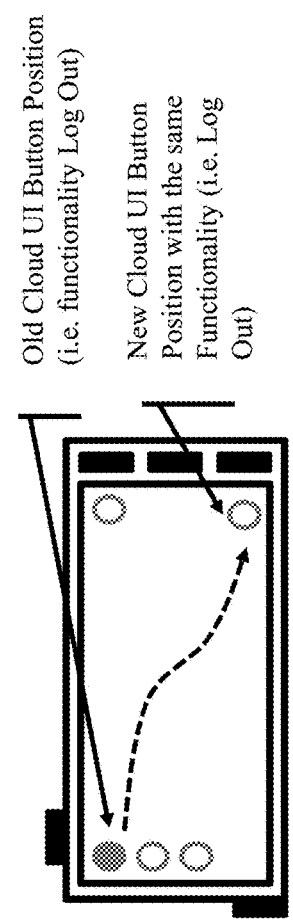

Device
Screen

Figure 1.1.J.3 – Personalized User Interface

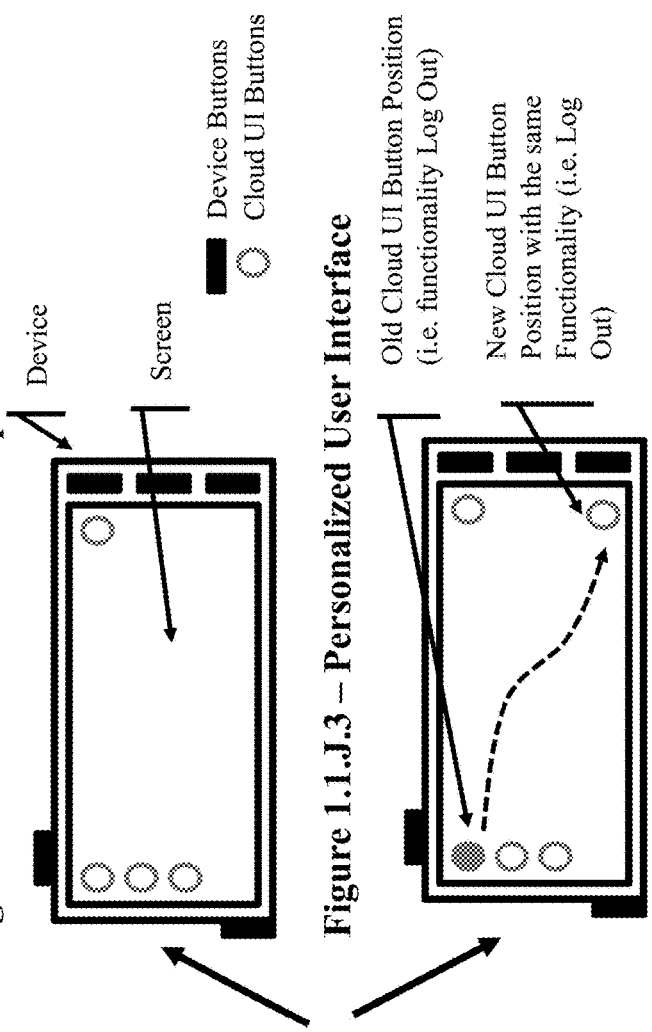

■ Device Buttons
○ Cloud UI Buttons

Old Cloud UI Button Position (i.e. functionality Log Out)

New Cloud UI Button Position with the same Functionality (i.e. Log Out)

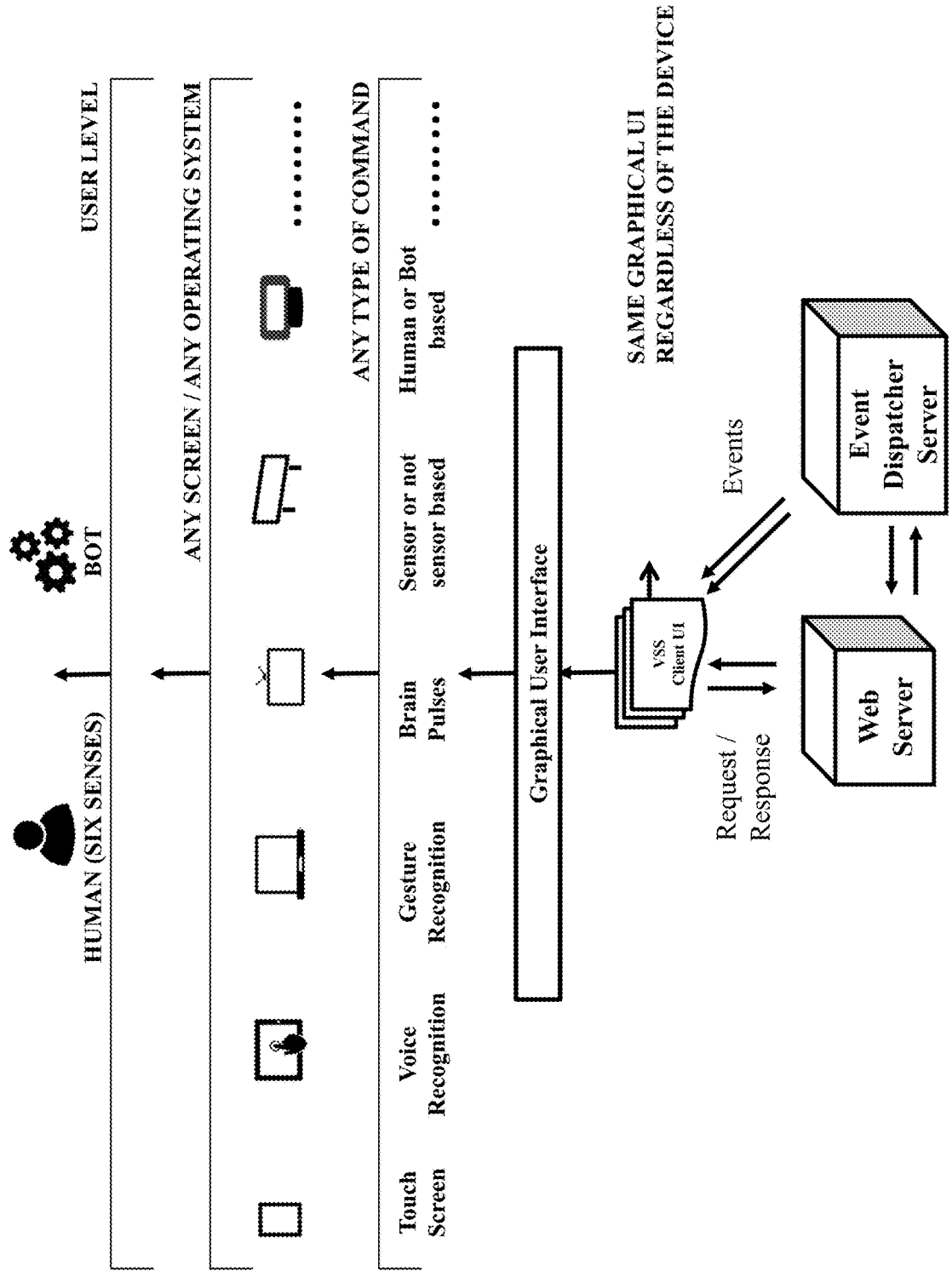

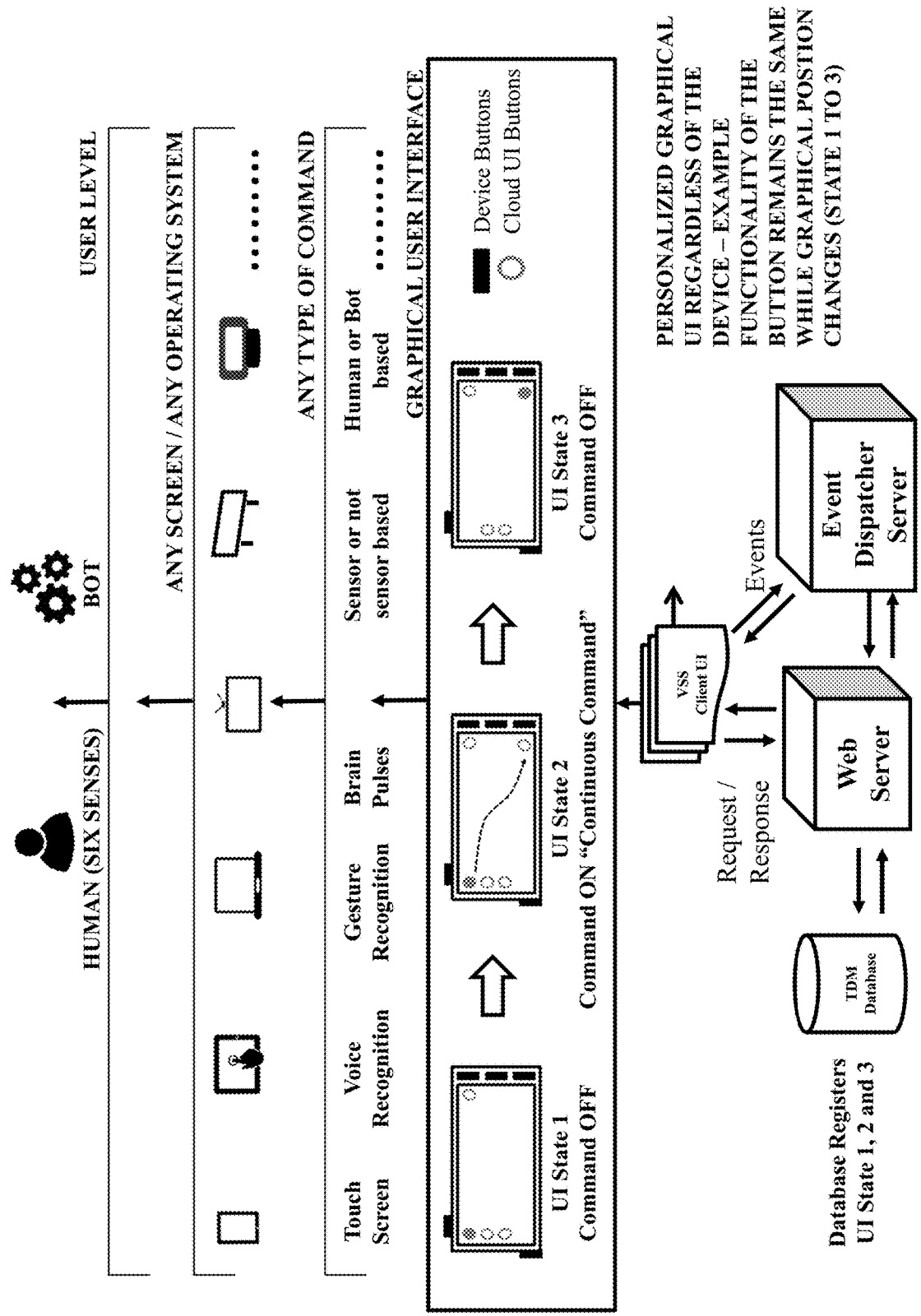

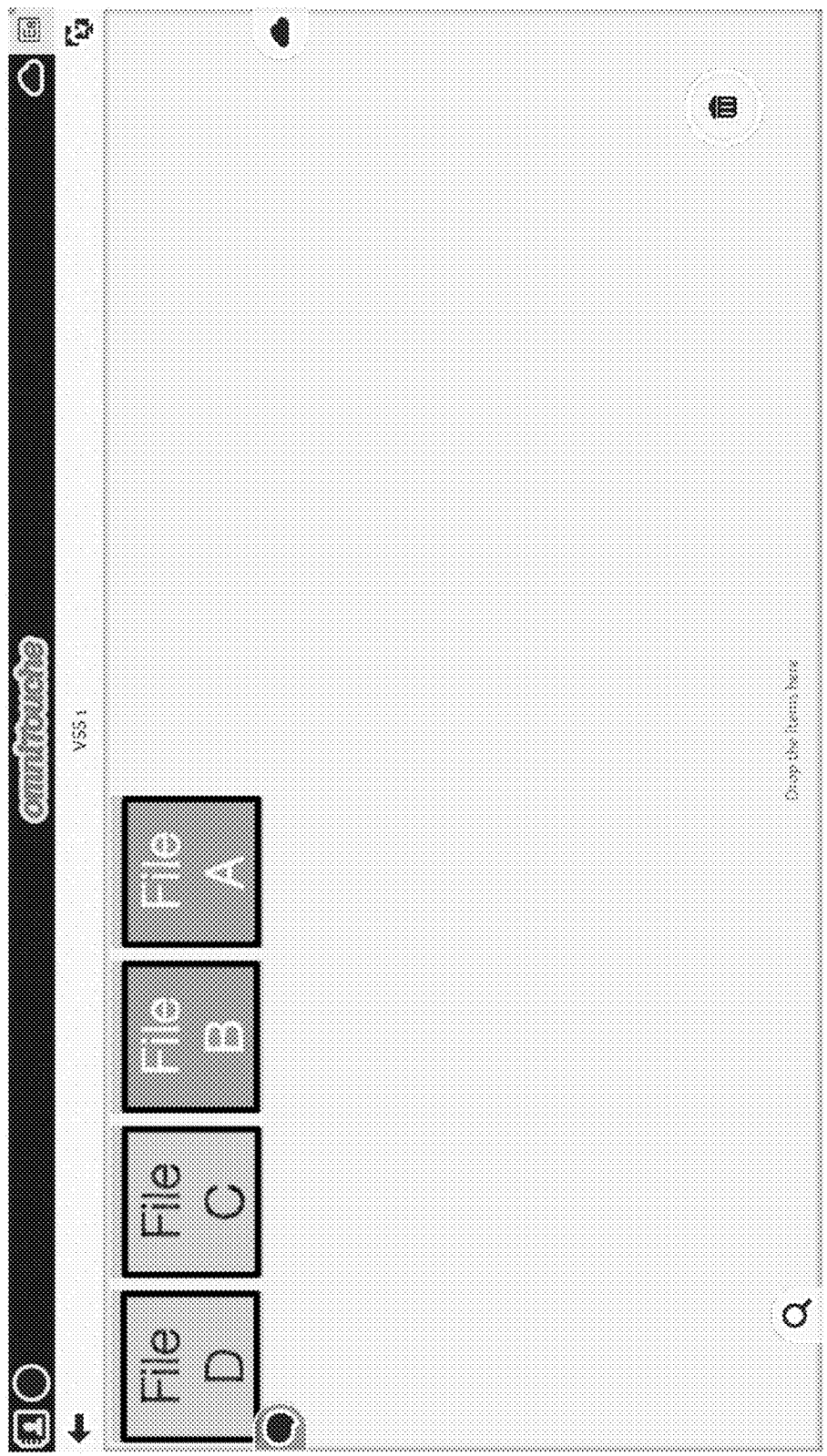
Figure 1.1.K.2A – VSS Client UI – Personalized User Interface (SCREENSHOT I - 4 FILES)
View of VSS 1 from User 1 (Employee B)

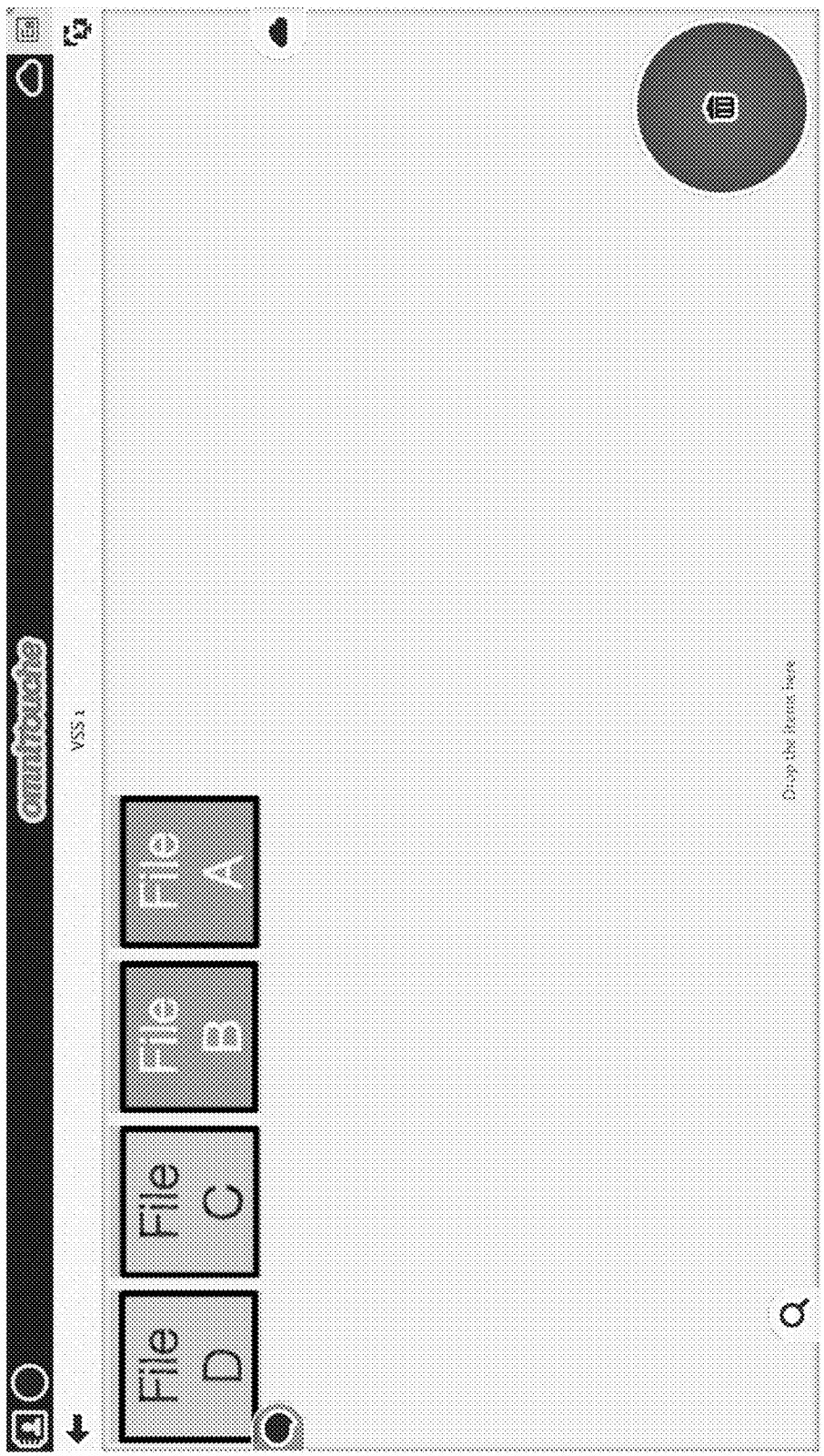
Figure 1.1.K.2B– VSS Client UI – Personalized User Interface
(SCREENSHOT II - DELETE BUTTON ACTIVATED)
View of VSS 1 from User 1 (Employee B)

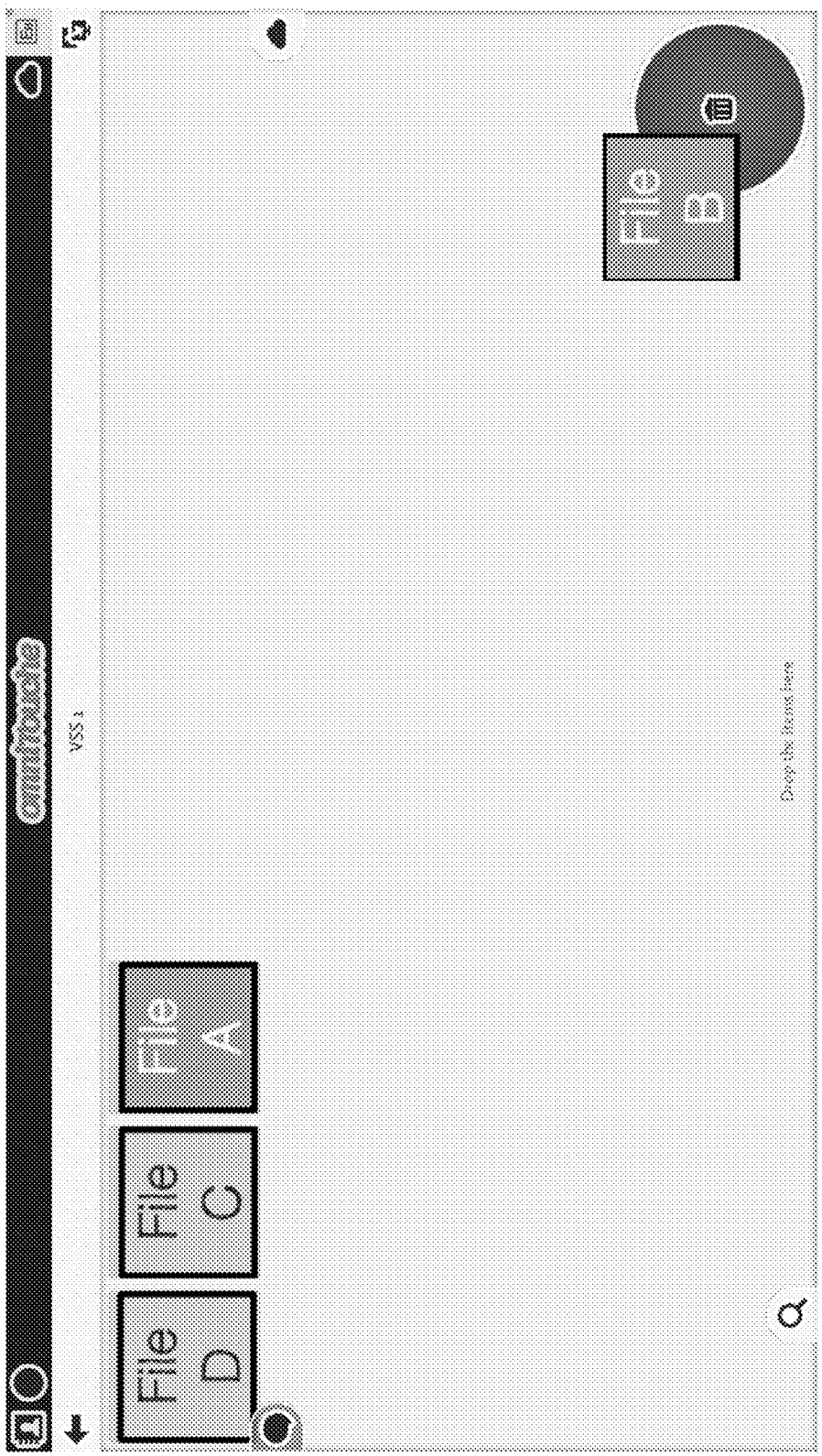

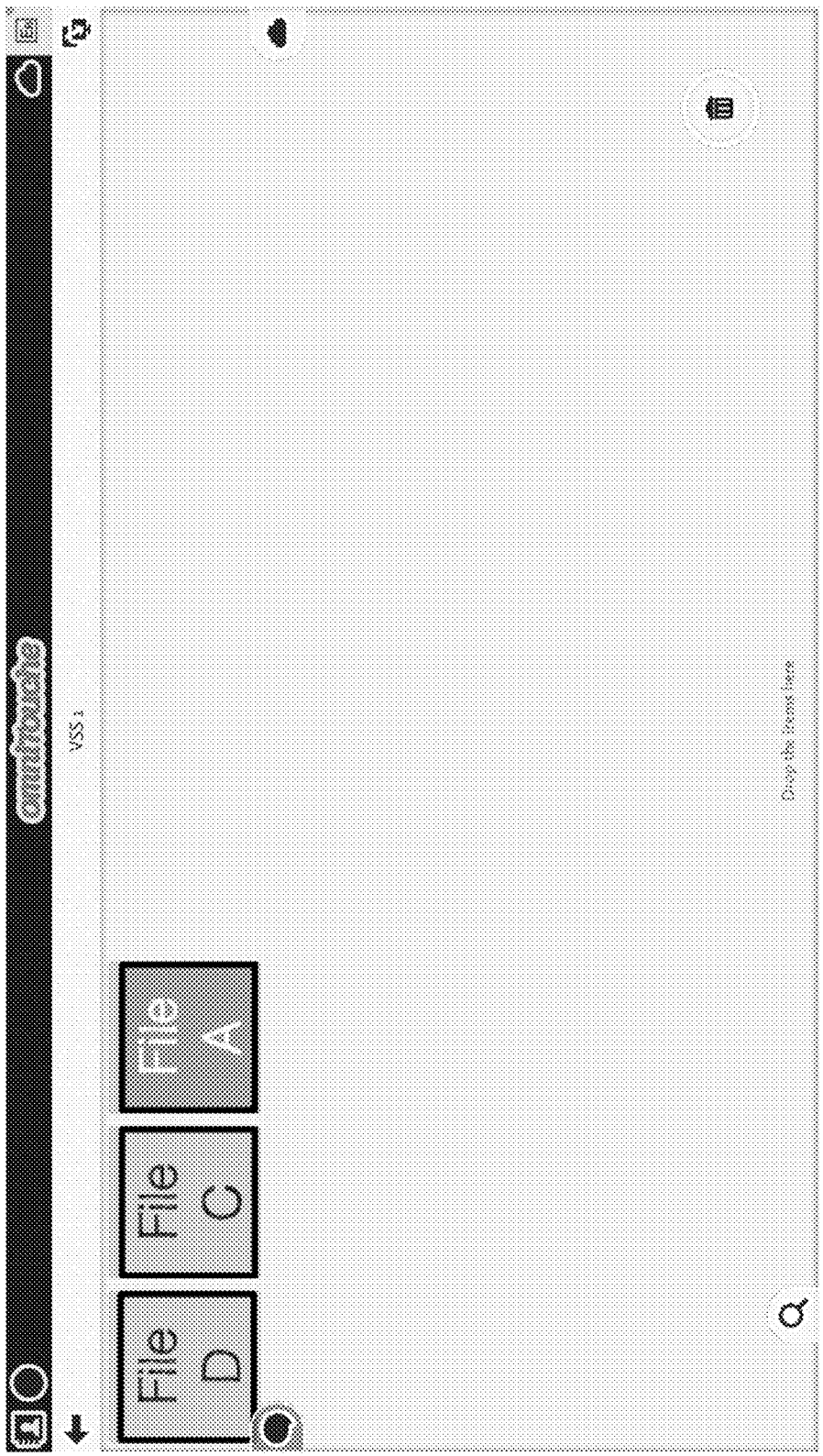
Figure 1.1.K.2D – VSS Client UI – Personalized User Interface
(SCREENSHOT IV - FILE B DELETED + DELETE BUTTON DEACTIVATED)
View of VSS 1 from User 1 (Employee B)

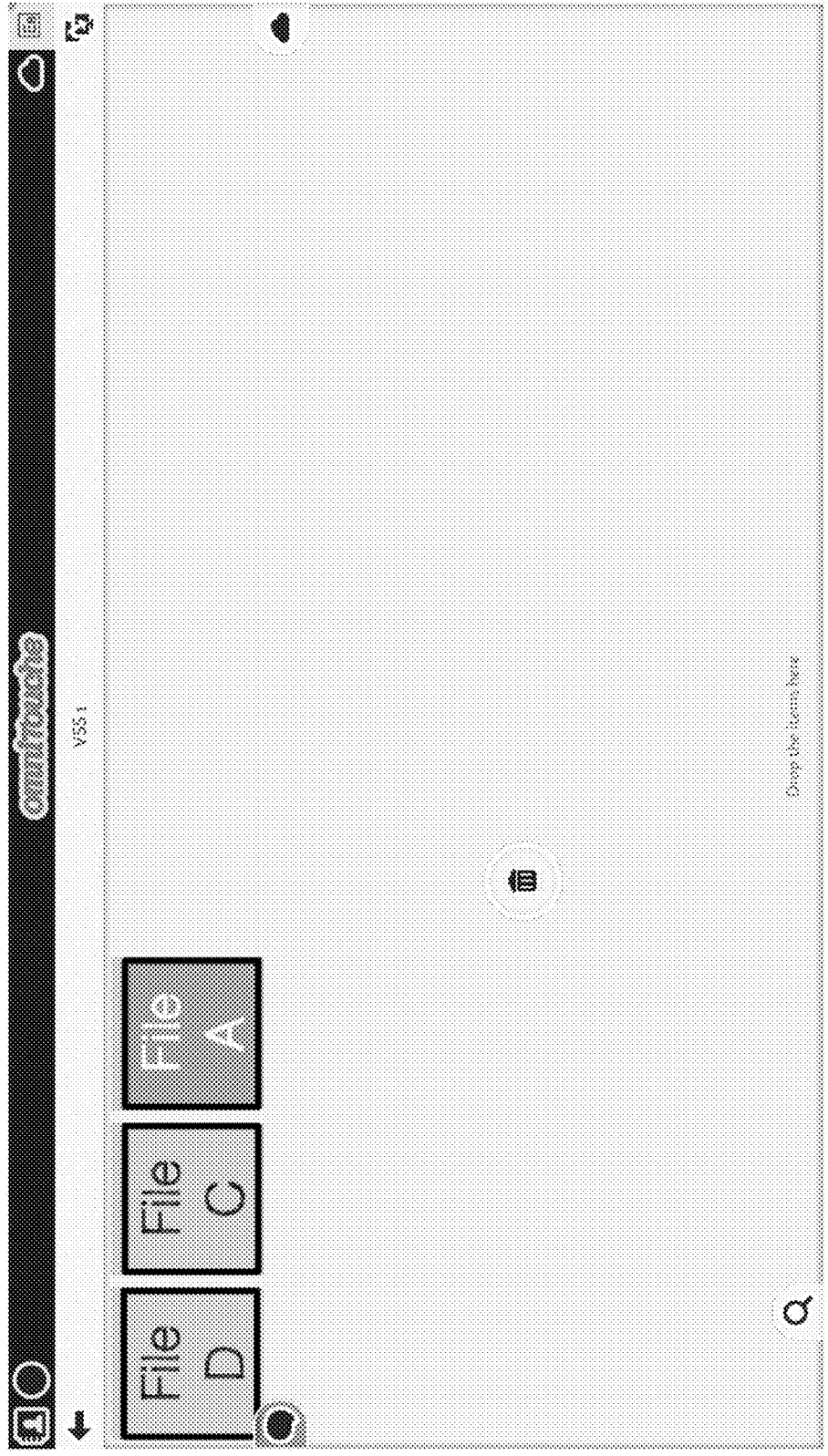
Figure 1.1.K.2E – VSS Client UI – Personalized User Interface
(SCREENSHOT V – MOVING THE DELETE BUTTON FROM THE LEFT OF THE SCREEN TO SLIGHTLY THE RIGHT SIDE OF THE MIDDLE OF THE SCREEN)
View of VSS 1 from User 1 (Employee B)

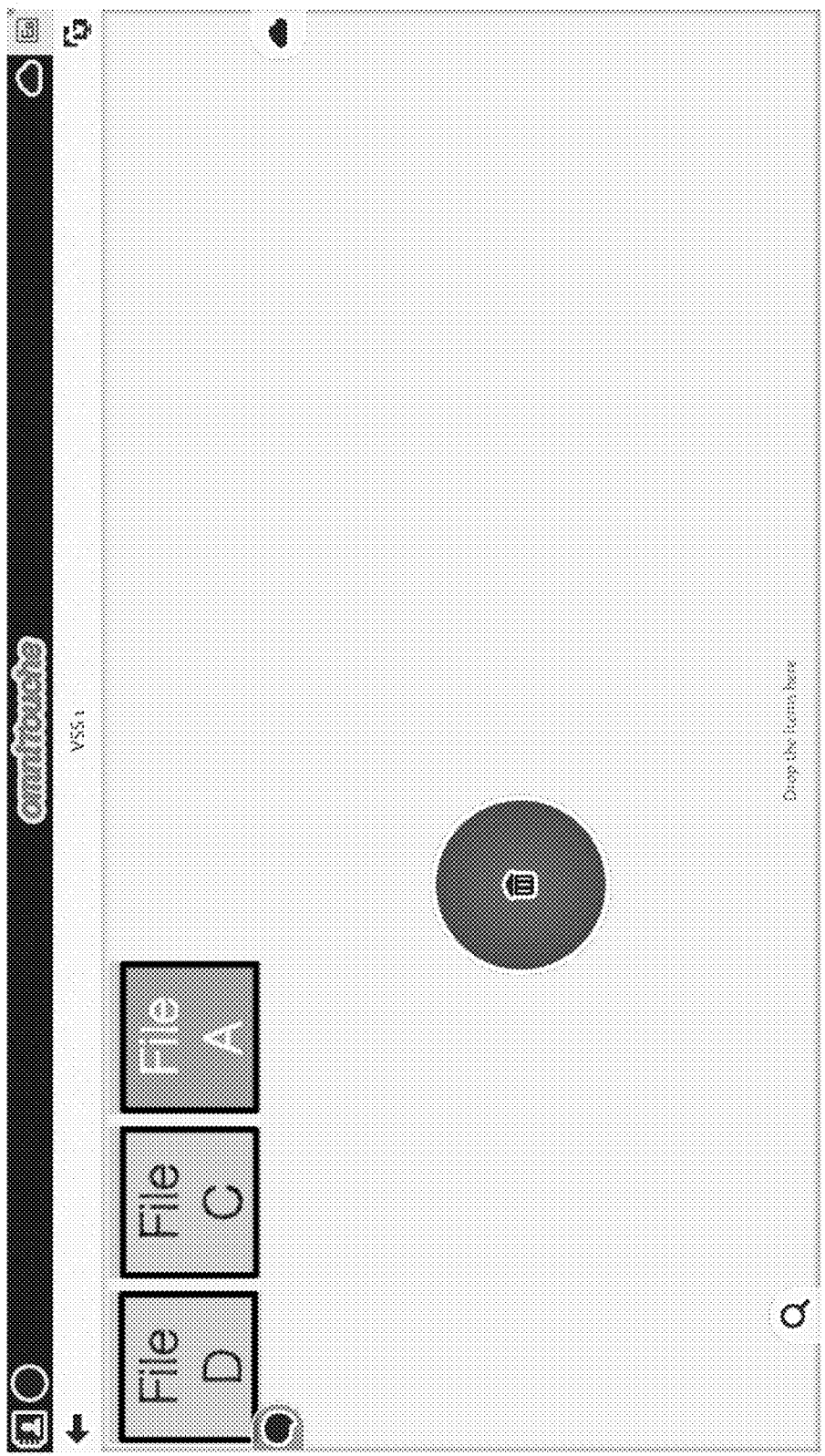

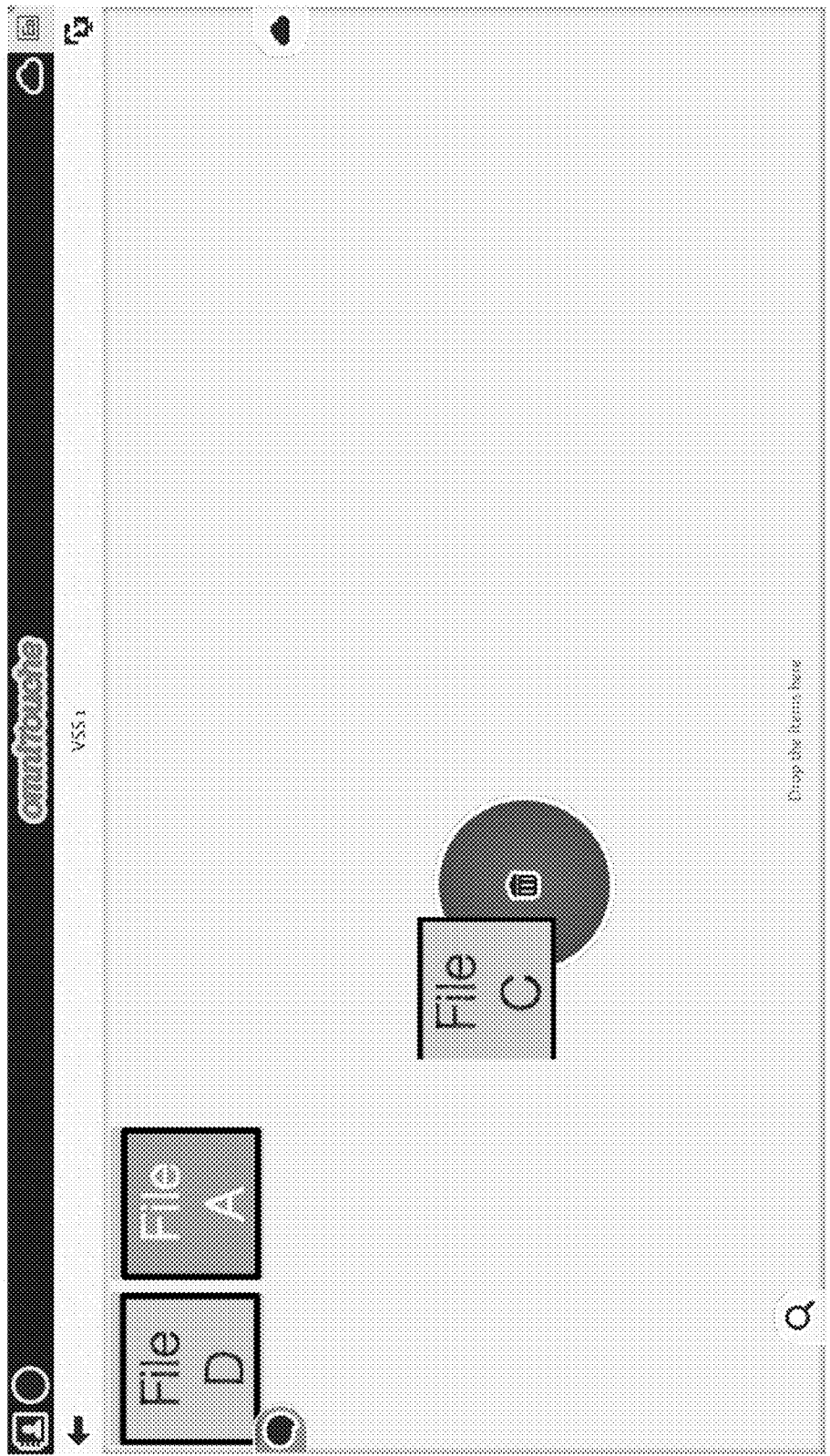
Figure 1.1.K.2G— VSS Client UI – Personalized User Interface
(SCREENSHOT VII – DELETING FILE C – DELETE BUTTON MAINTAINS FUNCTIONALITY DESPITE NEW DELETE BUTTON POSITION)
View of VSS 1 from User 1 (Employee B)

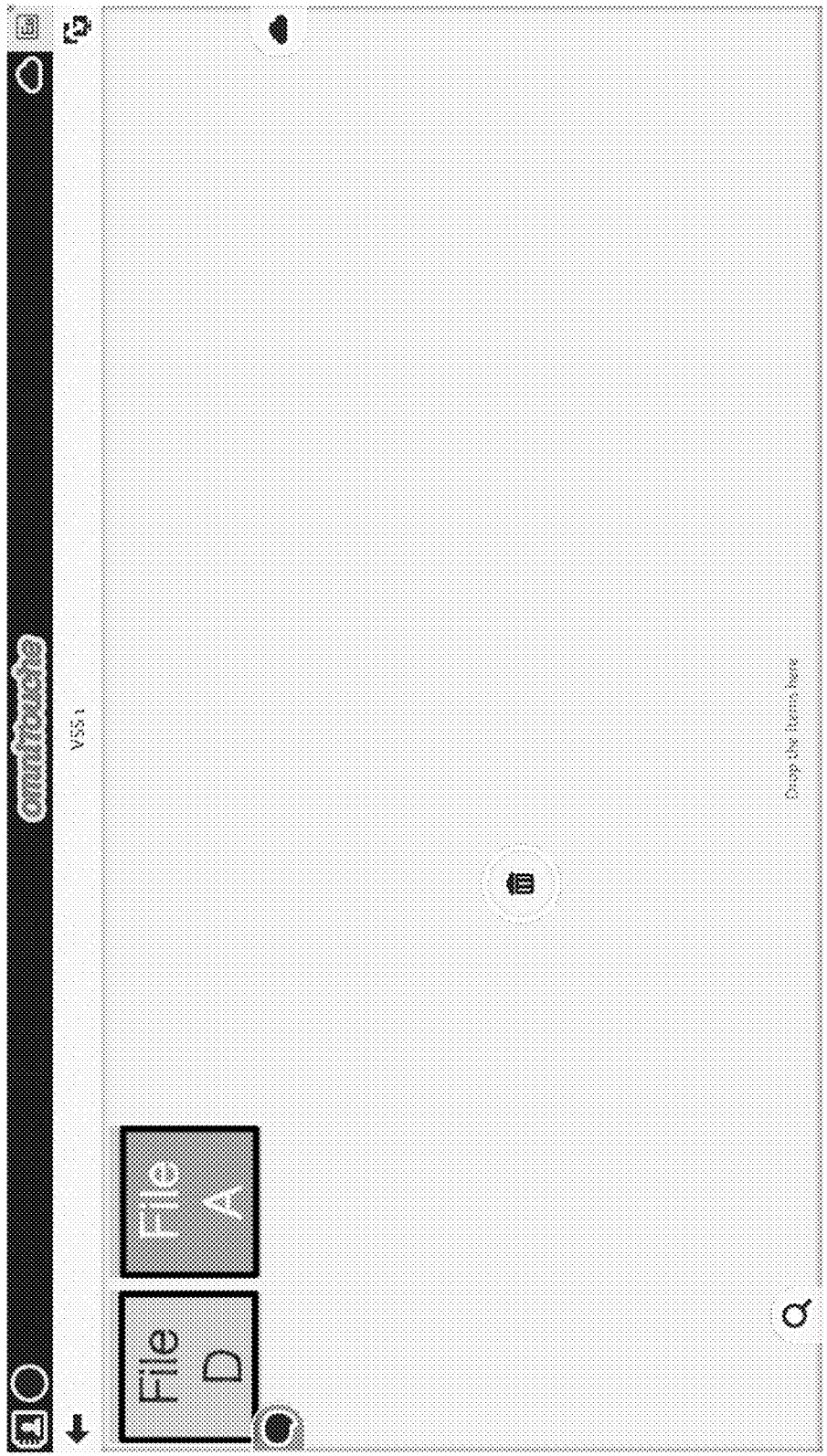
Figure 1.1.K.2H – VSS Client UI – Personalized User Interface (SCREENSHOT VIII – DELETE BUTTON DEACTIVATED AGAIN)
View of VSS 1 from User 1 (Employee B)

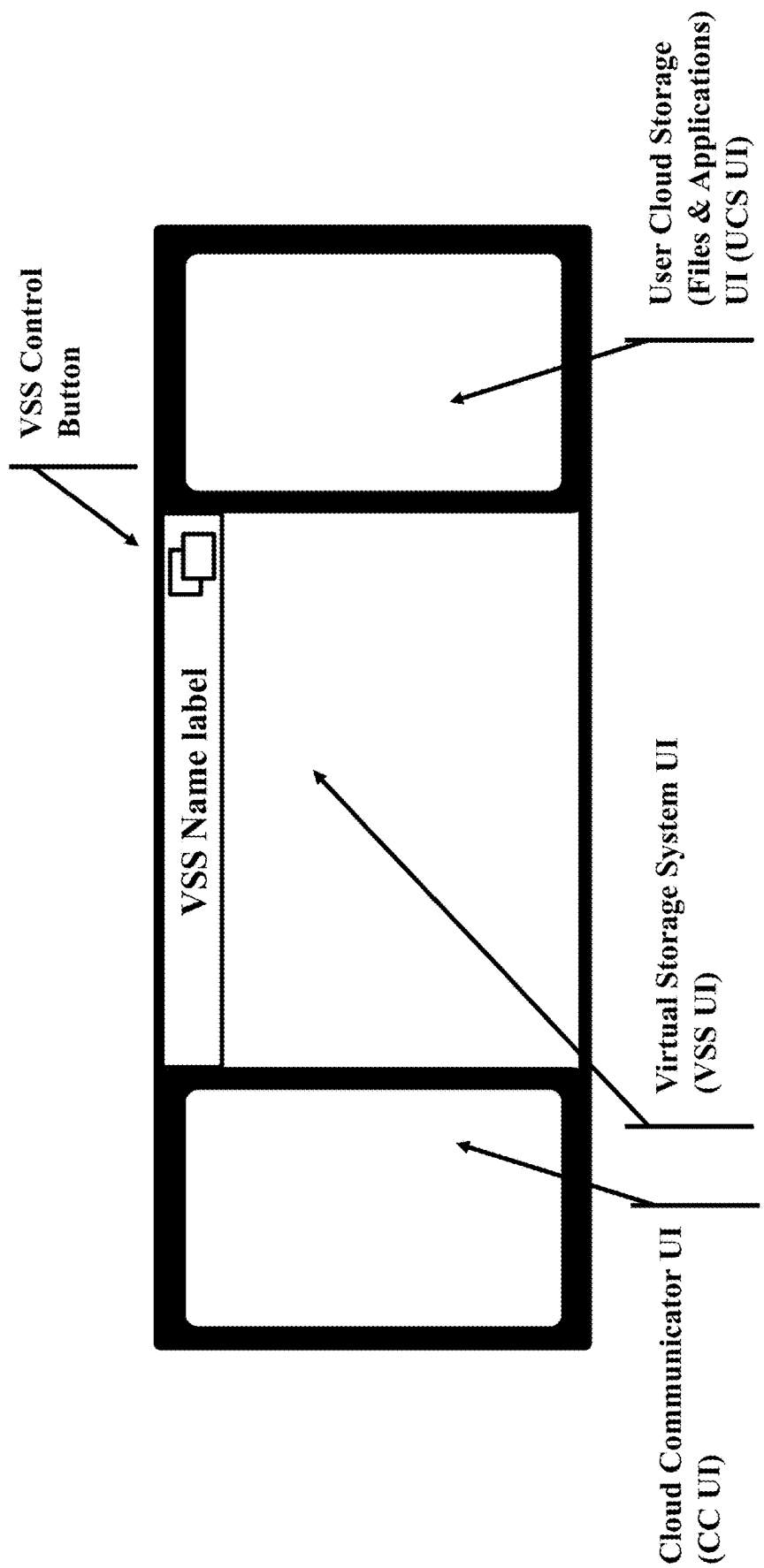
Figure 1.2 – VSS Client UI

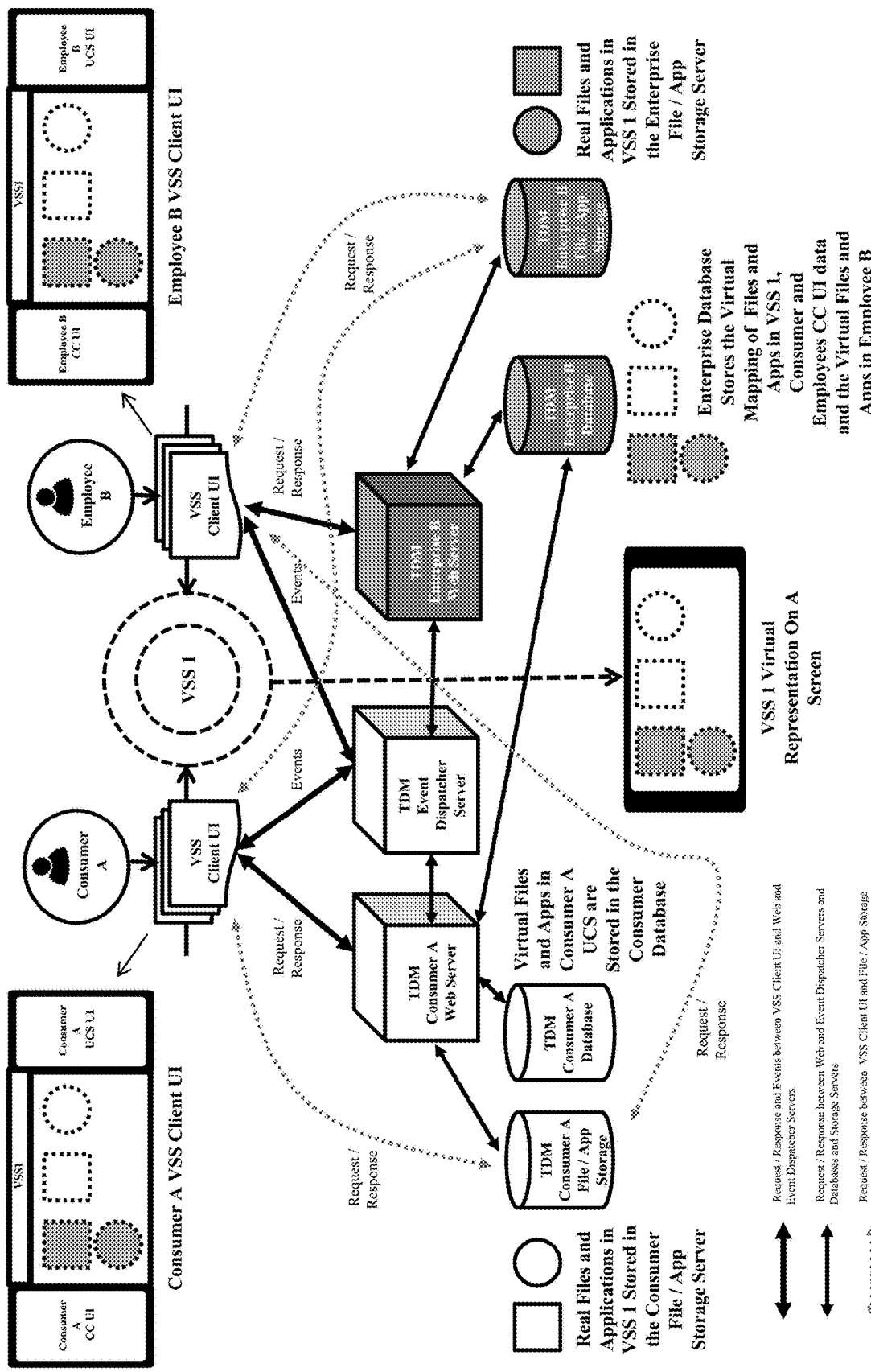
Figure 1.2.A – VSS Client UI - Detail

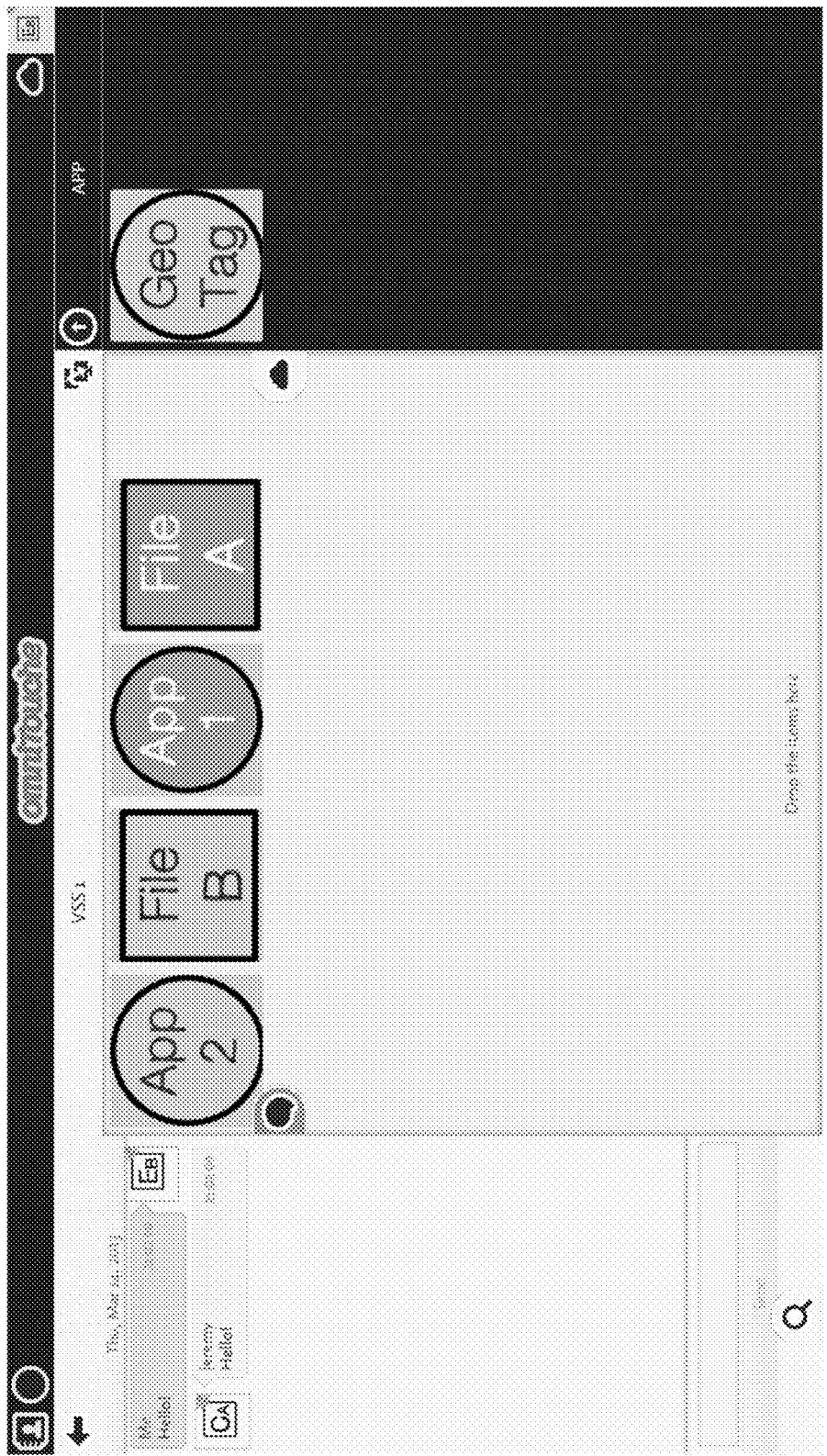
Figure 1.2.A1 – VSS Client UI – Detail
(SCREENSHOT I – VSS CLIENT UI WITH CC AT THE LEFT (i.e. CHAT) AND UCS AT THE RIGHT (i.e. APP))
View of VSS 1 from User 1 (Employee B)

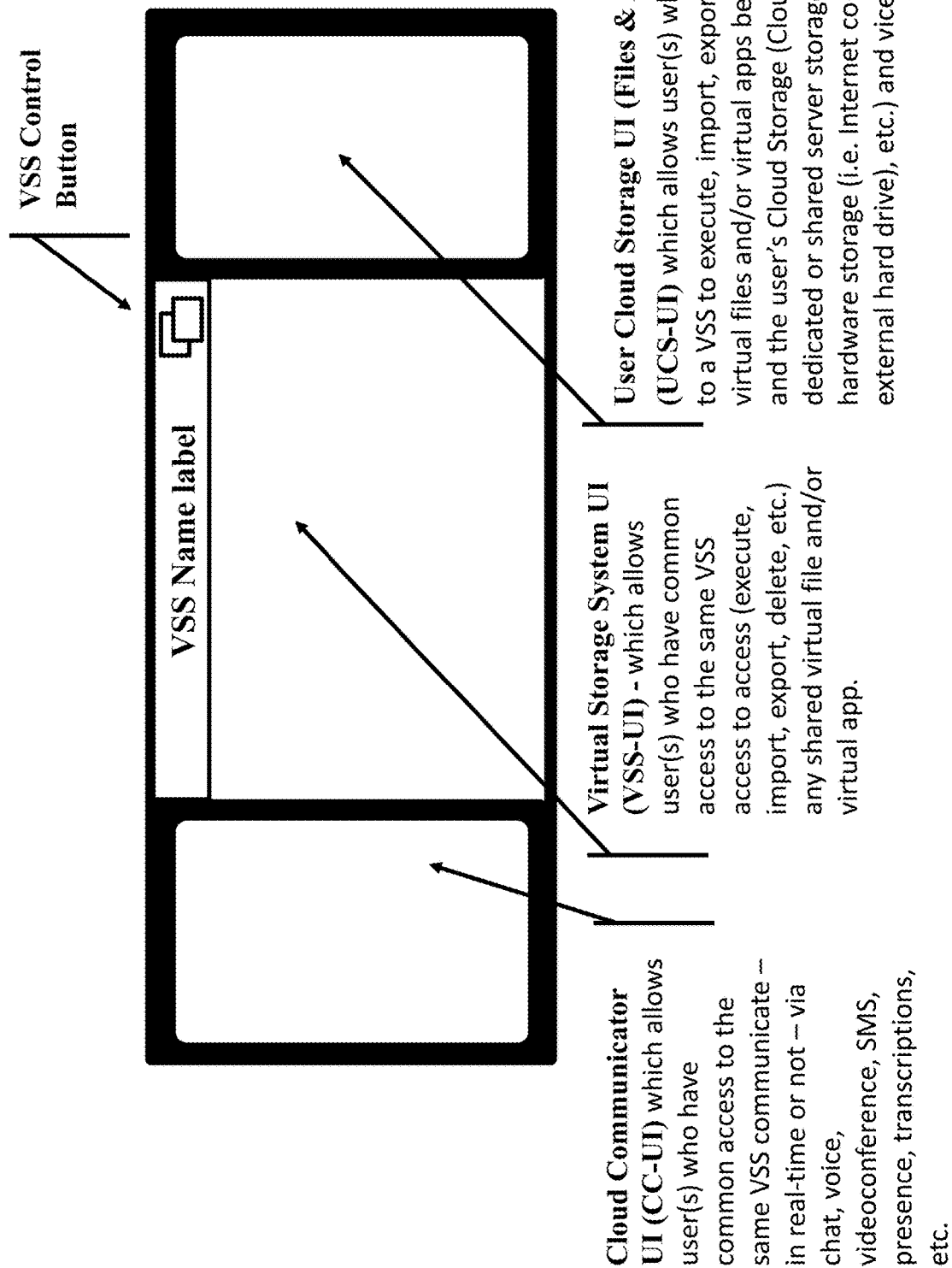
Figure 1.2.B - VSS Client UI – VSS Features

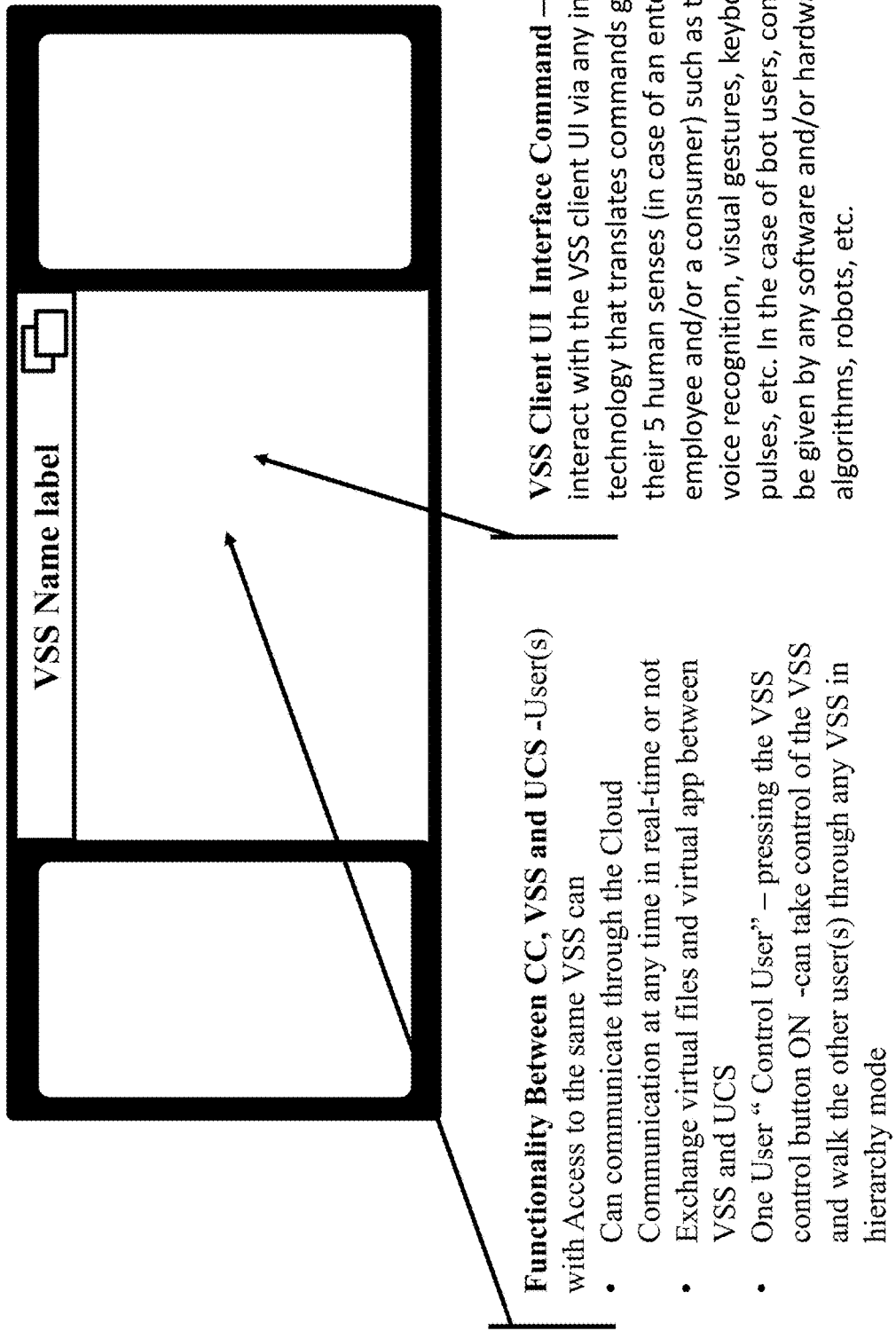
Figure 1.2.C – VSS Client UI – VSS Functionality between CC, VSS and UCS Figure 1.2.D – VSS Client UI- VSS Control Button OFF Vs ON – Features and Functionalities

Figure 1.2.D.2 – VSS Control Button ON

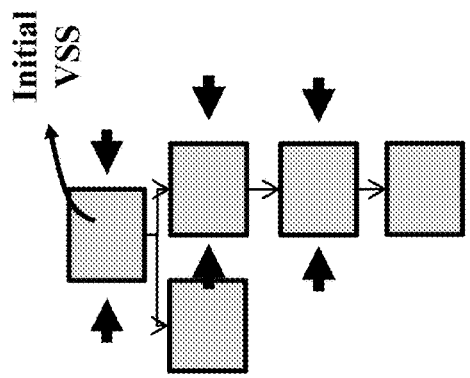

VSS Control Button ON - the VSS Client UI presents users with a functionality called "Control Button". When one user with access to a VSS (initial VSS) turns the Control Button ON it becomes the user (User Control) that takes control of the initial VSS, dragging all other user(s) that had access to that VSS at that moment from the initial VSS through any VSS in hierarchy mode. User(s) (user control and the rest of users) can interact with all virtual files and virtual apps in the VSS that the User Control has decided to access at that moment.

Figure 1.2.D.1 – VSS Control Button OFF

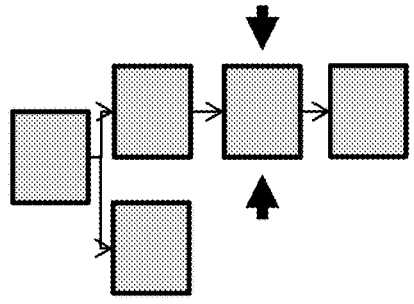

VSS Control Button OFF – VSS Client UI works as described in previous Figures.

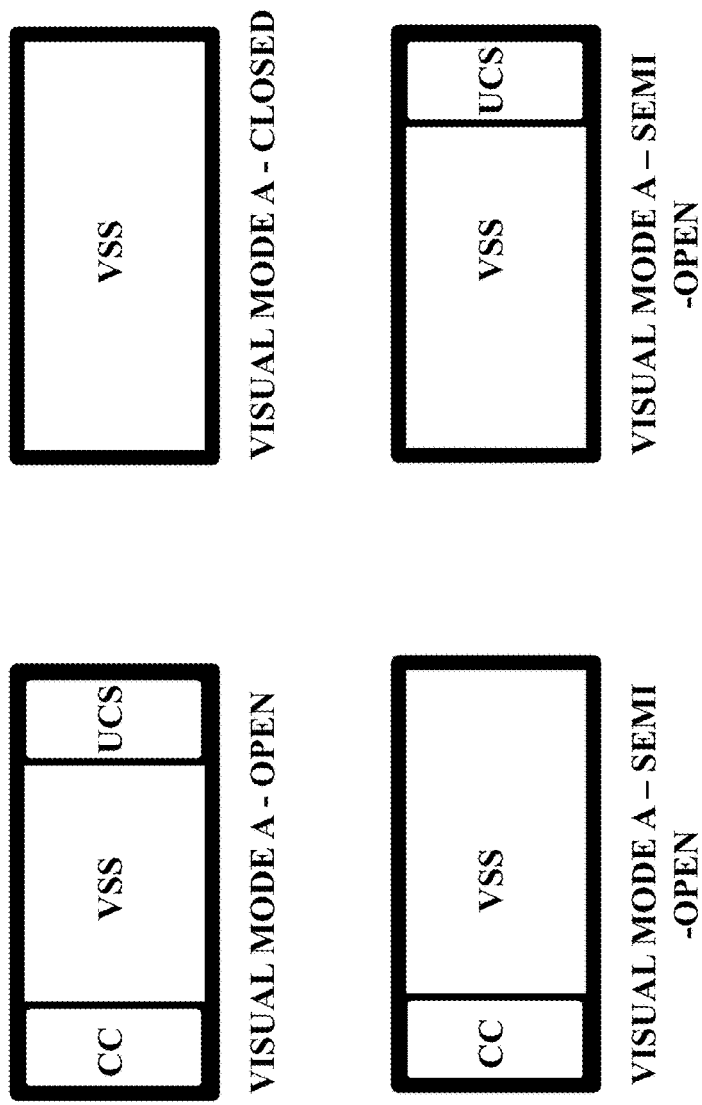
Figure 1.3 – VSS Client UI – UI Varieties

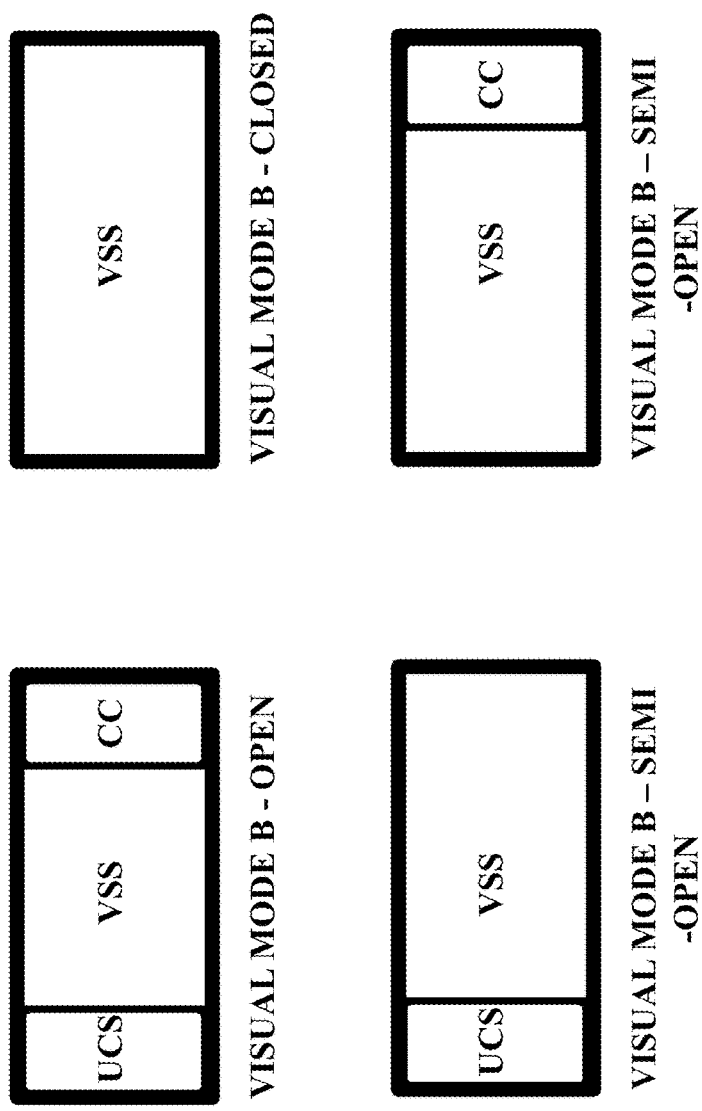
Figure 1.3A – VSS Client UI – UI Varieties
Figure 1.3.B – VSS Client UI – VISUAL MODE B
Footnote: CC - Cloud Communicator UI; VSS – Virtual Storage System UI; UCS - User Cloud Storage UI (Files & Applications)

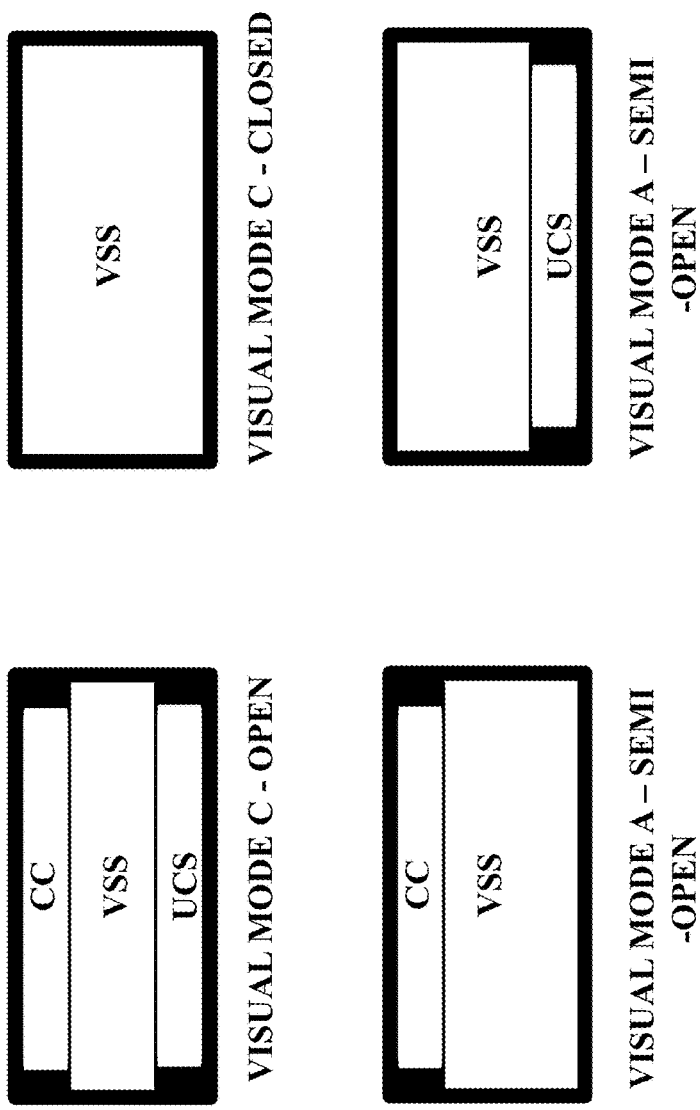

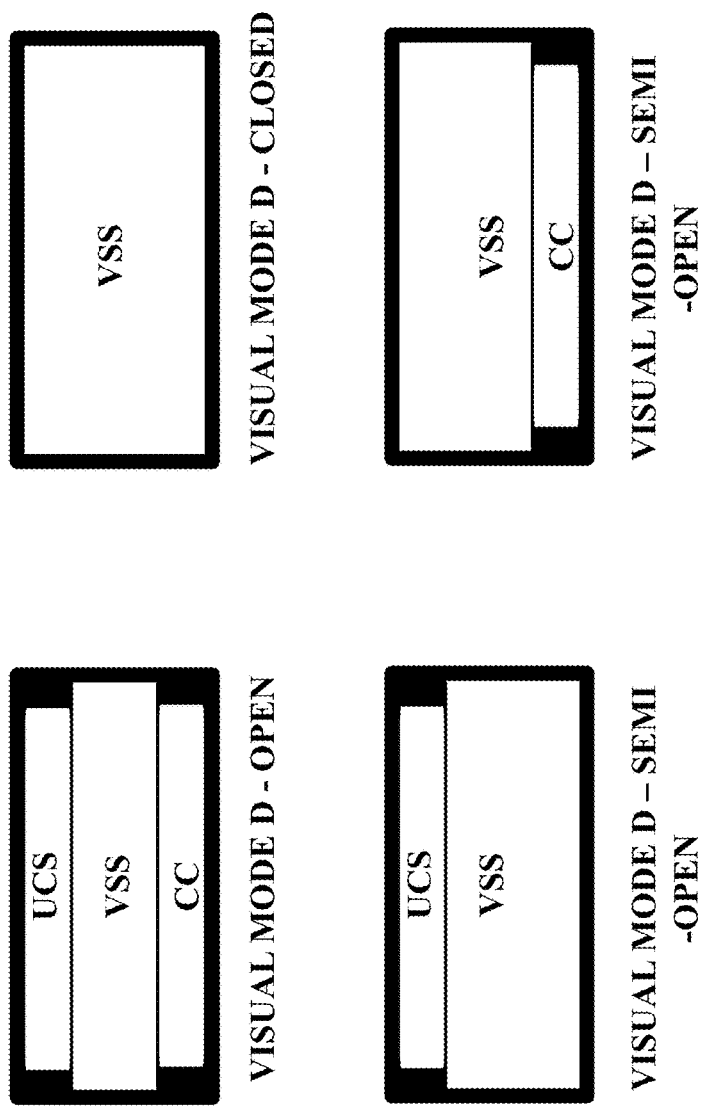

Figure 1.4.A — VSSE — A Detailed App Example
Surf-The-Web

Figure 1.4.A.1 - VSSE – Surf The Web

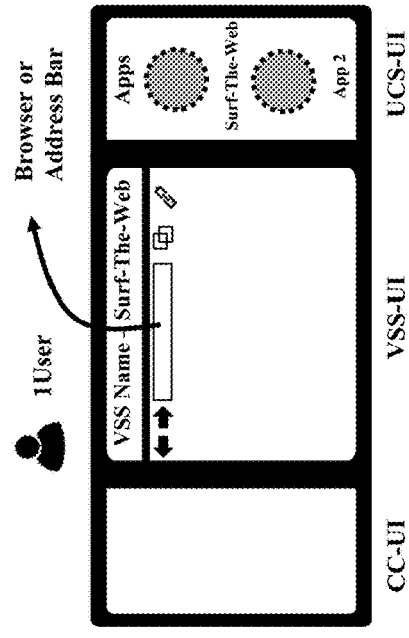

SITUATION 1
A User Drags and Drops 1 App "Surf-The-Web" from UCS to VSS

Figure 1.4.A.2 - VSSE – Surf The Web

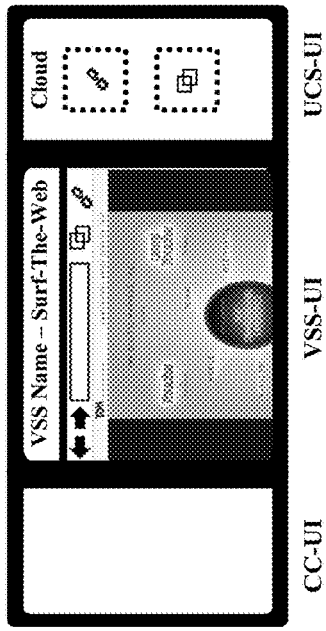

SITUATION 2
When "Surf-The-Web" App drops into the VSS, it starts to execute

Figure 1.4.A.3 - VSSE – Surf The Web

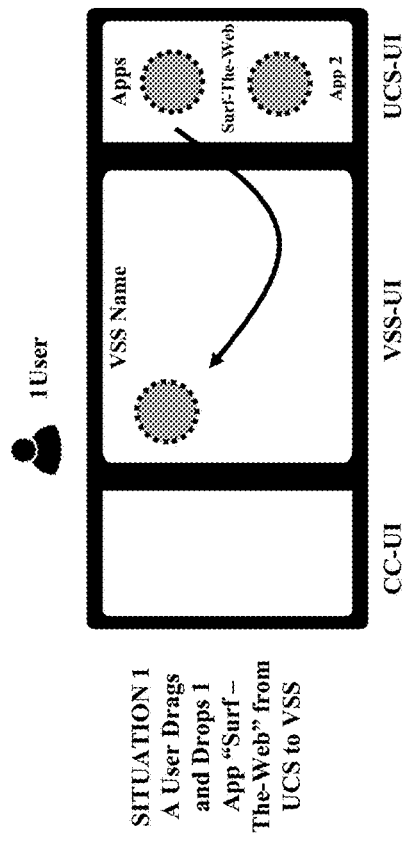

SITUATION 3
The user adds an Intranet / Internet address in the Address Bar (i.e. The Digital Marvels)

Figure 1.4.A.4 - VSSE – Surf The Web

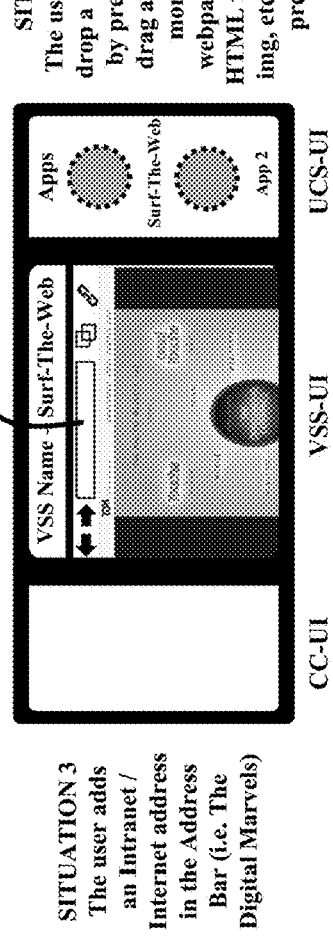

SITUATION 4
The user can drag and drop a URL to the UCS by pressing " ✎ " or drag and drop one or more individual webpage component/s HTML tag(s) (i.e. object, img, etc.) to the UCS by pressing " ⧉ "

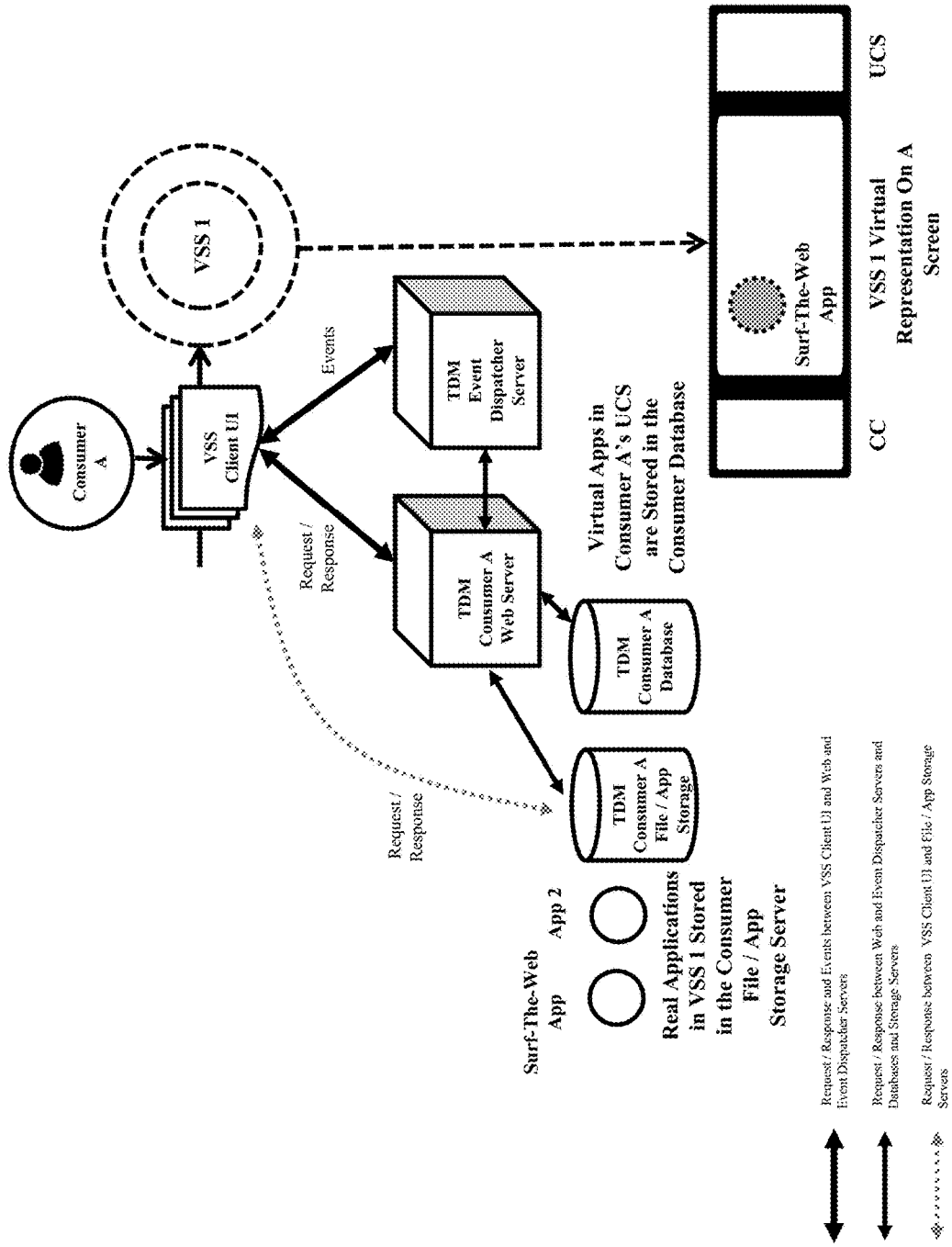
Figure 1.4.B – VSSE – A Detailed App Example Surf-The-Web

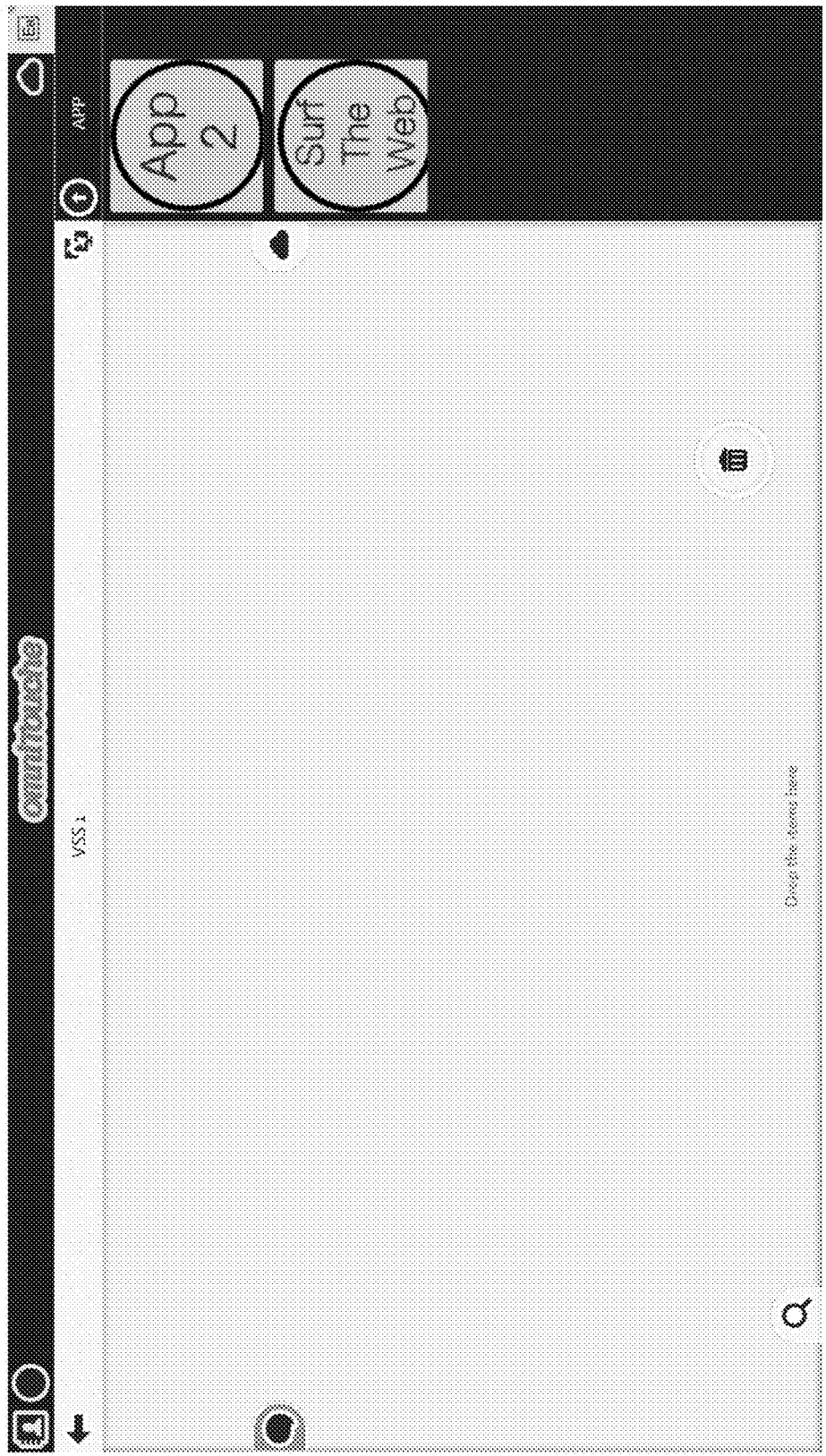
Figure 1.4.B1– VSSE – A Detailed App Example
Surf-The-Web
(SCREENSHOT I – ACCESS TO SURF THE WEB APP)
View of VSS 1 from User 1 (Employee B)

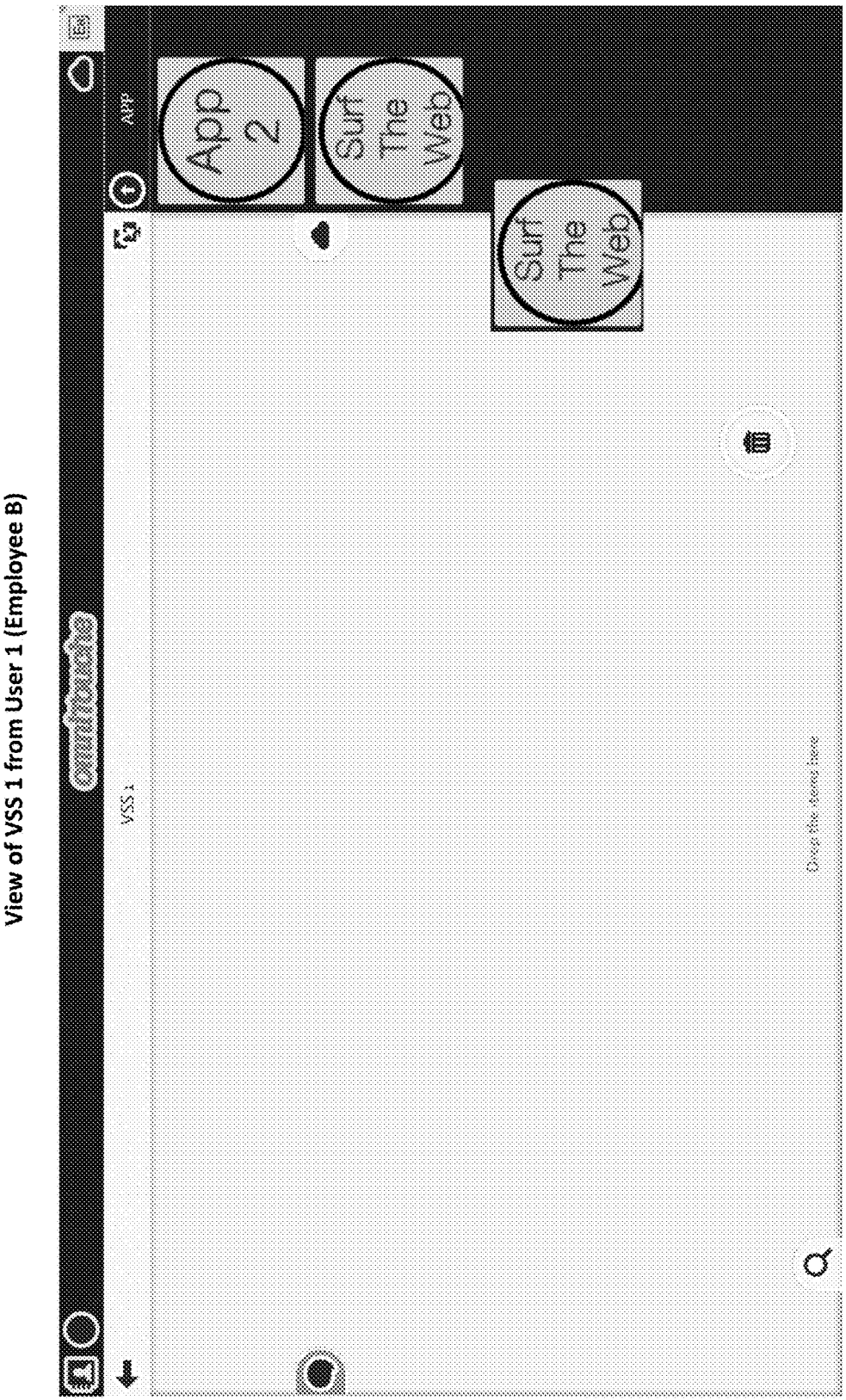
Figure 1.4.B2 – VSSE – A Detailed App Example
Surf-The-Web
(SCREENSHOT II – SURF THE WEB APP DRAG AND DROP FROM UCS TO VSS 1)
View of VSS 1 from User 1 (Employee B)

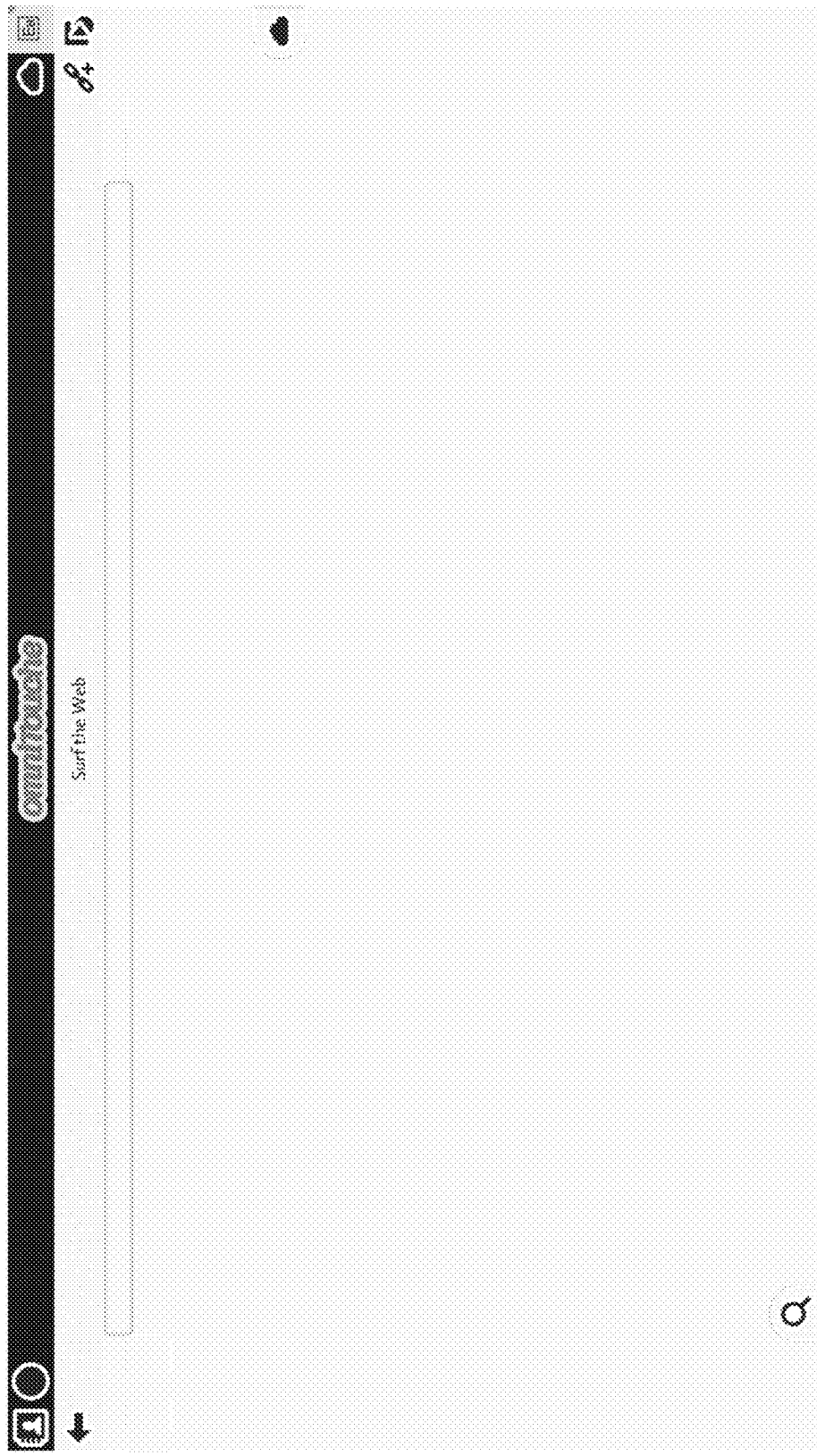
Figure 1.4.B3 – VSSE – A Detailed App Example
Surf-The-Web
(SCREENSHOT III – SURF WEB APP IN VSS 1)
View of VSS 1 from User 1 (Employee B)

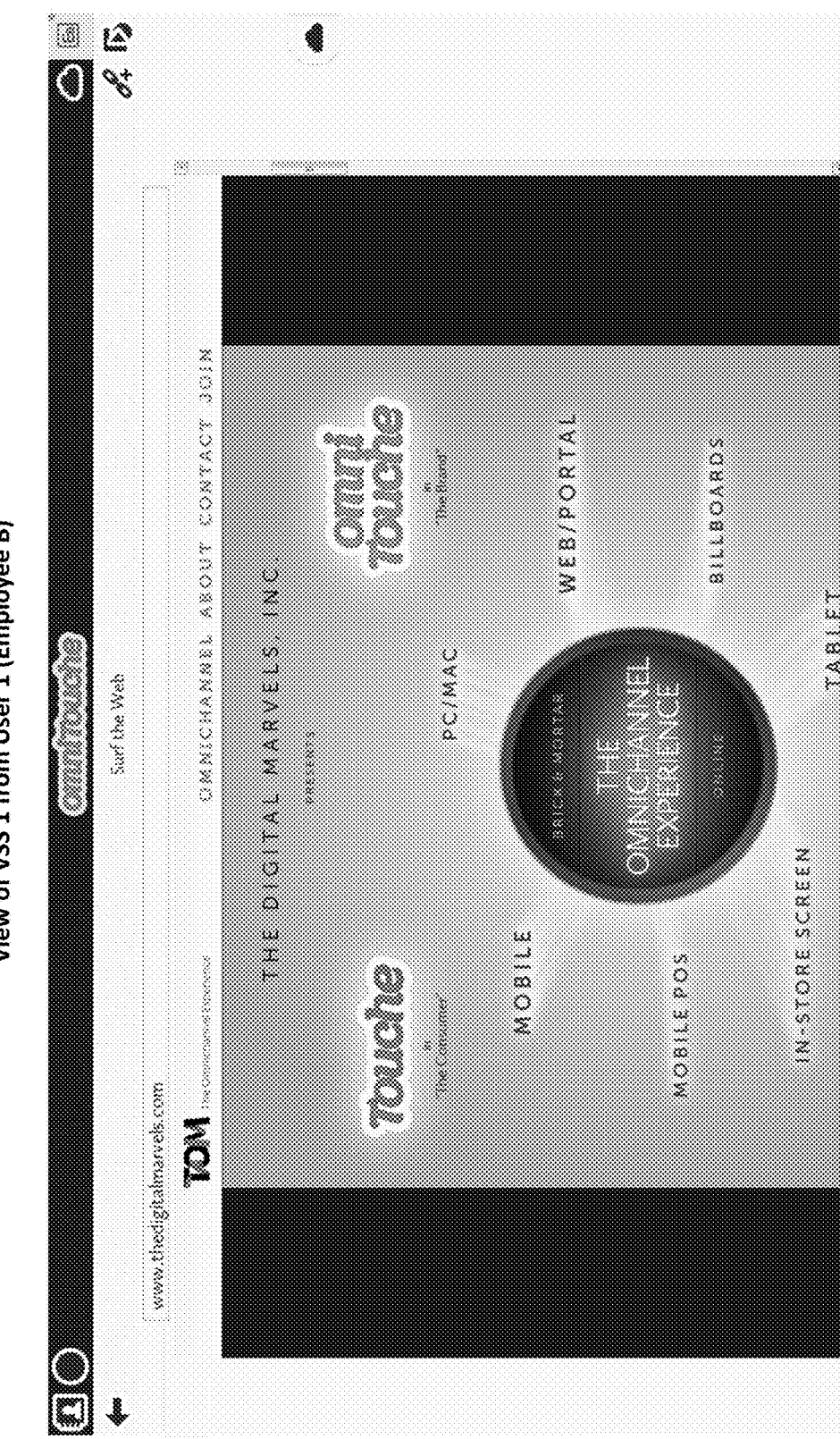
Figure 1.4.B4– VSSE – A Detailed App Example
Surf-The-Web
(SCREENSHOT IV – USER INSERTS WWW.THEDIGITALMARVELS>COM WEB ADDRESS INTO THE WEB BAR + TDM WEBSITE IS DISPLAYED IN VSS 1)
View of VSS 1 from User 1 (Employee B)

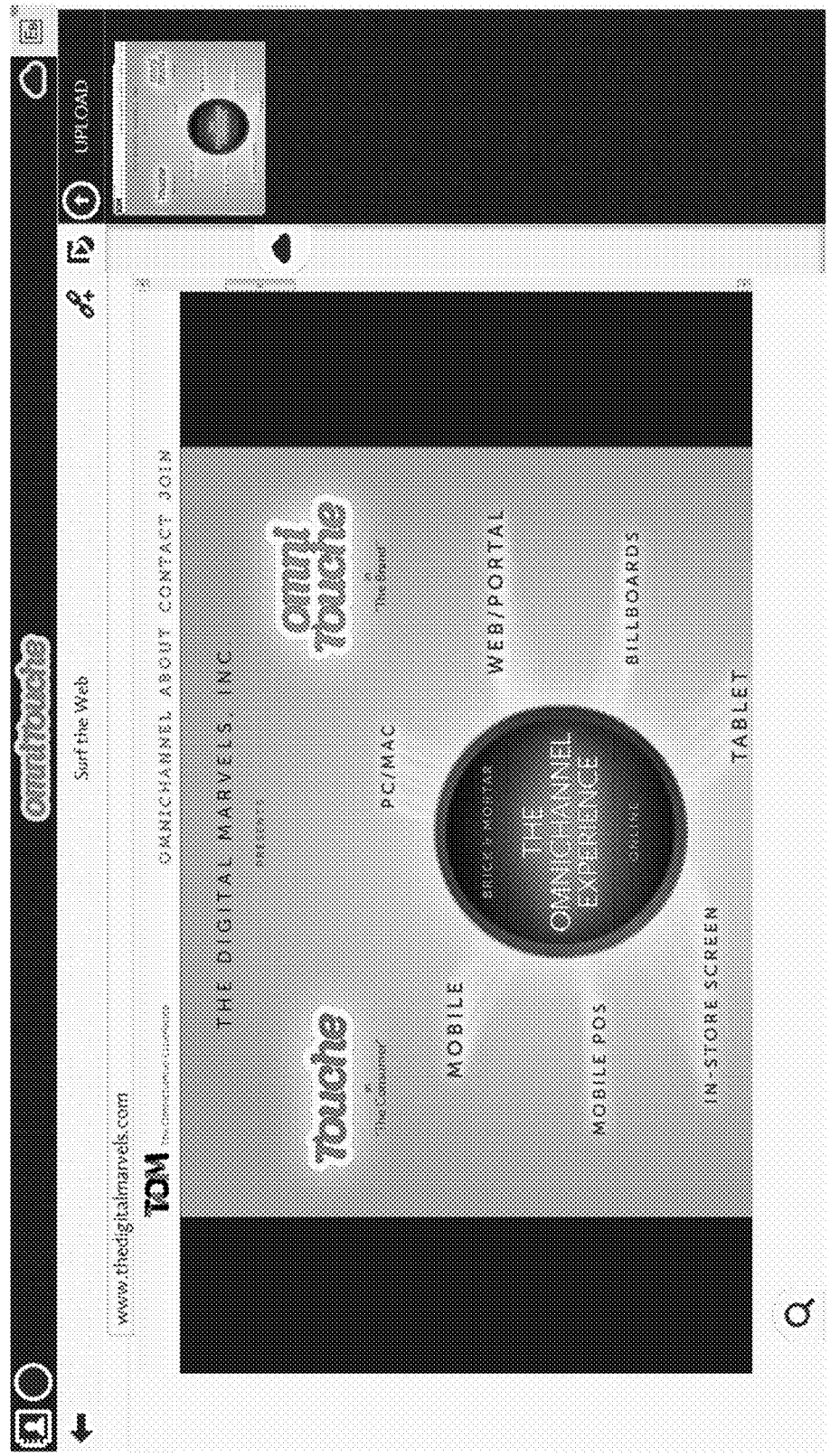
Figure 1.4.B5 – VSSE – A Detailed App Example
Surf-The-Web
(SCREENSHOT V – USER PRESSES LINK BUTTON + A THUMBNAIL IMAGE OF TDM WEBSITE APPEARS IN UCS CONTAINING TDM WEBSITE LINK)
View of VSS 1 from User 1 (Employee B)

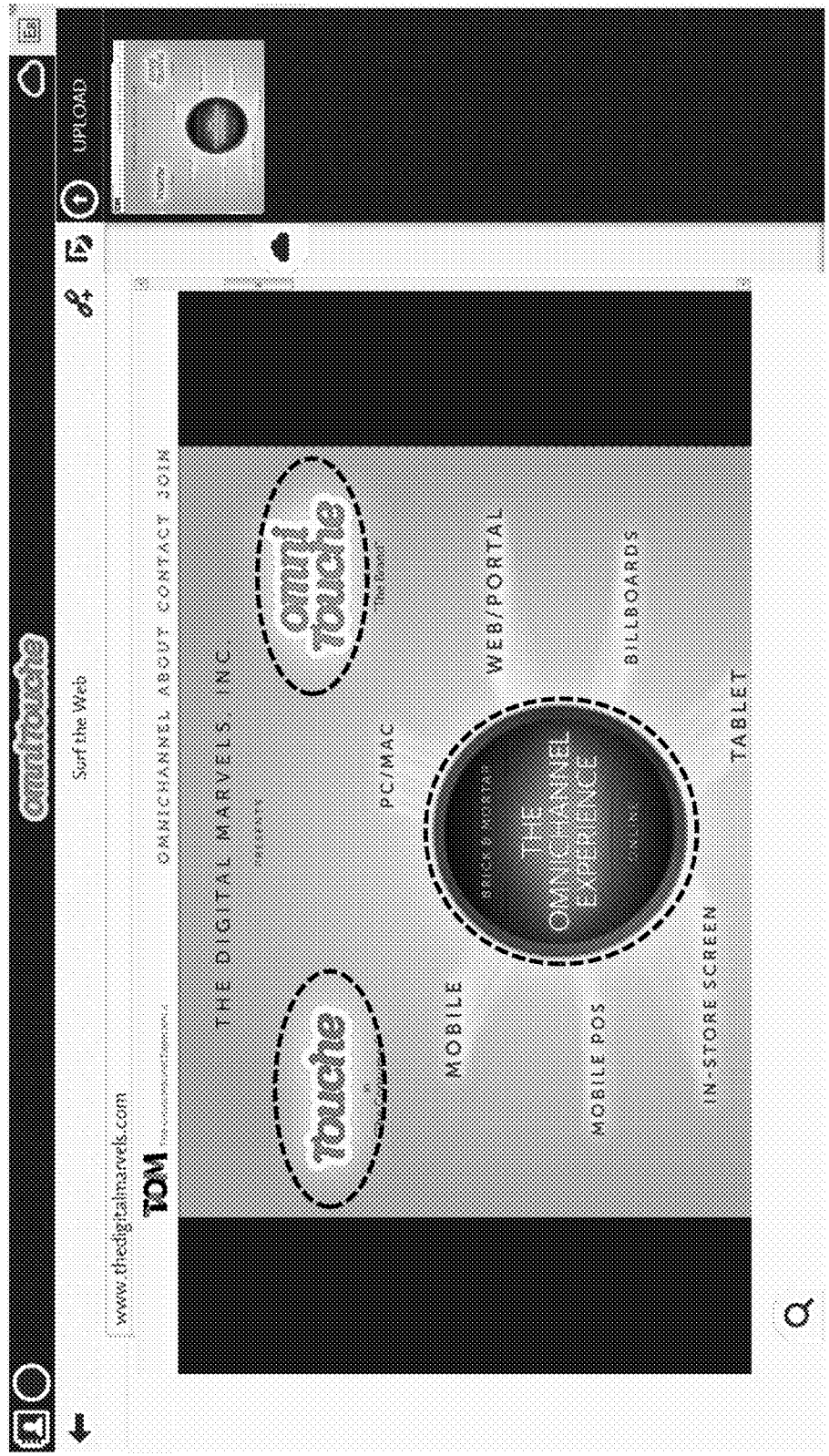
Figure 1.4.B6 – VSSE – A Detailed App Example
Surf-The-Web
(SCREENSHOT VI – USER PRESSES FRAGMENT BUTTON + The Digital Marvels' web page content is separated in fragments (headers, photos, video links, text, etc.)
View of VSS 1 from User 1 (Employee B)

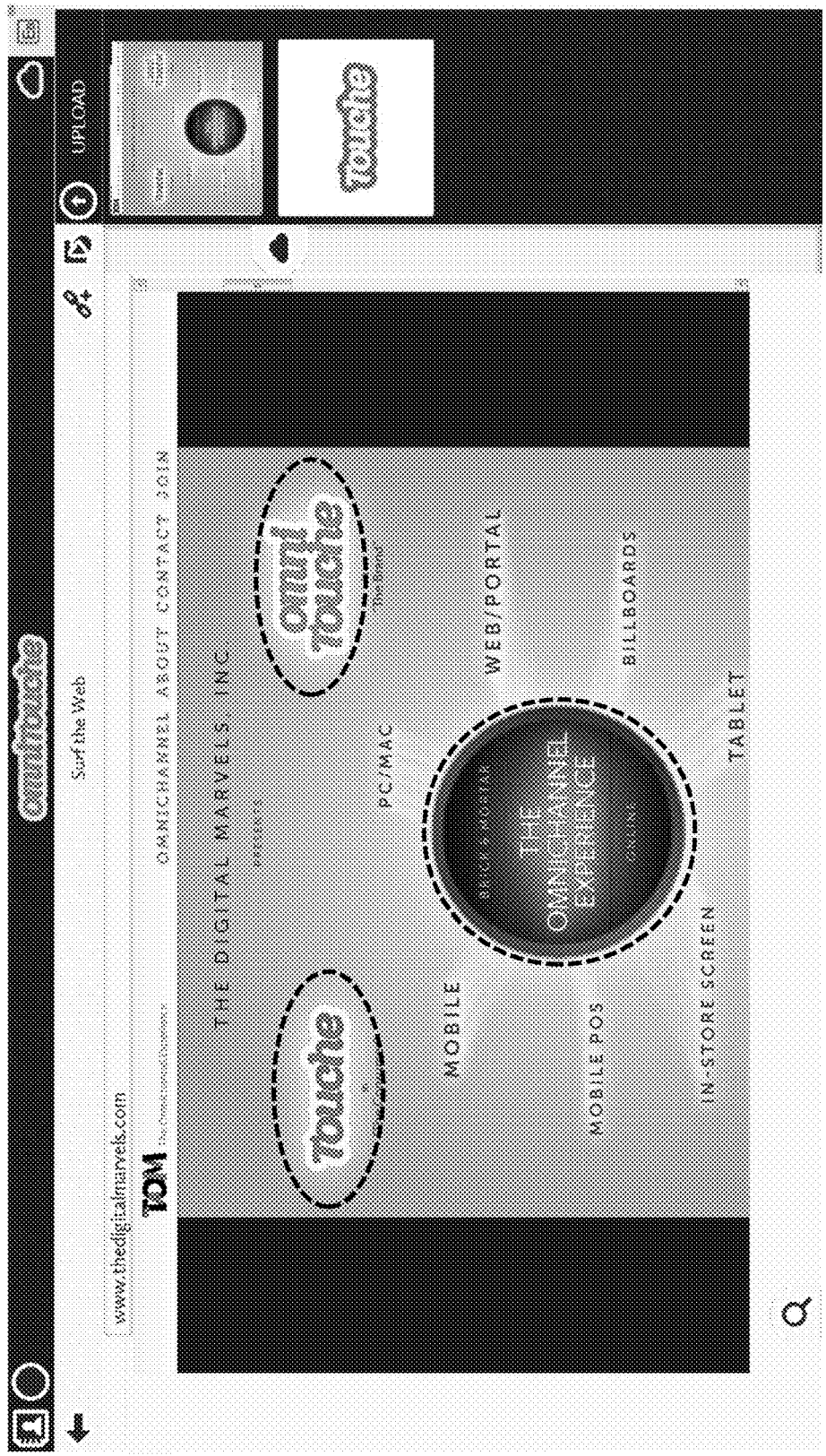
Figure 1.4.B7 – VSSE – A Detailed App Example
Surf-The-Web
(SCREENSHOT VII – USER SELECTS TOCUHE IMAGE FRAGMENT + A THUMBNAIL WITH TOUCH IMAGE APPEARS IN UCS)
View of VSS 1 from User 1 (Employee B)

Figure 1.5.A.1 through 1.5.A3 – VSSE – A Detailed File Example
"Deleting A Virtual File From VSS"
Figure 1.5.A.1 - VSSE – Deleting A File
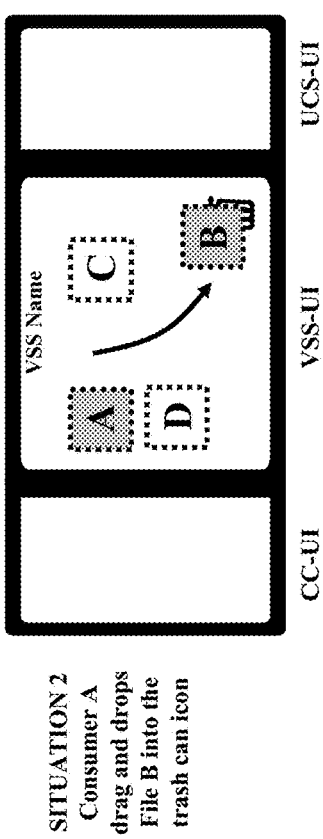
SITUATION 1
Consumer A and Employee B share 4 files
Figure 1.5.A.2 - VSSE – Deleting A File
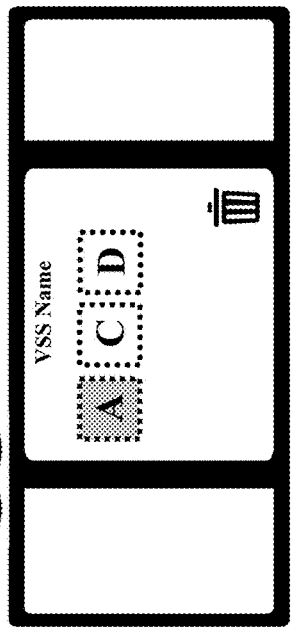
SITUATION 2
Consumer A drag and drops File B into the trash can icon
Figure 1.5.A.3 - VSSE – Deleting A File
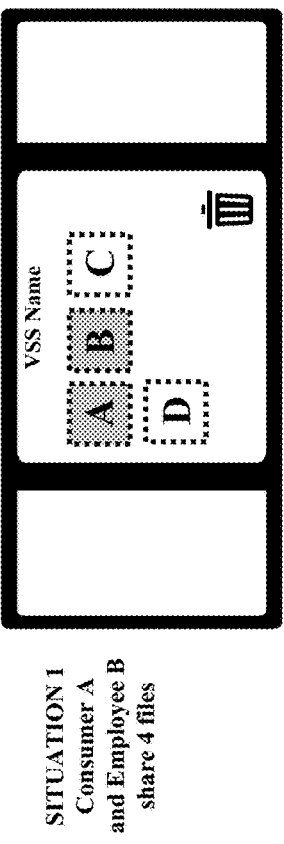
SITUATION 3
File B having been deleted, files A, C and D remain.

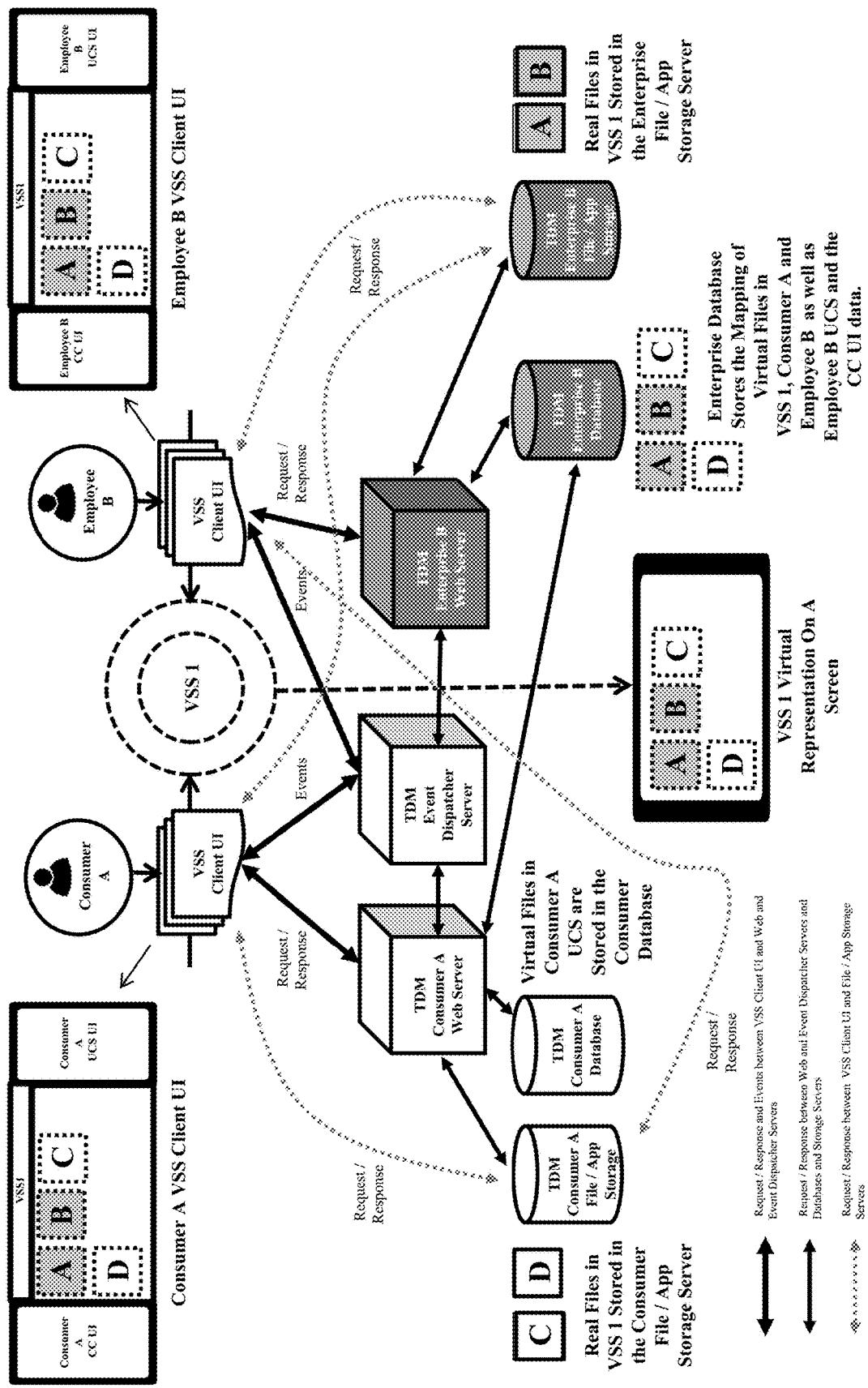

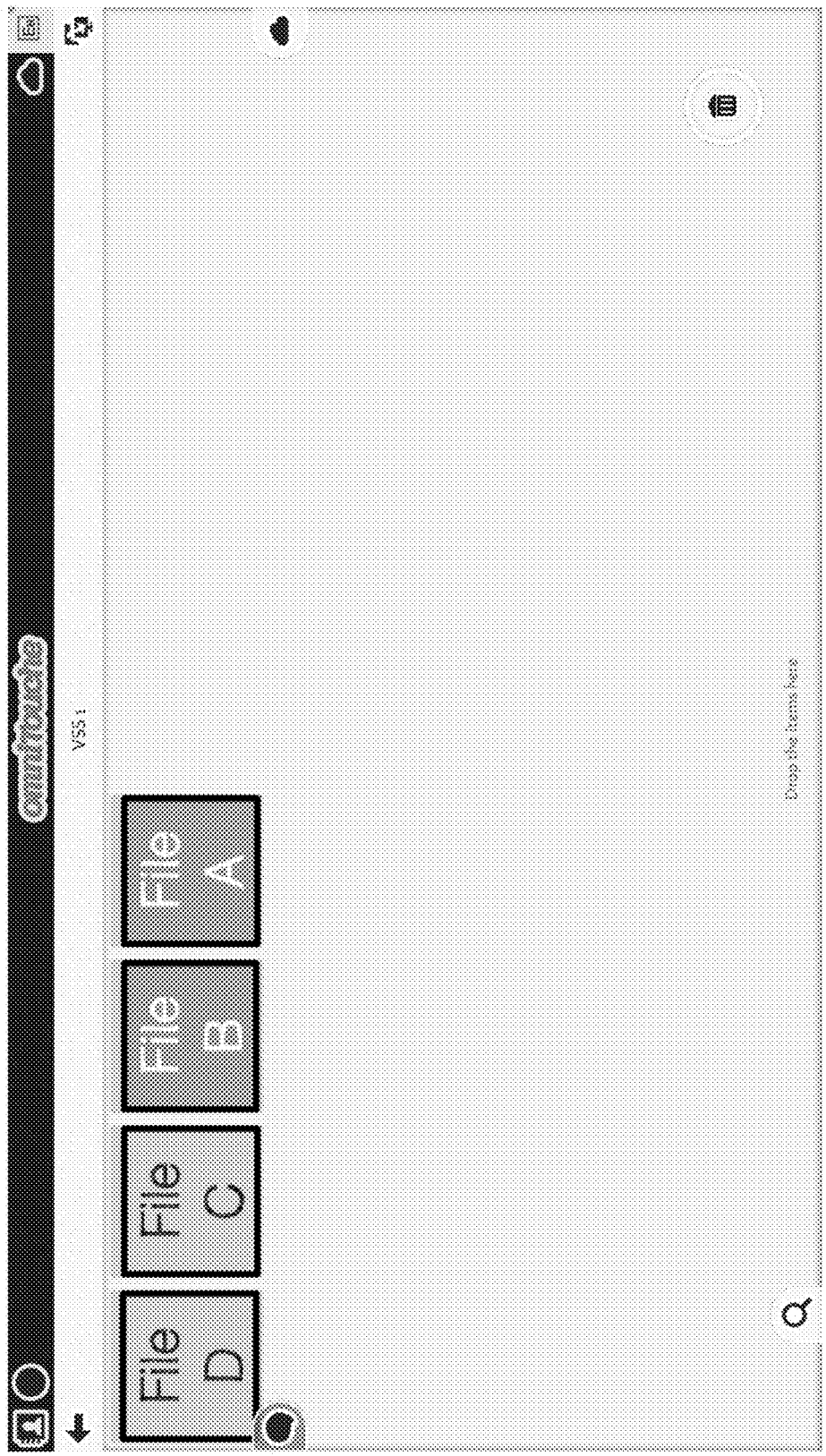
Figure 1.5.A.5 – VSSE – A Detailed File Example "Deleting A Virtual File From VSS" (SCREENSHOT I - 4 FILES)
View of VSS 1 from User 1 (Employee B)

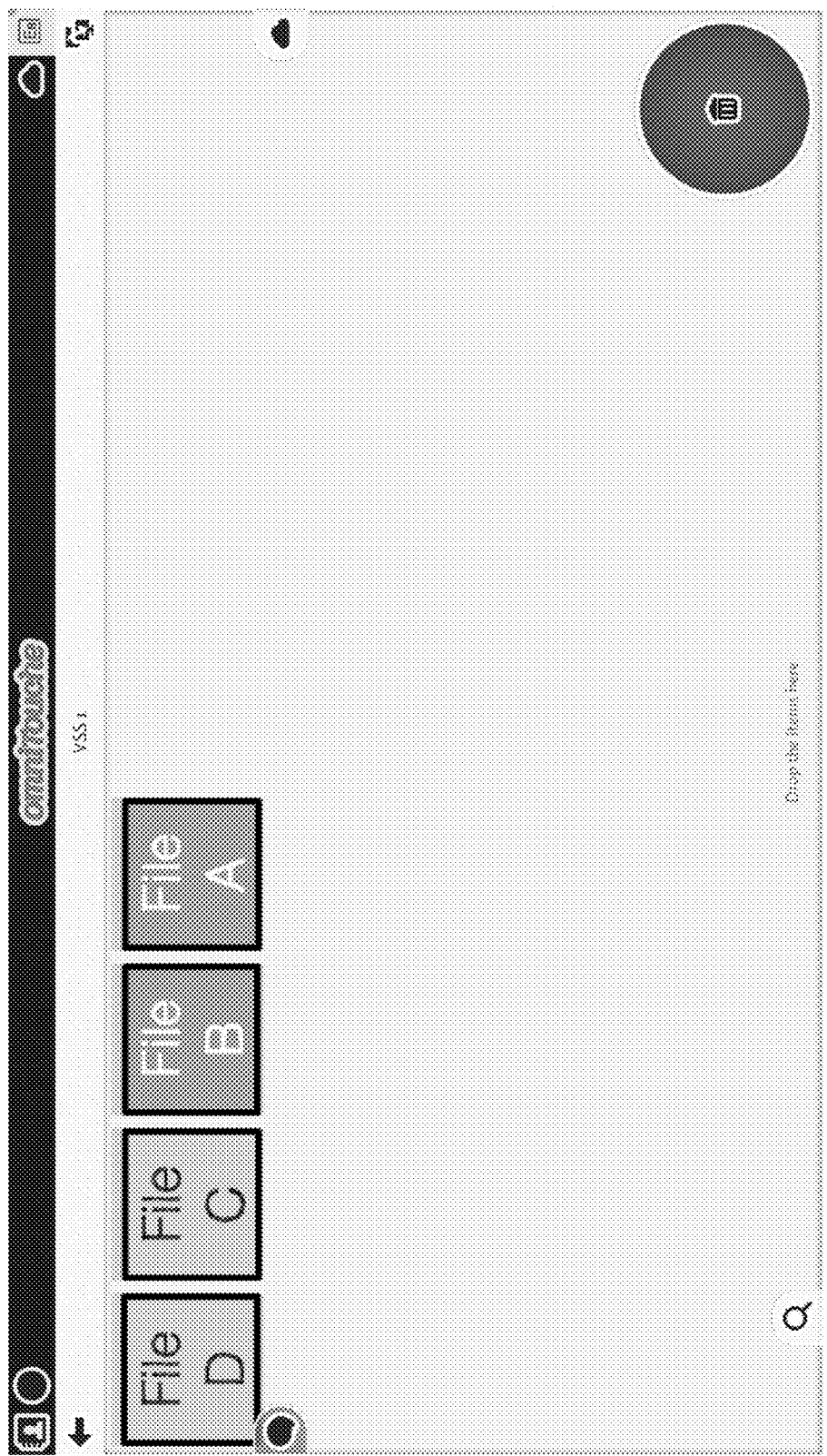
Figure 1.5.A.6 – VSSE – A Detailed File Example "Deleting A Virtual File From VSS" (SCREENSHOT II - DELETE BUTTON ACTIVATED)
View of VSS 1 from User 1 (Employee B)

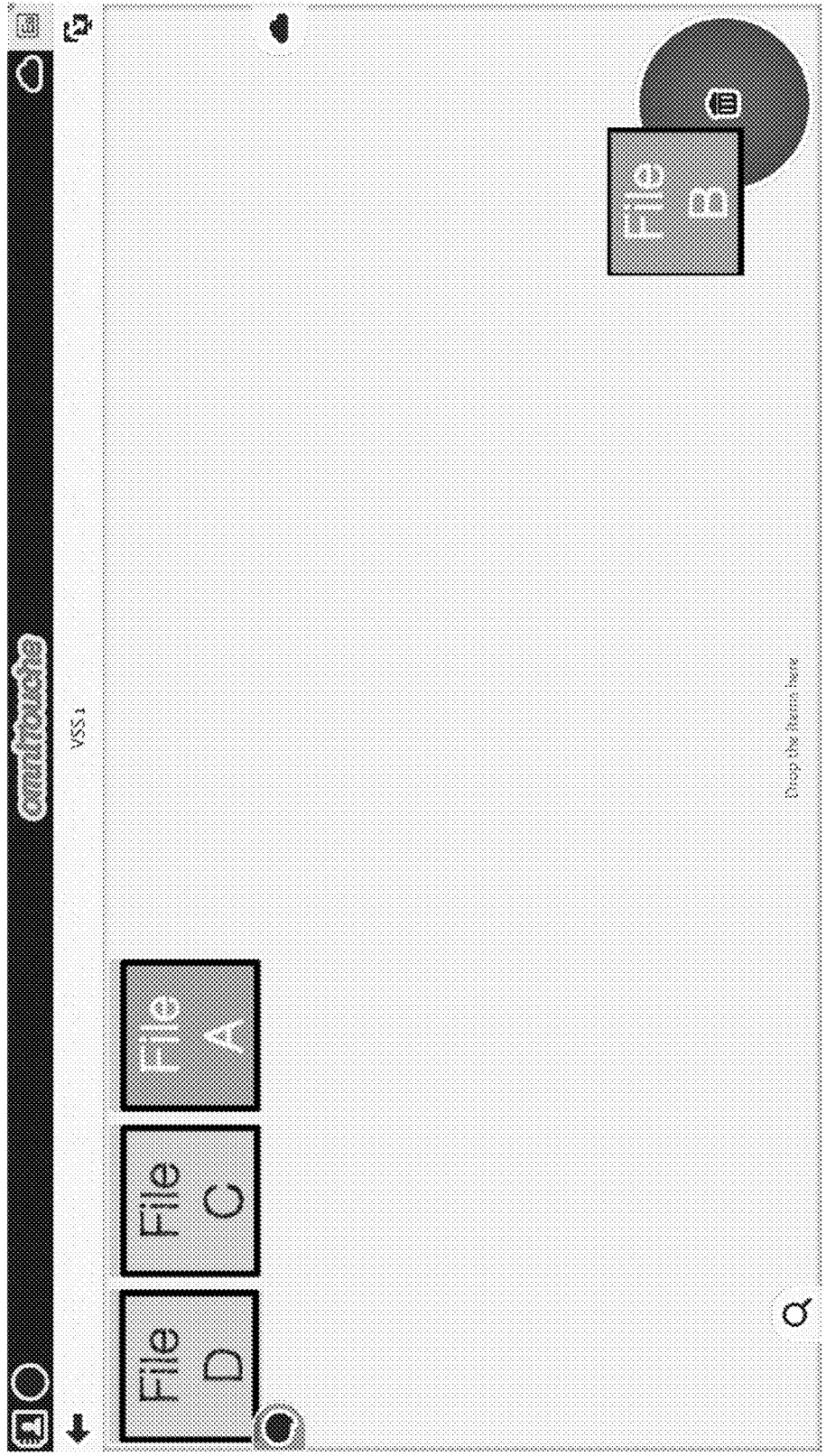
Figure 1.5.A.7 – VSSE – A Detailed File Example "Deleting A Virtual File From VSS" (SCREENSHOT III - DELETING FILE B)
View of VSS 1 from User 1 (Employee B)

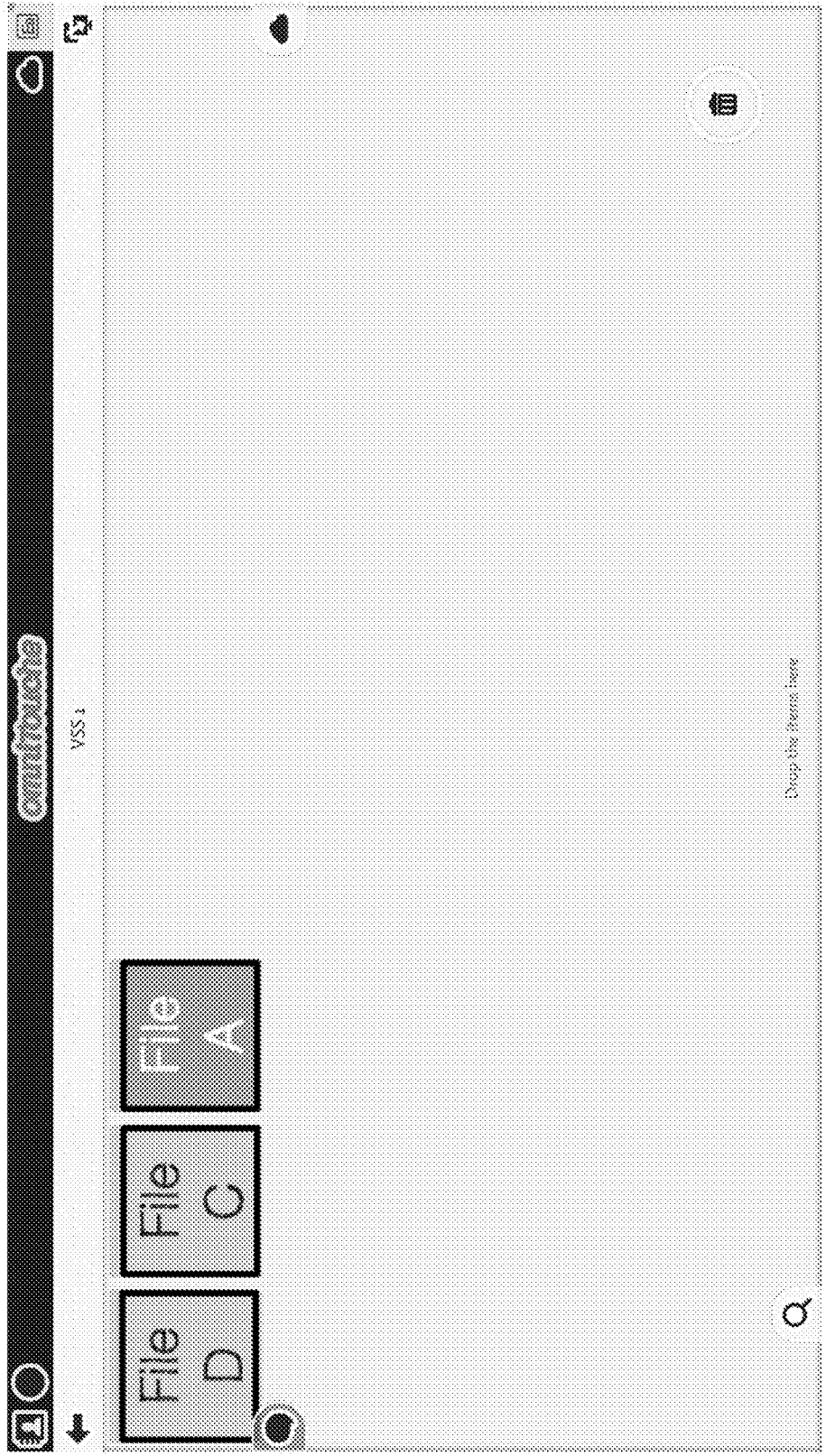
Figure 1.5.A.8 – VSSE – A Detailed File Example
"Deleting A Virtual File From VSS"
(SCREENSHOT IV - FILE B DELETED + DELETE BUTTON DEACTIVATED)
View of VSS 1 from User 1 (Employee B)

VIRTUAL STORAGE SYSTEM CLIENT USER INTERFACE

CROSS REFERENCE TO RELATED APPLICATIONS

This application is a United States national phase filing of the corresponding international application number PCT/US2014/017517, filed on Feb. 20, 2014, which claims the benefit of United States Provisional Patent Application Nos. (i) 61/766,917, filed on Feb. 20, 2013 and (ii) 61/792,076, filed on Mar. 15, 2013, the disclosure of each of which is hereby fully incorporated herein by reference.

TECHNICAL FIELD

The present invention relates to connectivity across data networks, and more particularly, to systems and methods that allow consumers and enterprises to reach other consumers and/or enterprises seamlessly across all channels, in real time or not.

BACKGROUND OF THE INVENTION

Consumers increasingly choose different channels to interact with other consumers and/or enterprises. As a result, there is an imperative need across all industries to offer high touch commerce and customer service using a user interface ("UI") and a platform that allow consumers and enterprises to reach other consumers and/or enterprises seamlessly across all channels (e.g., brick-and-mortar and online), on their own terms, in real time or not. There is thus a need for a UI that is independent of any screen, hardware or location, whether local or international. Additionally, such a UI should be highly customizable to the point that users can define their own buttons in the interface.

SUMMARY OF THE INVENTION

Various embodiments are disclosed that relate to interactive online experiences between users either humans and/or "bots"—see http://en.wikipedia.org/wiki/Internet_bot) in various engagement scenarios (e.g., individual users, groups of users, one on one, one and a group, a group and another group) in any business and/or personal relationship such as, for example, business to consumer ("B2C"), consumer to consumer ("C2C") or business to business ("B2B"), where users have access to a common virtual system storage (VSS) through a VSS Client UI.

A VSS is a virtual representation of a storage space in a database, or other data structure, with which user(s) who have access to are allowed to interact—in real-time or not—via a VSS Client UI as individuals and/or groups. The VSS Client is a cloud-based with the following UI components: (a) Cloud Communicator (CC) UI, which allows user(s) to communicate through any communication application (i.e. Chat, VoIP, Video-conference, SMS, etc.); (b) VSS which allows exchange and/or execution of virtual files and virtual applications, and (c) User Cloud Storage (UCS) UI, which allows user(s) share, copy, delete, export and import any virtual file (in a storage space such as cloud storage, dedicated or shared storage server, remote storage hardware, etc. and/or virtual application in the cloud, dedicated or shared server, etc.

Various exemplary embodiments are disclosed herein that relate to providing interactive online experiences that may facilitate omni-channel, multi-channel, agile commerce experiences selling, cross-selling, advertising and non-advertising commerce and customer service services related to products and services sold or shared by individuals, enterprises or non-profit organizations before, at and beyond the point of sale or engagement (brick and mortar and online). The aforementioned Interactive online experiences can be, for example, customized for any industry, such as, for example, fashion, retail, luxury, banking, insurance, real estate and education.

BRIEF DESCRIPTION OF THE DRAWINGS

FIG. 1.1—Virtual Storage System Environment (VSSE)—shows an exemplary Virtual Storage System Environment according to an exemplary embodiment of the present invention;

FIG. 1.1.A—VSSE B2C—shows an exemplary Virtual Storage System Environment in a Business-to-Consumer model according to an exemplary embodiment of the present invention;

FIG. 1.1.B—VSS E C2C—shows an exemplary Virtual Storage System Environment in a Consumer-to-Consumer model according to an exemplary embodiment of the present invention;

FIG. 1.1.C—VSS E B2B—shows an exemplary Virtual Storage System Environment in a Business-to-Business model according to an exemplary embodiment of the present invention;

FIG. 1.1.D—VSS Extended Environment—depicts a Virtual Storage System Extended Environment, with, for example, 4 VSSs: (1) between a Friend and a Consumer (VSS2), (2) between a Consumer and Employee of Enterprise A (VSS1), (3) between an Employee and Co-Worker of Enterprise A (VSS3) and, (4) between Employee of Enterprise A and a Partner from Enterprise B (VSS4), according to exemplary embodiments of the present invention;

FIG. 1.1.E—VSS Environment—Files & Apps—depicts how a consumer and an employee can share files and apps through an exemplary Virtual Storage System according to an exemplary embodiment of the present invention.

FIG. 1.1E1 depicts a view of VSS1 of FIG. 1.1E from the point of view of employee B, and FIG. 1.1E2 depicts a view of VSS1 of FIG. 1.1E from the point of view of consumer A;

FIGS. 1.1.F.1 through 1.1.F.4—VSS Environment—Files & Apps Interaction I—depict various possible interactions amongst files and apps according to an exemplary embodiment of the present invention;

FIGS. 1.1.G.1-1.1G.4—VSS Environment—Files & Apps Interaction II—depicts alternate interactions amongst files and apps according to an exemplary embodiment of the present invention where the application added to the VSS adds context;

FIGS. 1.1.G.5-1.1.G.13 depict exemplary screenshots of a user dropping a virtual application into a VSS which adds context, as shown in FIGS. 1.1.G.1 and G.2 and FIGS. 1.1.G.3 and G.4;

FIG. 1.1.H—VSS Environment—Privacy & Zones I—depicts where privacy and zone information for each virtual file and app shared in a specific VSS are stored according to an exemplary embodiment of the present invention;

FIG. 1.1.I—VSS Environment—Privacy & Zones II—depicts the different privacy and zone types that virtual files and apps shared in a specific VSS may have according to exemplary embodiments of the present invention;

FIG. 1.1.J.1—VSS Client UI—Schematically—schematically depicts the properties of an exemplary VSS Client UI, which works in any network, location or screen, according to exemplary embodiments of the present invention;

FIG. 1.1.J.2 and 1.1.K.1—VSS Client UI—Hardware Independent—depict how an exemplary VSS Client UI works independently of any physical button (input/output) in the device, according to exemplary embodiments of the present invention;

FIG. 1.1.J.3 and FIG. 1.1.K.2—VSS Client UI—personalized User Interface—depict how a VSS Client UI may be personalized by a user on the fly (e.g., in real-time) according to exemplary embodiments of the present invention;

FIG. 1.1.K.2A through 1.1.K.2H depict an example showing a user moving one button from one side of the screen to another while the button is fully operational (and keeping the same level of functionality that it had prior to the change) according to exemplary embodiments of the present invention;

FIG. 1.2—2—VSS Client UI—schematically shows an exemplary User interface of a VSS Client UI including a Cloud Communicator UI (CC UI), a Virtual Storage System UI (VSS UI) (including the Space, Label and VSS Control Button) and a User Cloud Storage UI (USC UI), according to exemplary embodiments of the present invention;

FIG. 1.2.A—VSS Client UI—Detail—depicts how a consumer and an employee (e.g., of a retail store) can share files and apps through an exemplary Virtual Storage System, as well as share communication data from their Cloud Communicator, and import and/or export files and apps from their User Cloud Storage, according to exemplary embodiments of the present invention;

FIG. 1.2.B—VSS Client UI—Features—schematically shows exemplary features of a VSS Client UI including Cloud Communicator UI (CC UI), Virtual Storage System UI (VSS UI) and User Cloud Storage UI (USC UI) according to an exemplary embodiment of the present invention;

FIG. 1.2.C—VSS Client UI—VSS Functionality between CC, VSS and UCS—schematically shows exemplary functionality between the Cloud Communicator UI (CC UI), Virtual Storage System UI (VSS UI) and User Cloud Storage UI (USC UI), as well as exemplary VSS Client UI interface commands according to exemplary embodiments of the present invention;

FIG. 1.2.D—VSS Client UI—VSS Control Button OFF vs ON—Features & Functionalities—schematically shows exemplary functionality and features of a VSS Control Button according to an exemplary embodiment of the present invention;

FIG. 1.2.D.1—VSS Client UI—VSS Control Button OFF—Functionality—Schematically shows the functionality and features of the VSS Control Button in OFF mode, and FIG. 1.2.D.2—VSS Client UI—VSS Control Button ON—Functionality—schematically shows the functionality and features of the VSS Control Button in ON mode;

FIGS. 1.3.A-1.3.D—VSS Client UI—UI Varieties—Schematically shows several UI variations for the VSS Client UI showed in FIG. 1.2, according to an exemplary embodiment of the present invention;

FIG. 1.3.A—VSS Client UI—VISUAL MODE A—Schematically shows VSS client UI variant VISUAL MODE A;

FIG. 1.3.B—VSS Client UI—VISUAL MODE B—Schematically shows VSS client UI variant VISUAL MODE B;

FIG. 1.3.C—VSS Client UI—VISUAL MODE C—Schematically shows VSS client UI variant VISUAL MODE C;

FIG. 1.3.D—VSS Client UI—VISUAL MODE D—Schematically shows VSS client UI variant VISUAL MODE D;

FIGS. 1.4.A.1-1.4.A.4—VSSE—schematically show various situations for a user interacting with an exemplary "Surf-The-Web" application according to exemplary embodiments of the present invention;

FIG. 1.4.B—VSSE—depicts schematically the exemplary application entitled "Surf-The-Web";

FIG. 1.4.B1—through 1.4.B7—VSSE—illustrate various steps of a user's interaction with the exemplary "Surf-The-Web" browser application of FIG. 1.4B;

FIGS. 1.5.A.1-1.5.A.3 depict an exemplary detailed file manipulation example: "Deleting A Virtual File From VSS";

FIG. 1.5.A.4—VSSE—Schematically shows file storage locations, information flow and what is displayed on user interfaces in the detailed example "Deleting A Virtual File From VSS" of FIGS. 1.5.A.1-1.5.A.3; and FIGS. 1.5.A.5-1.5.A.8 depict the view from the point of view of User 1—Employee B as the exemplary file deletions of the example of FIGS. 1.5.A.1-1.5.A.3 proceed.

It is noted that in many of the FIGURES, and in particular system level drawings, the acronym "TDM" appears. This is for illustration only, and refers to embodiments conceived for use by assignee hereof, "The Digital Marvels", whose initials are "TDM." It is further noted that in both the various FIGURES, as well as in the description of those FIGURES, the word "app" which is short for "application" is so used. In each instance it simply means "application."

DETAILED DESCRIPTION OF THE INVENTION

Overview

There is an increasing need for enterprises (e.g., brands or companies marketing a line of products) to reach directly to consumers—at their convenience and on their own terms—seamlessly across all channels via a personalized product offering and a high touch customer service. In exemplary embodiments of the present invention, such a direct contact may be provided by an interactive online experience. The interactive online experience, may, for example, be presented via a user interface called Virtual Storage System (VSS) Client UI, as shown, for example, in FIG. 1.2. As shown, for example, in FIGS. 1.1 through 1.1E, an exemplary interaction may occur amongst employees of the brands (for example, salespeople for a fine perfume, or leather goods brand), consumers and/or software "bots", which are used to collect prices, new merchandise offerings, etc. by various websites and online entities (all collectively referred to hereinafter as "users").

In exemplary embodiments of the present invention, this interactive online experience can drive omni-channel, multi-channel and/or agile commerce experiences where "users" may sell, cross-sell, advertise, share and/or provide commerce and customer service solutions both for profit or non-profit—around products and services across all channels (e.g., brick and mortar as well as online)

A schematic describing the interactive online experience between such "users" sharing access to the same Virtual Storage System VSS is disclosed in FIG. 1.1. With reference thereto, two exemplary user(s) are presented with an user interface called a VSS Client UI that allows them to provide commerce and customer service solutions across the same shared VSS.

User(s) can interact following different models that are valid for both for profit and non-profit scenarios. Such as, for example, business to consumer (B2C) as disclosed in FIG. 1.1.A; consumer to consumer (C2C) as disclosed in FIG.

1.1.B, and business to business (B2B) as disclosed in FIG. 1.1.C. As shown in FIGS. 1.1 through 1.1C, a VSSE can be accessed via any screen, from any location and across any type of network.

In order to provide a convenient and efficient virtual representation of real life/business experience, a VSSE can be further extended to other types of users, whether in real-time or not. As described in FIG. 1.1.D, an exemplary VSSE can be extended to (i) Friends, Consumers and employees from different enterprises, such as, for example, Employee B and Co-worker C of a single enterprise, Enterprise A, through VSS3; Enterprise A and Partner E; Enterprise B; (ii) representing the consumer relationship between Friend D and Consumer A through VSS2; (iii) the business relationship between Consumer A and Employee B of Enterprise A through VSS1, as well as the business partnership relationship between Employee from Enterprise A and Partner from Enterprise B through VSS4.

As part of the online experience amongst users, users can share virtual files and apps across the same shared VSS. As described in FIG. 1.1.E, two users, a Consumer and an Employee, with access to the same VSS can import, export, exchange, delete, execute, etc. virtual files and apps.

With reference to FIG. 1.1E, in exemplary embodiments of the present invention these virtual representations of real files and apps can be stored within the consumer and enterprise storage server. The actual location depends on which user had ownership of the real files and apps. Additionally, the virtual mapping of virtual files and apps in the VSS can be stored at the Enterprise Database. Alternatively, such a mapping can be stored in a Consumer Database, for example. However, where various enterprises use systems and methods according to the present invention to market, sell, advertise and the like to interested consumers, generally the VSS will be supported by an enterprise or an entity contracted with by one or more enterprises.

Interactions of Files, Users and Applications in a VSS

Files and Apps as well as Users can interact by, with and amongst themselves as described in FIGS. 1.1.F and 1.1.G. For example, files and apps can interact in the following manner:

Context—As described in FIG. 1.1.F.1 and FIG. 1.1.F.2, an app can add "context" or not in a VSS to files and users associated to the same VSS. As used in this disclosure, we define context as a digital output due to a specific combination of digital/analog data where the underlying technology understands who we are, where we are and what we want—in reference to files and/or users.

Context amongst apps and files—As described in FIG. 1.1.G.3 and FIG. 1.1.G.4 the conjunction of apps and files in the VSS brings context amongst them. For example, if we add a virtual location map app to three virtual photo files in a VSS, three virtual photo files will be geo-tagged and positioned on a virtual map and the virtual location map app will add 3 virtual photo files to the map.

Context amongst apps and users—As described in FIG. 1.1.G.1 and FIG. 1.1.G.2 the conjunction of apps and users in the VSS creates context amongst them. For example, if we add a virtual alarm app in a VSS shared by three users, the three users will be notified about the virtual alarm and the virtual alarm app will add those three users to their notification list.

Context amongst apps, files and users—As described in FIG. 1.1.F.3 and FIG. 1.1.F.4 the conjunction of apps, files and users in the VSS creates context amongst them. For example, if we add a virtual promotion app to four virtual SKUs files in a VSS shared by three users, the virtual promotion apps prompts a promotional purchase opportunity for a combined purchase between the three users. Users have the opportunity to buy the four SKUs at a specific discount splitting the purchase (⅓) via online or brick and mortar payment.

Note: The combinations of the "contextual" and "non-contextual" situations described above are unlimited. For example, one may add a virtual alarm app to a virtual location map, with both adding context to each other.

As shown in FIGS. 1.1.F.1 and 1.1.F.2, two exemplary situations are depicted. In Situation 1 a user drops a virtual app to VSS1. In Situation 2 a user drops three virtual files to VSS 1. As further shown, these example situations can result in three possible outcomes. (1) The App Adds Context To Users and Apps—The App is aware of VSS 1, which and how users share VSS1 and which and how virtual files are shared in VSS 1. As a result, the App adds context as illustrated in FIGS. 1.1.F.3 and 1.1.F.4; (2) The App Adds Context To Users Or Apps—The App is aware of VSS 1, which and how users share VSS1 OR which and how virtual files are shared in VSS 1. As a result, the App adds context as described by FIGS. 1.1.F.3 and 1.1.F.4; and (3) The App Doesn't Add Any Context To Users And/Or Apps—The App is not aware of VSS 1, which and how users share VSS1 OR which and how virtual files are shared in VSS 1. As a result, the App doesn't add any context.

As shown in FIGS. 1.1.F. 3 and 1.1.F.4, when the app adds context, here, for example, a promotion (discount) and payment facility the users have the opportunity to buy the four SKUs at a specific discount (25%) and split the purchase three ways via online or brick and mortar payment modes. FIGS. 1.1.F.5 through 1.1.F.8 depict the exemplary view of VSS 1 seen by User 1 (one of the three exemplary users of FIGS. 1.1.F.1 through 1.1.F.4). Thus, in FIG. 1.1.F.5, User 1 sees four SKUs for exemplary products she has dropped in the VSS or an employee of a brand has, or a professional shopper has, for her consideration. In FIG. 1.1.F.6 in an apps section of her UI, User 1 has a 25% discounting application in her UCS (user cloud storage), which, for example, someone at the brand or store has made available to her, in the nature of a promotion, in FIG. 1.1.F.7, she drags and drops the 25% discounting app from her UCS into VSS 1, the shared storage space with the two other users. In FIG. 1.1.F.B the virtual app adds context (Promotion and Payment). Thus, users have the opportunity to buy the four SKUs at a specific discount (25%), splitting the purchase (⅓) each via online or brick and mortar payment, using the "Pay" app that came with the virtual discount app.

FIGS. 1.1.G.1 through 1.1.G.4—VSSE—Files & Apps Interaction II—Context Example Amongst Apps and Users, provide two additional examples of context amongst apps and users, as next described. As shown in FIGS. 1.1.G.1 and 1.1.G.2, two exemplary situations are depicted. In Situation 1 a user drops a virtual alarm app to the VSS 1 with three files. In Situation 2—The Virtual Alarm App adds context the three users will be notified about the virtual alarm. The Virtual Alarm App will add those three users to its notification list.

As shown in FIGS. 1.1.G.3 and 1.1.G.4, two different exemplary situations are depicted. In Situation 1 a user drops a Virtual Geo-Tag Map App to the VSS 1 with three photos.

In Situation 2—The Virtual App Adds Context (Geo-Tag), and Photos add context to the App. The Virtual App Adds three virtual photo files to the map.

FIGS. 1.1.G.5 through 1.1.G.13 illustrate the exemplary view of VSS 1 seen by User 1 (one of the three exemplary users of FIGS. 1.1.G.1 through 1.1.G.4). In FIG. 1.1.G.5 there are three files in VSS1. In 1.1.G.6 the alarm app is shown in UCS. In 1.1.G.7 User 1 drags and drops the alarm app into VSS 1, and thus, in 1.1.G.8 the virtual alarm app adds context the three users will be notified about the virtual alarm, and the virtual alarm app will add those three users to their notification list.

Similarly, in FIG. 1.1.G.9 User 1 has three photos in VSS 1. In FIG. 1.1.G.10 she also has a GeoTag app UCS. In FIG. 1.1.G.11 User 1 drags and drops the GeoTag app from UCS to VSS 1, and thus, in FIG. 1.1.G.12, the virtual app adds context (geo-tag), and photos add context to the app. Finally, in FIG. 1.1.G.13, the virtual app adds three virtual photo files to the map.

Privacy Settings in a VSSE

In exemplary embodiments of the present invention, VSSE facilitates privacy by and among files, apps and users. In some embodiments, privacy is controlled by the "owner" of a file and/or app. The "owner" is the user that uploaded, developed or created a file and/or app or the party to whom "ownership" was transferred by another user and/or system administrator. A VSS can, for example, connect consumers and their friends, consumers and employees of a brand or store, and various co-workers of that brand or store. Thus, there can be a "Consumer Zone" and an "Enterprise Zone" across which, and between, various VSSes can exist. As described in FIG. 1.1.H, Friends, Consumers, Employees and Co-Workers can establish the privacy of a file and/or app in the Consumer Zone, but only Employees and Co-Workers can set-up the privacy of a file and/or app in the Enterprise Zone.

Therefore, in exemplary embodiments of the present invention there may be four types of privacy—as described in FIG. 1.1.H and FIG. 1.1.I, for example. Specifically, there are three types in the Consumer Zone and four types in the Enterprise Zone. With reference to FIGS. 1.1H and 1.1.I, the following is a brief description of the four types:

1. Private—Consumer and Enterprise Zone—A file and/or app can only be shared by its owner, USER A. The part(ies) they share it with via VSS, USER B, can't store the file or app in their UCS or share it with others or share it outside of the platform via email, social networks, etc. USER B can execute the files or apps in the VSS shared with USER A.

2. Semi-Private—Consumer and Enterprise Zone—A file and/or app can only be shared by its owner, USER A. The part(ies) they share it with via VSS, USER B, can store the file or app in their UCS or share it with other users in the system. They can also execute the files or apps in the VSS shared with USER A, other VSS(s) and in their UCS, USER B can't share the file or app outside of the platform via email, social networks, etc.

3. Public—Consumer and Enterprise Zone—A file and/or app can only be shared by its owner, USER A. The part(ies) they share it with via VSS, USER B, can store the file or app in their UCS or share it with other users in the system, They can also execute the files or apps in the VSS shared with USER A, other VSS(s) and in their UCS, USER B can also share the file or app outside of the platform via email, social networks, etc.; and 4. Corporate Semi—Private—Enterprise Zone—In this scenario, all users are part of a corporate environment (e.g. an employee and their co-worker). A file and/or app can only be shared by its owner, USER A. The part(ies) they share it with via VSS, USER B, can store the file or app in their UCS or share it with other users in the Enterprise Zone system. They can also execute the files or apps in the VSS shared with USER A, other VSS(s) and in their UCS. USER B can't share the file or app outside of the platform via email, social networks, etc.

VSS Client User Interfaces—Cloud Button Functionality Preserved

In order to provide a convenient, easy to use and personalized interactive online experience for user(s), the VSS Client UI works, as illustrated in FIG. 1.1.J.1, on any device with (i) screen(s) (in-store screens, street screens, smartphones, TV screens, laptops, tablets, etc.), (ii) with or without an active connection to the Internet, (iii) at any location (local and/or international; physical and/or virtual) and (iv) through any network (public and/or private Internet and/or Intranet). Therefore, a "user" is presented with a VSS client UI that works independently of the device's hardware and operating system as described in FIG. 1.1.J.2 and FIG. 1.1.K.1, where VSS Client UI interacts with the same graphic UI regardless of the device used to access the VSS. At the same time, user(s) and/or network administrator can personalize the VSS client UI (buttons position, colors, etc.) at any time—as illustrated in FIG. 1.1.J.3. In exemplary embodiments of the present invention, the VSS client UI can be personalized at any time, and on any device, as described in FIG. 1.1.K.2, and the database registers the different personalized graphical UI features defined by the user without changing the functionality. For example, as depicted in FIG. 1.1.K.2, a cloud UI button can be displayed anywhere on a screen, regardless of what device a user is using.

FIGS. 1.1.K.2A through 2H illustrate personalized UI functionality in exemplary embodiments of the present invention. With reference to FIG. 1.1.K.2A, User 1 sees four files in her VSS. In 1.1.K.2B a delete button (at the bottom right of the screen) has been activated. 1.1.K.2C the user drags File B to the now activated delete button, thus deleting File B. In FIG. 1.1.K.2D, Files A, C and D remain, and the delete button has now been deactivated. In FIG. 1.1.K.2E User 1 now moves the delete button from the left of the screen to slightly the right side of the middle of the screen, and in FIG. 1.1.K.2F User 1 activates the now moved delete button, so that in FIG. 1.1.K.2G she may drag and drop File C to the now activated (and moved) delete button. Thus, the delete button maintains functionality despite new delete button position. Having accomplished that deletion, in FIG. 1.1.K.2H the (now moved) delete button is deactivated again. Cloud buttons retain functionality no matter where a user decides to have them displayed in a VSS.

User(s) may interact with the VSS client UI—as described in FIG. 1.2.B—via any interface technology that translates any user command given by the five human senses (in case of an enterprise employee and/or a consumer) such as, for example, touch screen, voice recognition, visual gestures, keyboard, brain pulses, etc. In the case of bot users, commands would be given by any software and/or hardware such as algorithms, robots, etc.

VSS Client UI—Main Components

The VSS Client UI presents to user(s) three main UI components as described in FIGS. 1.2, 1.2.A. and 1.2.B.

With reference to FIG. 1.2, these three components are (1) Cloud Communicator UI (CC-UI), which allows user(s) who have common access to the same VSS to communicate—in real-time or not—via chat, voice, videoconference, SMS, presence, transcriptions, etc.; (2) Virtual Storage System (VSS—UI), which allows user(s) who have common access to the same VSS to access (execute, import, export, delete, etc.) any shared virtual file and/or virtual app—in real-time or not; and (3) User Cloud Storage UI (Files & Applications), which allows user(s) who have access to a VSS to execute, import, export, store, etc. virtual files and/or virtual apps between VSS and the user's Cloud Storage (Cloud Storage, dedicated or shared server storage, remote hardware storage, etc.) and vice versa—in real-time or not.

Additionally, the VSS Client UI presents users with a functionality called "Control Button"—as illustrated in FIGS. 1.2.B. and FIG. 1.2.C. When one user with access to a VSS (initial VSS) turns the Control Button ON it becomes the user (User Control) that takes control of the initial VSS dragging all other user(s) that had access to that VSS in that moment from the initial VSS through any VSS in hierarchy mode as described in FIG. 1.2.C.2. User(s) (user control and the rest of users can interact with all virtual files and virtual apps in the VSS that the User Control has decided to access at that moment. If the User Controls turns the Control Button OFF, the VSS Client UI would work as described previously.

shown on the left of the FIG., (i) a Cloud Communicator UI (CC-UI) which allows user(s) who have common access to the same VSS communicate—in real-time or not—via chat, voice, videoconference, SMS, presence, transcriptions, etc. In the center, (ii) a Virtual Storage System UI (VSS-UI)—which allows user(s) who have common access to the same VSS access to access execute, import, export, delete, etc. any shared virtual file and/or virtual app, and finally on the right, (iii) a User Cloud Storage UI (Files & Applications) (UCS-UI) which allows user(s) who have access to a VSS to execute, import, export, store, etc. virtual files and/or virtual apps between VSS and the user's Cloud Storage (Cloud Storage, dedicated or shared server storage, remote hardware storage (i.e. Internet connected external hard drive), etc.) and vice versa. As shown in the center of the FIG., the VSS-UI may have a VSS name label bar across the top, and may also be provided with a VSS Control Button.

FIG. 1.2C illustrates VSS functionality between the CC, VSS and UCS components of the VSS Client UI. With reference thereto, there is shown:

Functionality Between CC, VSS and UCS—User(s) with Access to the same VSS can communicate through the Cloud Communication at any time in real-time or not, can exchange virtual files and virtual app between VSS and UCS, One User "Control User"—pressing the VSS control button ON—can take control of the VSS and walk the other user(s) through any VSS in hierarchy mode. Additionally, a VSS Client UI Interface Command—User(s) may interact with the VSS client UI via any interface technology that translates commands given by any of their 5 human senses (in case of an enterprise employee and/or a consumer) such as touch screen, voice recognition, visual gestures, keyboard, brain pulses, etc. In the case of bot users, commands would be given by any software and/or hardware such as algorithms, robots, etc.

As shown in FIG. 1.2.D, when the VSS Control Button is OFF—VSS Client UI works as described in previous FIGS. When the VSS Control Button is ON—the VSS Client UI presents users with a functionality called "Control Button". When one user with access to a VSS (initial VSS) turns the Control Button ON it becomes the user (User Control) that takes control of the initial VSS, dragging all other user(s) that had access to that VSS at that moment from the initial VSS through any VSS in hierarchy mode. User(s) (user control and the rest of users) can interact with all virtual files and virtual apps in the VSS that the User Control has decided to access at that moment.

In exemplary embodiments of the present invention, a VSS Client UI can have a wide range of UI varieties. Examples are provided in FIGS. 1.3.A, 1.3.B, 1.3.C and 1.3.D. While the VSS component is always shown, one or both of the CC and UCS components may not be shown. If only a VSS is shown, this is referred to as a "closed" visual mode, and if one of CC and UCS is shown, this is known as a "semi-open" mode. Moreover, the placement of the CC and UCS components can be varied as a user may prefer, as shown in these FIGURES.

Application Example I—"Surf the Web"

FIGS. 1.4.A.1 through 1.4.A.4, and FIGS. 1.4.B through 1.4.B7, next described, depict details of an exemplary "Surf the Web" application running in a VSS Client according to exemplary embodiments of the present invention. In particular, as shown in FIGS. 1.4.A.1 through 1.4.A.4, a user can drag and drop the Surf-the-Web application from UCS to a VSS 1 window, surf to an Internet URL and receive "Code" in the form of HTML or XHTML, and upload the Code to a Consumer client. Once the code is on the Consumer Client, the user can link to or fragment the Code.

FIGS. 1.4.A.1-1.4.1.4—show various exemplary steps in a user dropping a web browser application into a VSS environment, entering a URL, and copying the URL or various webpage components back into his or her UCS. Thus, in FIG. 1.4.A.1 a user drags and drops an application called "Surf the Web", which is a web browser, from UCS to a VSS. Then, as shown in FIG. 1.4.A.2, when "Surf-The-Web" app drops into the VSS, it starts to execute. In FIG. 1.4.A.3 The user adds an Intranet/Internet address in the Address Bar (i.e. The Digital Marvels), and finally, in 1.4.A.4, the user can drag and drop a URL to the UCS by pressing one icon, or drag and drop one or more individual webpage component/s HTML tag(s) (i.e. object, image, etc.) to the UCS by pressing a second icon.

FIG. 1.4.B is a functional diagram showing the various components of an exemplary VSEE to store and run the "Surf-The-Web" application for Consumer A. With reference thereto, Real Applications in VSS 1 are Stored in the Consumer File/App Storage Server, and Virtual Apps in Consumer A's UCS are Stored in the Consumer Database. There is a VSS 1 Virtual Representation on a Screen of the "Surf-The-Web" application.

FIGS. 1.4.B1 through 1.4.B7 illustrate a user accessing and interacting with an exemplary "Surf-the-Web" application in a VSSE. Thus, in exemplary embodiments of the present invention, primarily with reference to FIG. 1.4.B, and also with reference to these exemplary screen shots of FIGS. 1.4.B1-1.4.B7, the following steps can occur:

1. Consumer A drags and drops Surf-The-Web app from UCS to VSS 1 (FIG. 1.4B1, B2).
2. Consumer A triggers a request to "Upload the Surf-The-Web Client App" to the Consumer A web server (FIG. 1.4.B).
3. The Consumer A web server sends a request to "Upload the Surf-The-Web client" to the Consumer A App/File Storage (FIG. 1.4.B).

4. The Consumer A App/file storage responds, sending a "Surf-The-Web client code" to the Consumer A web server (FIG. 1.4.B).
5. The Consumer A web server responds, sending a "Surf-The-Web client code" to the consumer A VSS client (FIG. 1.4.B).
6. Consumer A client uploads the code in the client ((FIG. 1.4.B; FIG. 1.4.B3).
7. Consumer A inserts www.thedigitalmarvels.com in the address bar (FIG. 1.4.B4).
8. Consumer A client sends a request for www.thedigitalmarvels.com to the consumer web server (FIG. 1.4.B).
9. Consumer web server sends a request for www.thedigitalmarvels.com to the consumer file/app storage (FIG. 1.4.B).
10. Consumer file/app storage sends a request for www.thedigitalmarvels.com to the Internet (FIG. 1.4.B.).
11. Internet sends a response with the "Code" to the consumer file/app storage. "Code" is any web page suitable for the World Wide Web. This information is usually in HTML or XHTML format.
12. The consumer app/file storage sends a response with the "Code" to the Consumer A web server (FIG. 1.4.B).
13. The consumer web server sends a response with the "Code" to the Consumer A client (FIG. 1.4.B).
14. The consumer A uploads the "Code" to the client.

If Consumer A presses the link button icon (e.g. a "chain-link" icon as shown in FIGS. 1.4.B4 and 1.4.B5):

15. Consumer A Client sends a request "Link button ON" to the Consumer A web server.
16. The Consumer (FIG. 1.4.B) web server sends a request "Link button ON" to the consumer File/app storage.
17. The Consumer A file/app storage changes the Link Button status from OFF to ON.
18. The Consumer A file/app storage sends a response "OK+a thumbnail image of The Digital Marvels link" to the Consumer A web server.
19. The Consumer Web server sends a response "OK+a thumbnail image of The Digital Marvels link" to the Consumer A Client.
20. Consumer A Client changes the link button icon from OFF to ON and places a thumbnail image of The Digital Marvels link in the UCS (FIG. 1.4.B5).

If on the other hand Consumer A presses the fragment button (e.g. two interlocked squares as shown in FIG. 1.4.A)

21. Consumer A Client sends a request "fragment button ON" to the consumer web server.
22. The Consumer A web server sends a request "fragment button ON" to the Consumer A File/app storage.
23. The Consumer A file/app storage changes the Fragment Button status from OFF to ON.
24. The Consumer A file/app storage sends a response "OK+The Digital Marvels' web page content" (This information is usually in HTML or XHTML format) is separated in fragments (headers, photos, video links, text, etc.)" to the Consumer A web server.
25. The Consumer A web server sends a response "OK+ The Digital Marvels' web page content separated in fragments to the Consumer A client.
26. The Consumer A client changes the link button icon from OFF to ON and uploads The Digital Marvels' web page content separated in fragments.
27. Consumer A can select one or more fragments and drag and drop them to the UCS. Note: Before dragging and dropping, Consumer A should review the web site's terms of use and other terms or notices posted on or made available through the site and make sure that is okay to take fragments from that web site.
28. The Consumer A client sends a request "fragment content" (including all copyrights, source, Internet link information, etc. of The Digital Marvels web page) to the consumer web server.

"Surf the Web" Example Screenshots

As noted, FIGS. 1.4.B1-B7 illustrate an exemplary user accessing and using the "Surf the Web" application according to an exemplary embodiment of the present invention. This is next described in detail. Thus, FIG. 1.4.B1 shows access to Surf The Web app, as well as another app "App2" in User 1's UCS portion of the UI. FIG. 1.4.B2 shows User 1 dragging and dropping the Surf The Web app from UCS to VSS 1. As a result, Surf the Web app is now in User 1's VSS, and the app's URL bar is empty in FIG. 1.4.B3. In FIG. 1.4.B4 User 1 inserts www.thedigitalmarvels.com web address into the web bar and the TDM website is displayed in VSS 1. FIG. 1.4.B5 shows User 1 having pressed the link button and a thumbnail image of TDM website appears in UCS containing TDM website link.

If, on the other hand, the user wants to fragment the displayed webpage, then, as shown in FIG. 1.4.B6, User 1 presses fragment button (the icon to the right of the "chain-link" icon in FIG. 1.4.B6, and, for example, The Digital Marvels' web page content is separated into fragments (headers, photos, video links, text, etc.). Once fragmented, as shown in FIG. 1.4.B7, the user selects "Touche" image fragment and a thumbnail with Touche image appears in UCS, as shown.

Application Example II—File Deletion

FIGS. 1.5.A.1-1.5.A.3, depict embodiments of the present invention directed to deleting a virtual file from VSS. In particular, using a VSS Client, the user can drag a file to a trash icon, whereupon a request to delete the file is sent to an enterprise web server, which then sends the request to an enterprise database. The enterprise database can update the status of the file (e.g., from "Active" to "False") and send acknowledgement of the deletion to the enterprise web server and the Client. The Client can then delete the file from VSS, send a request to a second Client to delete a virtual copy of the file, whereupon the second Client can erase the virtual copy of the file.

FIGS. 1.5.A.1-1.5.A.3 illustrate a second application, "Deleting A Virtual File From VSS." With reference thereto, FIG. 1.5.A.1 depicts a first situation, where Consumer A and Employee B share four files. These are seen in the VSS-UI. FIG. 1.5.A.2 depicts a second situation, where Consumer A drags and drops File B into the trash can icon. Finally, FIG. 1.5.A.3 depicts a third situation, where File B has been deleted, and thus only Files A, C and D remain.

FIG. 1.5.A.4 depicts a global view of process flow and interactions in the "Deleting A Virtual File" example provided above, involving Consumer A and Employee B. With reference thereto, the following actions are illustrated:

1. Consumer A drags and drops File B over the trash icon. File B was uploaded by Employee B, Any file dragged over the trash icon triggers the deletion of the mentioned file.
2. Consumer A sends a request "Delete File B from the VSS ID" to the enterprise web server.

3. The enterprise web server sends a request "Delete File B from the VSS ID" to the enterprise database.
4. The enterprise database updates the status of File B from VSS ID from "Active" to "False". As shown in the FIGURE, enterprise database stores the mapping of virtual files in VSS 1, Consumer A and Employee B as well as Employee B UCS and the CC UI data.
5. The enterprise database sends the response "OK" to the enterprise web server,
6. The enterprise web server sends the response "OK" to the Consumer A client.
7. Consumer A client erases Virtual File B from VSS 1. As shown, real files in VSS 1 are stored in the consumer File/App Storage Server.
8. Consumer A client triggers event to the event dispatcher server.
9. Event Dispatcher server sends a request "Delete File B from VSS ID" to Employee B Client.
10. Employee B Client erases Virtual File B from VSS 1.

It is noted, as shown in the FIGURE, that in this example, Consumer A supplied ("owns") Files C and D, and Employee B supplied ("owns") Files A and B.

"Deleting A Virtual File" Example Screenshots

As noted, FIGS. 1.5.A5-A8 illustrate an exemplary user accessing and using the "Deleting A Virtual File From VSS" application according to an exemplary embodiment of the present invention. This is next described in detail, form the point of view of one of the participants, namely Employee B. FIG. 1.5.A5 illustrates the four files, A and B shared by Employee B, and C and D shared by Consumer A. FIG. 1.5.A6 illustrates Consumer A having activated the delete button, which now has a large red circle surrounding the "trash" icon as seen in FIG. 1.5.A5. FIG. 1.5.A7 illustrates dragging and dropping File B into the trash, thus deleting it. Finally, FIG. 1.5.A8 illustrates File B being gone, and the delete button now deactivated.

that may be used, on each of the right and left sides of each of the above described screenshots for "Deleting A Virtual File" one can see icons. On the right is a cloud icon, which indicates that if it would be toggled, the user would then see the UCS. On the left is a comic book type "statement" icon, indicating speech, and thus Client Chat, or CC. This feature is generally toggleable in various exemplary embodiments, to switch between "closed" "semi-open" and "open" UI modes, as described above in connection with FIG. 1.3

Exemplary Implementations

Any suitable programming language may be used to implement the routines of particular embodiments of the present invention, including, but not limited to, the following: C, C++, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time.

Particular embodiments may be implemented in a computer-readable storage device or non-transitory computer readable medium for use by or in connection with the instruction execution system, apparatus, system, or device.

Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings or FIGURES may also be implemented in a more separated or integrated manner, or even removed or rendered as inoperable in certain cases, as is useful in accordance with a particular application. It is also understood to be within the spirit and scope of the present invention to implement a program or code that may be stored in a machine-readable medium, such as a storage device, to permit a computer to perform any of the methods described above, As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for contact importing and processing, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:
1. A method, comprising:
providing a virtual storage space (VSS);
providing access to the VSS to at least two user systems,
providing a user interface (UI) for the VSS, through which a first user may place at least one of virtual files and virtual applications in the VSS, there being only one actual copy of any file or application that a virtual file or application placed in the VSS represents, the single actual copy being stored on a single server;
receiving an indication from a second user, who has accessed the VSS, to open the at least one file or application;
in response to the indication, opening the at least one file or application for the second user without downloading the at least one file or application to the second user's local system;
in response to a file added to the VSS by a user, each existing application in the VSS automatically taking the added file as an input or as an additional input, as appropriate, and re-running the application to generate one or more new outputs; and in response to an application added to the VSS by a user, the added application automatically taking each existing file in the VSS as an input or an additional input, as appropriate, and processing those inputs or additional inputs to generate one or more new outputs.

2. The method of claim 1, wherein the at least two users are one or more of consumers, employees or principals of enterprises, friends of consumers, software "bots" and partners of enterprise employees or principals.

3. The method of claim 1, further comprising providing at least one additional VSS linking one of the at least two users and a third party.

4. The method of claim 1, wherein at least one of: the virtual file or virtual application is interacted with by non-owners of the actual underlying application or file via an image in their user interface that represents the actual file, a virtual mapping of files and applications is stored in a database associated with one of the at least two users, or a virtual mapping of files and applications is stored in a database associated with one of the at least two users and the database is one of an enterprise database, an enterprise partner database and a consumer database.

5. The method of claim 1, further comprising providing either:
at least one additional VSS, such that in a matrix of virtual storage spaces there is an enterprise zone and a consumer zone, or
at least one additional VSS, such that in a matrix of VSSs there is an enterprise zone and a consumer zone, wherein different parties set privacy types in each of the consumer and enterprise zones.

6. The method of claim 1, VSS further comprising:
in response to an application added to the VSS by a user that takes the users in the VSS as its inputs, the added application automatically processing the users to generate one or more new outputs.

7. The method of claim 1, wherein said virtual applications or virtual files include one or more of photos, videos, text files, images, HTML pages, portions of web pages, and URLs.

8. The method of claim 1, wherein at least one of:
the user interface includes a main screen displaying the contents of the VSS, and one or more side screens; or
the user interface includes a main screen displaying the contents of the VSS, and one or more side screens, and said one or more side screens include client chat and a depiction of the contents of the user's cloud storage.

9. The method of claim 1, wherein said VSS is a virtual representation of a storage space in one of a database, a memory, a data structure and a dynamically allocated memory.

10. A non-transitory computer readable medium containing instructions that, when executed by at least one processor of a computing device, cause the computing device to:
provide a virtual storage space (VSS);
provide access to the VSS to at least two user systems;
provide a user interface (UI) for the VSS, through which a first user may place at least one of virtual files and virtual applications in the VSS, including at least a streaming application, there being only one actual copy of any file or application that a virtual file or application placed in the VSS represents, the single actual copy being stored on a single server;
receive an indication from a second user, who has accessed the VSS, to open the at least one file or application;

in response to the indication, open the at least one file or application for the second user without downloading the at least one file or application to the second user's local system;
in response to a file added to the VSS by a user, each existing application in the VSS automatically take the added file as an input or as an additional input, as appropriate, and re-run the application to generate one or more new outputs; and
in response to an application added to the VSS by a user, the added application automatically take each existing file in the VSS as an input or an additional input, as appropriate, and process those inputs or additional inputs to generate one or more new outputs.

11. The non-transitory computer readable medium of claim 10, wherein the at least two users are one or more of consumers, employees or principals of enterprises, friends of consumers, software "bots" and partners of enterprise employees or principals.

12. The non-transitory computer readable medium of claim 10, said instructions further causing the computing device to provide at least one additional VSS linking one of the at least two users and a third party.

13. The non-transitory computer readable medium of claim 10, wherein at least one of:
the single server of the VSS includes at least one of cloud storage, dedicated or shared storage server, and remote storage hardware, or
the VSS is a virtual representation of a storage space in one of a database, a memory, a data structure and a dynamically allocated memory.

14. A system for accessing files or applications via a virtual shared space, comprising:
at least one processor;
a display; and
memory containing instructions that, when executed, cause the at least one processor to:
provide a virtual storage space (VSS);
provide access to the VSS to at least two user systems;
provide a user interface (UI) for the VSS, through which a first user may place at least one of virtual files and virtual applications in the VSS, including at least a streaming application, there being only one actual copy of any file or application that a virtual file or application placed in the VSS represents, the single actual copy being stored on a single server;
receive an indication from a second user, who has accessed the VSS, to open the at least one file or application;
in response to the indication, open the at least one file or application for the second user without downloading the at least one file or application to the second user's local system;
in response to a file added to the VSS by a user, each existing application in the VSS automatically take the added file as an input or as an additional input, as appropriate, and re-run the application to generate one or more new outputs; and
in response to an application added to the VSS by a user, the added application automatically take each existing file in the VSS as an input or an additional input, as appropriate, and process those inputs or additional inputs to generate one or more new outputs.

15. The system of claim 14, wherein at least one of:
said virtual storage space is a virtual representation of storage space in one of a database, a memory, and a dynamically allocated memory,
a virtual mapping of files and applications in the virtual storage space is stored in a database associated with one of the at least two users, or
a virtual mapping of files and applications in the virtual storage space is stored in a database associated with one of the at least two users, and wherein the database is one of an enterprise database, an enterprise partner database and a consumer database.

16. The system of claim 14, further comprising one or more of:
at least one additional VSS, such that in a matrix of VSSs there is an enterprise zone and a consumer zone, or
at least one additional VSS, such that in a matrix of VSSs there is an enterprise zone and a consumer zone, wherein different parties set privacy types in each of the consumer and enterprise zones.

17. The method of claim 1, wherein:
if an owner of a file or application that has been placed in the VSS deletes it no user can access the file; or
if an owner of a file or application that has been placed in the VSS changes it, users only have access to the changed file or application.

18. The non-transitory computer readable medium of claim 10, wherein the instructions, when executed by the at least one processor of the computing device, further cause the computing device to:
in response to an application added to the VSS by a user that takes the users in the VSS as its inputs, the added application automatically processing the users to generate one or more new outputs.

19. The system of claim 14, the memory containing instructions that, when executed, further cause the at least one processor to:
in response to an application added to the VSS by a user that takes the users in the VSS as its inputs, the added application automatically processes the users to generate one or more new outputs.

20. The method of claim 1, further comprising, when the application is re-run and new outputs generated, displaying the new outputs in the VSS.

* * * * *